US008080624B2

(12) United States Patent
Ito et al.

(10) Patent No.: US 8,080,624 B2
(45) Date of Patent: Dec. 20, 2011

(54) PROPYLENE-BASED POLYMER, PRODUCTION METHOD THEREFOR, COMPOSITION USING THE SAME, AND APPLICATION THEREOF

(75) Inventors: Masaaki Ito, Yokkaichi (JP); Hideshi Uchino, Yokkaichi (JP); Yoshiyuki Ishihama, Kawasaki (JP); Masaru Aoki, Yokkaichi (JP); Masato Nakano, Yokkaichi (JP); Fusaaki Katou, Yokkaichi (JP); Kazuo Asuka, Yokkaichi (JP)

(73) Assignee: Japan Polypropylene Corporation, Tokyo (JP)

( * ) Notice: Subject to any disclaimer, the term of this patent is extended or adjusted under 35 U.S.C. 154(b) by 66 days.

(21) Appl. No.: 12/672,089

(22) PCT Filed: May 16, 2008

(86) PCT No.: PCT/JP2008/059058
§ 371 (c)(1),
(2), (4) Date: Feb. 4, 2010

(87) PCT Pub. No.: WO2009/019919
PCT Pub. Date: Feb. 12, 2009

(65) Prior Publication Data
US 2010/0227987 A1 Sep. 9, 2010

(30) Foreign Application Priority Data
Aug. 6, 2007 (JP) ................. 2007-204136

(51) Int. Cl.
C08F 110/06 (2006.01)
C08F 4/6592 (2006.01)
B01J 31/22 (2006.01)

(52) U.S. Cl. ........ 526/351; 526/113; 526/114; 526/160; 526/165; 526/943; 502/113; 502/152

(58) Field of Classification Search ............ 526/113, 526/114, 160, 165, 351, 943; 502/113, 152
See application file for complete search history.

(56) References Cited

U.S. PATENT DOCUMENTS

| 5,541,236 | A | 7/1996 | DeNicola, Jr. et al. |
| 6,916,886 | B2 | 7/2005 | Morioka et al. |
| 7,511,105 | B2 * | 3/2009 | Chung ............... 526/160 |
| 2004/0110910 | A1 * | 6/2004 | Arjunan ............ 526/127 |
| 2006/0149008 | A1 * | 7/2006 | Razavi ............. 526/160 |

FOREIGN PATENT DOCUMENTS

| EP | 1 367 068 A1 | 12/2003 |
| EP | 1 520 863 A1 | 4/2005 |
| JP | 2 255812 | 10/1990 |
| JP | 5 194778 | 8/1993 |
| JP | 10 338717 | 12/1998 |
| JP | 2001 64314 | 3/2001 |
| JP | 2001 163924 | 6/2001 |
| JP | 2001 288220 | 10/2001 |
| JP | 2001 294609 | 10/2001 |
| JP | 2001 525460 | 12/2001 |
| JP | 3260171 | 12/2001 |
| JP | 2002 523575 | 7/2002 |
| JP | 2007 154121 | 6/2007 |
| WO | 99 27007 | 6/1999 |

OTHER PUBLICATIONS

Extended European Search Report issued on Dec. 23, 2010, in Application No. 08752891.5.

Chung, T.C. et al., "Synthesis of Polypropylene-graft-poly(methyl methacrylate) Copolymers by the Borane Approach", Macromolecules, vol. 26, No. 14, pp. 3467-3471, Jul. 5, 1993.

* cited by examiner

*Primary Examiner* — Caixia Lu
(74) *Attorney, Agent, or Firm* — Oblon, Spivak, McClelland, Maier & Neustadt, L.L.P.

(57) ABSTRACT

A propylene-based polymer which is suitably applicable to foam molding, sheet molding, blow molding or the like, because of having good flow characteristics, high melt tension, high swell ratio and thus good molding workability.

It is attained by a propylene-based polymer or the like characterized by satisfying the following requirements (i) to (vi).

Requirement (i): MFR is 0.1 g/10 minutes to 100 g/10 minutes.

Requirement (ii): Q value by GPC is 3.5 to 10.5.

Requirement (iii): ratio of components with a molecular weight of equal to or higher than 2,000,000, in a molecular weight distribution curve obtained by GPC, is equal to or larger than 0.4% by weight and less than 10% by weight.

Requirement (iv): components, which elute at a temperature of equal to or lower than 40° C., are equal to or less than 3.0% by weight, in temperature rising elution fractionation by ODCB.

Requirement (v): isotactic triad fraction (mm) measured with $^{13}$C-NMR is equal to or higher than 95%.

Requirement (vi): strain hardening degree ($\lambda$max), in measurement of extensional viscosity, is equal to or higher than 6.0.

14 Claims, 6 Drawing Sheets

PROPYLENE-BASED POLYMER, PRODUCTION METHOD THEREFOR, COMPOSITION USING THE SAME, AND APPLICATION THEREOF

BACKGROUND OF THE INVENTION

1. Field of the Invention

The present invention relates to a propylene-based polymer, a production method therefor, a composition using the same, and an application thereof, and in more detail, the present invention relates to a propylene-based polymer which is suitably applicable to foam molding, sheet molding, blow molding or the like, because of having a high fluidity at melting, as well as high melt tension, high swell ratio and thus good molding workability, and a production method therefor, a propylene-based polymer composition using the same, and an application thereof.

2. Description of the Prior Art

Conventionally, polypropylene has been used in a wide range in various fields, because of having the characteristics of high melting point, high tensile strength, high rigidity and chemical resistance.

However, usual polypropylene has defect of limitation in usage to foam molding, sheet molding, blow molding or the like, due to low melt tension and melt viscoelasticity.

In order to solve these defects, as a method for the addition of a component for enhancing a melt tension, there have been known a method for mixing of high density polyethylene having high melt tension, which is produced by a chromium catalyst; a method for mixing of low density polyethylene, which is produced by a high pressure radical polymerization method; a method for polymerization of high molecular weight polyethylene before the polymerization stage of propylene; or the like, however, there is a defect of impairing of original characteristics of polypropylene, such as insufficient elastic modulus, strength and heat resistance, or decrease of fluidity, in a component for enhancing a melt tension.

Under these circumstances, there has been an idea of a method for enhancing a melt tension, by cross-linking of polypropylene itself or introduction of a long-chain-branch, and various attempts has been tried. For example, as a method for cross-linking, there are included a method for irradiation of electron beams after polymerization (for example, refer to Patent Literature 1); a method for using a peroxide, or a peroxide and a cross-linking co-agent (for example, refer to Patent Literature 2); and also as a method for introducing a long-chain-branch, a method for grafting a radically polymerizable monomer to polypropylene (for example, refer to Non-Patent Literature 1); a method for copolymerizing a propylene and a polyene (for example, refer to Patent Literature 3, 4); and the like.

However, the method for cross-linking after polymerization has a difficulty in control of a side reaction, which leads to high-order cross-linking, and it has a problem that poor appearance or adverse effect on mechanical characteristics are raised, due to generation of gel, as well as limitation in arbitrary control of molding workability, and control range is narrow. In addition, use of a component having low crystallinity, to enhance branch generation efficiency, raises a problem of impairing of mechanical property or cleanness as a product. On the other hand, the method for grafting of a radically polymerizable monomer impairs chemical stability of polypropylene, and raises a problem of recycling property as well. Further, the copolymerization method with a polyene does not necessarily provide sufficient improvement effect of melt tension, as well as provides difficulty in control of property due to risk of gel generation. In addition, a separation and recovery step of the polyene after completion of the copolymerization is essential, which remains a problem in view of production cost.

In recent years, there has been proposed a macromer copolymerization method utilized mainly a metallocene catalyst. The metallocene catalyst, in the broad sense, is a transition metal compound having at least one conjugated five-member ring ligand, and a ligand having a cross-linked structure is generally used for polymerization of propylene.

There have been disclosed, initially, ethylenebis(indenyl)zirconium dichloride or ethylenebis(4,5,6,7-tetrahydroindenyl)zirconium dichloride (JP-A-61-130314), which were found as a complex that enables to produce an isotactic polyolefin, dimethylsilylenebis substituted cyclopentadienyl zirconium dichloride having a silylene group as a cross-linking group (JP-A-1-301704), dimethylsilylenebis(indenyl)zirconium dichloride (JP-A-1-275609), dimethylsilylenebis(2-methylindenyl)zirconium dichloride having improved stereoregularity and molecular weight to a certain degree by introduction of a substitution group adjacent (at the second site) to the cross-linking group of a cyclopentadienyl compound (JP-A-4-268307), further, dimethylsilylenebis(2-methyl-4-phenylindenyl)zirconium dichloride (JP-A-6-100579) or dimethylsilylenebis(2-methyl-4-phenyl-4-hydroazulenyl)zirconium dichloride (JP-A-10-226712) having still more improved activity, stereoregularity and molecular weight by introduction of an aryl group at the fourth site, and further recently, dichloro(1,1'-dimethylsilylenebis(2-ethyl-4-(3-chloro-4-t-butylphenyl)-4H-azulenyl))hafnium introduced with a specific substitution group at a specific site of the aryl group at the fourth site (JP-A-2003-292518), and a highly bulky hetero substitution group is introduced at the second site (JP-A-2002-194016, JP-A-2002-535339, JP-A-2004-2259, and JP-A-2004-352707); and the like They are aiming at mainly improvement of catalytic activity, or melting point and molecular weight of the resultant polypropylene, and do not suggest production suitability of a macromer or polypropylene having a long-chain-branch.

As a macromer copolymerization method utilized a metallocene catalyst, there has been contrived, for example, a method (a macromer copolymerization method), by producing a propylene macromer having a vinyl structure at the terminal, at the first stage of polymerization (a synthesis step of a macromer), by using a specific complex under specific polymerization condition, and then by carrying out copolymerization with propylene, by using a specific catalyst under specific polymerization condition at the second stage of polymerization (a macromer copolymerization step), which provides excellent recycling property and has no risk of gel generation for improvement of melt tension, without having high-order cross-linking, nor impairment of original chemical stability as polypropylene (for example, refer to Patent Literature 5, 6).

However, this method requires polymerization by using a specific complex at relatively high temperature and under low pressure, for efficiently obtaining a terminal vinyl structure necessary as the macromer, at the former stage. Therefore, the resultant macromer inevitably becomes a macromer having low molecular weight and stereoregularity. In addition, at the latter stage, copolymerization of the macromer obtained at the former stage with propylene is carried out, however, due to small quantity of the macromer to be copolymerized, relative to charged quantity of the macromer, a macromer having low molecular weight and stereoregularity remains in not-neglectable quantity, in a macromer copolymer, which becomes a product. In addition, there is contained without being copolymerized, a component, which is by-produced at the macromer synthesis step and has a terminal with similarly low molecular weight and low stereoregularity, for example, a saturated terminal other than a vinyl group, resulting in decrease in mechanical property, such as rigidity or impact strength of a product, generation of a problem of stickiness, or making control difficulty of fluidity and molding property. Further, in the case where a macromer having low molecular weight and low stereoregularity remains in a large quantity in a product, for example, when it is used as a container, elution components increase, which inevitably generates a defect of, what is called, poor cleanness.

Against the above multi-stage polymerization method, there has been contrived a single-stage polymerization method, where the synthesis step of a macromer and the copolymerization step of the macromer are carried out at the same time with a specific complex (a macromer generation copolymerization method in situ) (for example, refer to Patent Literature 7).

However, this method does not necessarily provide sufficient generation quantity of the macromer and copolymerization quantity of the macromer, and thus improvement effect of melt property is at an insufficient level. In addition, there is also a problem of poor fluidity, due to narrow molecular weight distribution. In addition, this method requires slurry polymerization of propylene in low concentration for efficient generation of the macromer, and thus not preferable in view of production efficiency and environmental load.

In addition, there has been contrived a method for obtaining a propylene-based polymer having wide molecular weight distribution and high branch quantity, by carrying out a bulk polymerization in a single stage with a catalyst composed of a specific complex and a specific chemically-treated clay (refer to Patent Literature 9).

However, this method does not introduce a controlled branch due to implementation of macromer generation and copolymerization with a single complex only, although it provides a large quantity of branches, and thus improvement effect of melt property is not sufficient.

On the other hand, a production method for a propylene polymer having wide molecular weight distribution or stereoregularity distribution, by using two kinds of complexes, has also be known, for example, there has been reported that polypropylene having a molecular weight distribution of 4.8 to 6.3 is obtained, by using a catalyst composed of a complex, where ethylenebis(indenylhafnium)dichloride and a small quantity of ethylenebis(indenylzirconium)dichloride are mixed, and methylaluminoxane (refer to Patent Literature 8), however, this method provides only two-peak type wide molecular weight distribution and does not provide one introduced with a branch structure by macromer generation and copolymerization. Therefore, improvement effect of melt property is not so high.

In recent years, there has been reported that a propylene-based polymer obtained by multi-stage polymerization shows relatively high melt tension, which is obtained by using a catalyst in combination of two kinds of metallocene complexes, specifically, complexes such as rac-SiMe$_2$[2-Me-4-Ph-Ind]$_2$ZrCl$_2$ and rac-SiMe$_2$[2-Me-4-Ph-Ind]$_2$HfCl$_2$, along with silica which supports methylaluminoxane (MAO) (refer to Patent Literature 10).

However, any of these methods has not yet been commercialized, and thus it has been desired to develop a method for producing a propylene-based polymer, which enables to improve melt property, in an industrially more simple and easy way.

[Patent Literature 1] U.S. Pat. No. 5,541,236
[Patent Literature 2] WO99/27007
[Patent Literature 3] JP-A-5-194778
[Patent Literature 4] JP No. 3260171
[Patent Literature 5] JP-A-2001-525460
[Patent Literature 6] JP-A-10-338717
[Patent Literature 7] JP-A-2002-523575
[Patent Literature 8] JP-A-2-255812
[Patent Literature 9] JP-A-2007-154121
[Patent Literature 10] JP-A-2001-64314
[Non-Patent Literature 1] T. C. Chung et. al., Synthesis of Polypropylene-graft-poly(methylmethacrylate) Copolymers by Borane Approach, Macromolecules, (1993), volume 26, No. 14, page 3467-3471

SUMMARY OF THE INVENTION

In view of the above conventional technological problems, it is an object of the present invention to provide a novel propylene-based polymer having an excellent molding workability by improvement of poor melt property, which has been considered to be a conventional defect in a propylene-based polymer, that is, by having a good fluidity and a high melt tension.

In addition, it is an object of the present invention to provide a method for producing such a propylene-based polymer efficiently in a simple and easy way. Further, it is an object of the present invention to provide a propylene-based resin composition, wherein such a propylene-based polymer is used, or a foamed body obtained from such a propylene-based polymer.

The present inventors have intensively studied a way to solve the above-described problems and found that, by producing a propylene-based polymer by using a catalyst containing specific two kinds of transition metal compounds, a propylene-based polymer of a novel long-chain-branch-type, having melt fluidity (melt drawability) or melt tension under controlled, and excellent balance of property and melt workability, and thus completed the present invention based on this knowledge.

That is, according to a first aspect of the present invention, there is provided a propylene-based polymer characterized by satisfying the following requirements (i) to (vi).

Requirement (i): melt flow rate (MFR) (at a temperature of 230° C. and a load of 2.16 kg) is 0.1 g/10 minutes to 100 g/10 minutes.

Requirement (ii): ratio (Q value) of weight average molecular weight (Mw) and number average molecular weight (Mn) measured with gel permeation chromatography (GPC), is 3.5 to 10.5.

Requirement (iii): ratio of components with a molecular weight (M) of equal to or higher than 2,000,000, in a molecular weight distribution curve obtained by GPC, is equal to or larger than 0.4% by weight and less than 10% by weight, relative to total weight.

Requirement (iv): components, which elute at a temperature of equal to or lower than 40° C., is equal to or less than 3.0% by weight, in temperature rising elution fractionation (TREF) by o-dichlorobenzene (ODCB).

Requirement (v): isotactic triad fraction (mm), measured with $^{13}$C-NMR, is equal to or higher than 95%.

Requirement (vi): strain hardening degree (λmax), in measurement of extensional viscosity, is equal to or higher than 6.0.

According to a second aspect of the present invention, there is provided the propylene-based polymer, in the first aspect, characterized in that, in the above requirement (vi), the strain hardening degree (λmax), in measurement of extensional viscosity, is equal to or higher than 10.0.

According to a third aspect of the present invention, there is provided the propylene-based polymer, in the first or the second aspect, characterized by satisfying the following requirement (vii).

Requirement (vii): the polymer has a branch structure part represented by the following structural formula (1).

[Chemical Formula 1]

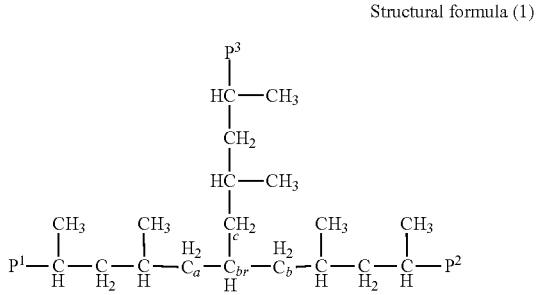

Structural formula (1)

[provided that, wherein, Cbr represents methine carbon at the root of a branch chain with carbon atoms of equal to or more than five, Ca, Cb and Cc represent methylene carbons adjacent to the methine carbon (Cbr), and P1, P2 and P3 represent residual groups of a propylene polymer].

According to a fourth aspect of the present invention, there is provided the propylene-based polymer, in any one of the first to the third aspects, characterized by further satisfying the following requirement (viii).

Requirement (viii): ME (memory effect) satisfies the following relational equation.

$$(ME) \geq -0.26 \times \log(MFR) + 1.9$$

[wherein, a polymer is obtained by extrusion from an orifice, by using a melt indexer having an orifice length of 8.00 mm and a diameter of 1.00 mmφ, under setting a temperature in cylinder at 190° C., under load and at an extrusion rate of 0.1 g/minute, and then quenching in ethanol, and ME (memory effect) is defined as value of diameter of thus extruded strand divided with diameter of the orifice].

According to a fifth aspect of the present invention, there is provided the propylene-based polymer, in any one of the first to the fourth aspects, characterized by still more satisfying the following requirement (ix).

Requirement (ix): α/β is larger than 0.9 and below 2.0, when α and β are defined as $\alpha = H_{50} - Tp$ and $\beta = Tp - L_{50}$, respectively, wherein, Tp represents a common logarithm of molecular weight corresponding to a peak position, and $L_{50}$ and $H_{50}$ represent common logarithm of molecular weight at a position showing 50% height of the peak position ($L_{50}$ is a lower molecular weight side than Tp, and $H_{50}$ a higher molecular weight side than Tp), in a molecular weight distribution curve obtained by GPC.

According to a sixth aspect of the present invention, there is provided a production method for the propylene-based polymer, in any one of the first to the fifth aspects, characterized in that polymerization of propylene is carried out in the presence of a catalyst having at least the following components (A) to (C):

(A): at least two kinds of transition metal compounds selected from the following components [A-1] and [A-2], which are transition metal compounds of group IV of the periodical Table. Provided that ratio of mole quantity of [A-1] is 0.30 to 0.99, relative to total mole quantity of components [A-1] and [A-2].

(i) the component [A-1]: a compound represented by the general formula (a1)

[Chemical formula 2]

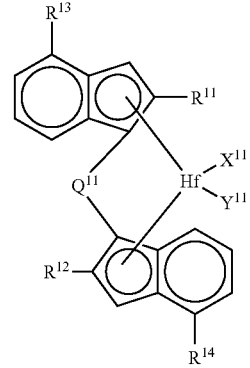

General formula (a1)

[Wherein, $Q^{11}$ represents a bonding group for cross-linking two conjugated five-member ring ligands, which is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20, Hf represents hafnium, $X^{11}$ and $Y^{11}$ each independently represent hydrogen, a halogen group, a hydrocarbon group with carbon atoms of 1 to 20, an alkoxy group with carbon atoms of 1 to 20, an alkylamide group with carbon atoms of 1 to 20, a trifluoromethanesulfonic acid group, a phosphorous-containing hydrocarbon group with carbon atoms of 1 to 20, or a silicon-containing hydrocarbon group with carbon atoms of 1 to 20. $R^{11}$ and $R^{12}$ each independently represent monocyclic or polycyclic hetero aromatic group with carbon atoms of 4 to 20, which may contain a silicon or a halogen, containing a hetero atom selected from the group consisting of an oxygen atom, a sulfur atom, a nitrogen atom, a boron atom and a phosphorous atom, in a five-member or six-member ring, and $R^{13}$ and $R^{14}$ each independently represent an aryl group with carbon atoms of 6 to 30, which may contain a halogen, silicon, oxygen, sulfur, nitrogen, boron, phosphorous, or a plurality of hetero elements selected from these.]

(ii) the component [A-2]: a compound represented by the general formula (a2)

[Chemical formula 3]

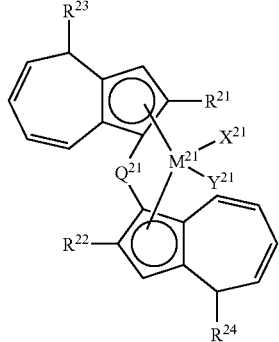

General formula (a2)

[Wherein, $Q^{21}$ represents a bonding group for cross-linking two conjugated five-member ring ligands, which is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20, $M^{21}$ represents zirconium or hafnium, $X^{21}$ and $Y^{21}$ each independently represent a similar substitution group to $X^{11}$ and $Y^{11}$. $R^{21}$ and $R^{22}$ each independently represent a hydrocarbon group with carbon atoms of 1 to 6. $R^{23}$ and $R^{24}$ each independently represent an aryl group with carbon atoms of 6 to 30, which may contain a halogen, silicon or a plurality of hetero elements selected from these.]

(B): an ion-exchangeable layered silicate salt: and (C): an organoaluminum.

According to a seventh aspect of the present invention, there is provided the production method for the propylene-based polymer, in the sixth aspect, characterized in that the ion-exchangeable layered silicate salt is a smectite group.

According to an eighth aspect of the present invention, there is provided the production method for the propylene-based polymer, in the sixth or the seventh aspect, characterized in that $M^{21}$ of the component [A-2] is hafnium.

According to a ninth aspect of the present invention, there is provided the production method for the propylene-based polymer, in any one of the sixth to the eighth aspects, characterized in that polymerization of propylene is carried out by using a catalyst which was preliminary polymerized with an olefin in a range of 0.01 to 100, in weight ratio, relative to the component (B), by subjecting the olefin to contacting, in the presence of the component (A) and the component (B), or the component (A), the component (B) and the component (C).

According to a tenth aspect of the present invention, there is provided the production method for the propylene-based polymer, in any one of the sixth to the ninth aspects, characterized in that polymerization of propylene is carried out in bulk polymerization by using a propylene as a solvent, or vapor phase polymerization where propylene is maintained in a gaseous state.

According to an eleventh aspect of the present invention, there is provided the production method for the propylene-based polymer, in any one of the sixth to the tenth aspects, characterized in that polymerization of propylene is carried out by using a hydrogen in a range of $1.0\times10^{-6}$ to $1.0\times10^{-2}$, in molar ratio, relative to propylene.

According to a twelfth aspect of the present invention, there is provided the production method for the propylene-based polymer, in any one of the sixth to the eleventh aspects, characterized in that the polymerization process is a single stage polymerization.

Further, according to a thirteenth aspect of the present invention, there is provided a propylene-based resin composition characterized by having the propylene-based polymer, in any one of the first to the fifth aspects.

Still more, according to a fourteenth aspect of the present invention, there is provided a foam molded body obtainable from the propylene-based resin composition in the thirteenth aspect.

As described above, the present invention relates to a novel propylene-based polymer, and preferable aspects thereof include the following.

(1) In any of the above aspects, a propylene-based polymer, further, characterized in that branch number, which is defined as numbers of branched carbons (Cbr) observed at 31.5 to 31.7 ppm with $^{13}$C-NMR, per 1000 carbons which form the whole skeleton, is 0.01 to 0.4.

(2) In any of the above aspects, a propylene-based polymer further characterized in that the branch chain length is equal to or longer than 500, as skeleton carbon number (equivalent molecular weight: 11,000).

(3) In any of the above aspects, a propylene-based polymer further characterized in that stereoregularity of the branch chain, is equal to or higher than 95%, as mm.

(4) In any of the above aspects, a propylene-based polymer further characterized by satisfying the following requirement (x) and/or requirement (xi).

Requirement (x): MT230° C. (melt tension) satisfies the following relational formula.

$$(\text{MT230° C.}) \geqq 5g$$

[wherein, MT230° C. represents melt tension, measured with a melt tension tester, under condition of capillary: a diameter of 2.1 mm, cylinder diameter: 9.6 mm, extrusion rate from the cylinder: 10 mm/min, drawing rate: 4.0 m/min and temperature: 230° C.]. Requirement (xi): MaxDraw (maximal drawing rate) satisfies the following relational formula.

$$(\text{MaxDraw}) \geqq 10 \text{m/minute}$$

[wherein, MaxDraw (maximal drawing rate) represents drawing rate just before a resin breaks, when the drawing rate is gradually increased, in measurement of the above melt tension].

The propylene-based polymer of the present invention exhibits significant effect of having high melt tension, while having high fluidity in melting. Specifically, by satisfying of the above characteristics, effect prescribed in the above requirements (x) and/or (xi) may be obtained. That is, such excellent effect is exhibited that melt tension at 230° C. is equal to or higher than 5 g, and maximal drawing rate is equal to or higher than 10 m/minute.

In addition, the propylene-based polymer of the present invention may be applicable suitably to foam molding, sheet molding, blow molding or the like, because of having those excellent characteristics and thus excellent molding workability.

DETAILED DESCRIPTION OF THE INVENTION

Figure 1:
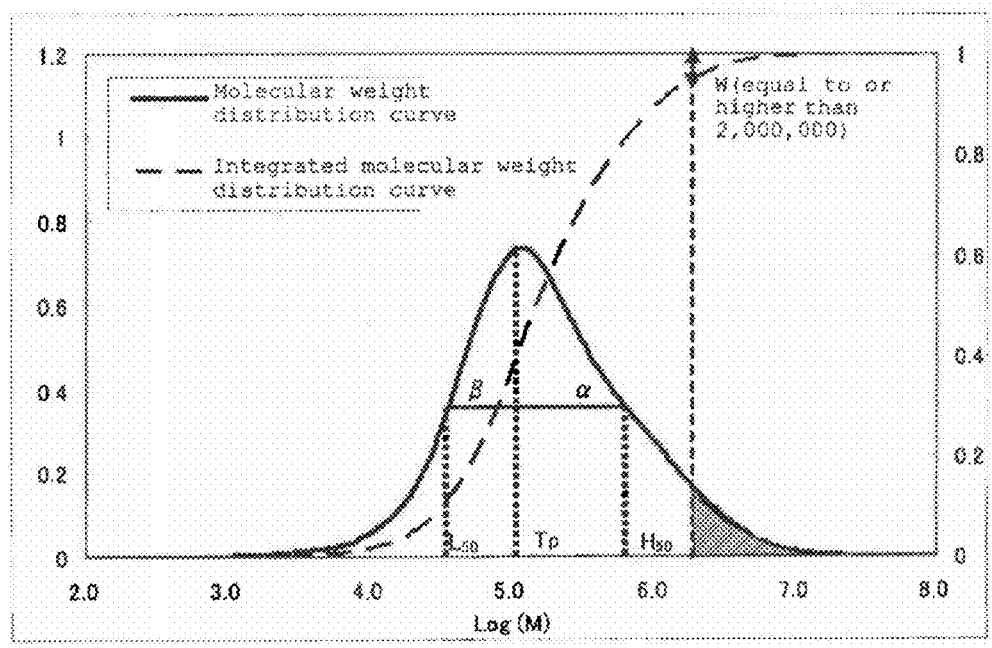
FIG. 1 is a drawing which shows one example of a molecular weight distribution curve in GPC.

The propylene-based polymer of the present invention is characterized by having characteristics and property of the following requirements (i) to (vi) or, in addition to these, further, of the requisite (vii) and/or the requisites (viii) and/or (ix) or, in addition to these, further, of the requisites (x) and/or (xi).

Requirement (i): melt flow rate (MFR) (at a temperature of 230° C. and a load of 2.16 kg) is 0.1 g/10 minutes to 100 g/10 minutes.

Requirement (ii): ratio (Q value) of weight average molecular weight (Mw) and number average molecular weight (Mn), measured with gel permeation chromatography (GPC), is 3.5 to 10.5.

Requirement (iii): ratio of components with a molecular weight (M) of equal to or higher than 2,000,000, in a molecular weight distribution curve obtained by GPC, is equal to or larger than 0.4% by weight and less than 10% by weight, relative to total weight.

Requirement (iv): components, which elute at a temperature of equal to or lower than 40° C., is equal to or less than 3.0% by weight, in temperature rising elution fractionation (TREF) by o-dichlorobenzene (ODCB).

Requirement (v): isotactic triad fraction (mm), measured with $^{13}$C-NMR, is equal to or higher than 95%.

Requirement (vi): strain hardening degree (λmax), in measurement of extensional viscosity, is equal to or higher than 6.0.

Requirement (vii): the polymer has a branch structure part represented by the following structural formula (1).
[Chemical Formula 4]

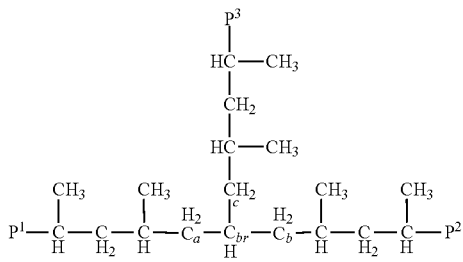

Structural formula (1)

[wherein, Cbr represents a methine carbon at the root of a branch chain with carbon atoms of equal to or more than five, Ca, Cb and Cc represent methylene carbons adjacent to the methine carbon (Cbr), and P1, P2 and P3 represent residual groups of a propylene polymer].

Requirement (viii): ME (memory effect) satisfies the following relational equation.

$$(ME) \geq -0.26 \times \log(MFR) + 1.9$$

[wherein, a polymer is obtained by extrusion from an orifice, by using a melt indexer having an orifice length of 8.00 mm and a diameter of 1.00 map, under setting a temperature in cylinder at 190° C., under load and at an extrusion rate of 0.1 g/minute, and then quenching in ethanol, and ME (memory effect) is defined as value of diameter of thus extruded strand divided with diameter of the orifice].

Requirement (ix): α/β is larger than 0.9 and below 2.0, when α and β are defined as α=$H_{50}$–Tp and β=Tp–$L_{50}$, respectively, wherein, Tp represents a common logarithm of molecular weight corresponding to a peak position, and $L_{50}$ and $H_{50}$ represent common logarithm of molecular weight at a position showing 50% height of the peak position ($L_{50}$ is a lower molecular weight side than Tp, and $H_{50}$ a higher molecular weight side than Tp), in a molecular weight distribution curve obtained by GPC.

Requirement (x): MT230° C. (melt tension) satisfies the following relational formula.

$$(MT230° C.) \geq 5g$$

[wherein, MT230° C. represents melt tension, measured with a melt tension tester, under condition of capillary: a diameter of 2.1 mm, cylinder diameter: 9.6 mm, extrusion rate from the cylinder: 10 mm/min, drawing rate: 4.0 m/min and temperature: 230° C.].

Requirement (xi): MaxDraw (maximal drawing rate) satisfies the following relational formula.

$$(MaxDraw) \geq 10 m/minute$$

[wherein, MaxDraw (maximal drawing rate) represents drawing rate just before a resin breaks, when the drawing rate is gradually increased, in measurement of the above melt tension]. Explanation will be given below sequentially by each item on the propylene-based polymer of the present invention, property thereof, a production method therefor, a propylene-based polymer resin composition by using the propylene-based polymer, applications thereof and the like.

I. Prescription and Identification Methods for a Structure of the Propylene-Based Polymer and a Structure of a Long-Chain-Branch The propylene-based polymer of the present invention is a long-chain-branch-type propylene-based polymer controlled a melt fluidity (melt drawability) or a melt tension, and having an excellent balance between property and melt workability.

The propylene-based polymer of the present invention is considered to have extremely enhanced melt property by introduction of the above long-chain-branch.

In general, $^{13}$C-NMR is used for direct detection and quantitative determination of a branch structure or branch number. In addition, $^{13}$C-NMR or GPC-vis, GPC-malls is used for detection and quantitative determination of a branch number or branch distribution. However, the above methods may some times require a long time in measurement, or provide limitation in quantitative determination. At present, as a method for evaluation of a branch, a rheological method is considered to have the highest sensitivity. For example, at the present stage, as a method for detection of a trace quantity of a branch, measurement of activated energy of flow in linear viscoelasticity measurement, or strain hardening degree in extensional viscosity measurement is generally used.

The present inventors guess as follows on a branch structure in consideration of mechanism of branch structure generation.

That is, what is called, a macromer is generated, where one polymer terminal mainly shows a propenyl structure (a vinyl structure), by a special chain transfer reaction generally called β-methyl elimination, from activated species derived from the catalyst component [A-1] to be used in a production method for the propylene-based polymer which will be described later.

The terminal propenyl structure (vinyl structure) terminated by the β-methyl elimination is shown below (Reference Literature: Macromol. Rapid Commun. 2000, 21, 1103-1107).

[Chemical formula 5]

Structural formula (2)

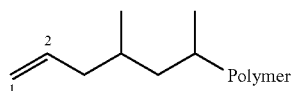

We guess that this macromer enables to generate higher molecular weight substance, which is incorporated into activated species derived from the catalyst component [A-2] having better copolymerizability, and thus macromer copolymerization proceeds.

Accordingly, the propylene-based polymer of the present invention has a specific branch structure as represented by the following structural formula (1).

In the structural formula (1), Ca, Cb and Cc represent methylene carbons adjacent to the branched carbon, and Cbr represents a methine carbon at the root of the branch chain.

$P^1$, $P^2$ and $P^3$ may contain an another branched carbon (Cbr) in themselves.

[Chemical Formula 6]

Structural formula (1)

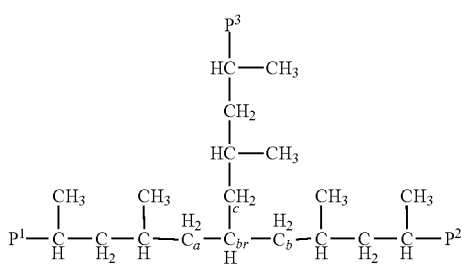

Such a branch structure is identified by $^{13}$C-NMR analysis. Assignment of each peak may be determined with reference to description of Macromolecules, Vol. 35, No. 10, 2002, p. 3839-3842. That is, total three methylene carbons (Ca, Cb and Cc) are observed for each one at 43.9 to 44.1 ppm, 44.5 to 44.7 ppm and 44.7 to 44.9 ppm, and a methyne carbon (Cbr) is observed at 31.5 to 31.7 ppm. The above methyne carbon observed at 31.5 to 31.7 ppm may be abbreviated hereafter as a branched carbon (Cbr).

Characteristics here are that three methylene carbons close to the branched methyne carbon (Cbr) are observed dividedly into three in a diastereotopically non-equivalent state.

The branch chain to be assigned with $^{13}$C-NMR in the present invention represents a residual group of the propylene-based polymer, with carbon atoms of equal to or more than 5, which is branched from the main chain of the propylene-based polymer. This branch chain and a branch with carbon atoms of equal to or less than 4 may be differentiated due to difference of peak position of the branched carbons (refer to Macromol. chem. phys. 2003, Vol. 204, p. 1738).

In general, in consideration of prescription on number and length of the branch of a polymer, the more branch number provides the better melt property. On the other hand, intermolecular maldistribution of the branch number is considered to lead to gel generation and decreased effect of melt property enhancement.

The branch number (density) is defined as numbers of the branched carbon (Cbr) observed at 31.5 to 31.7 ppm, per 1000 carbons which form the whole skeleton, utilizing the above assignment with $^{13}$C-NMR. Provided that, the carbons, which form the whole skeleton, mean all carbon atoms other than the methyl carbons.

It should be noted that, as a measurement method for the branch structure by $^{13}$C-NMR, the same method as a measurement method for mm fraction to be described later, is used.

In the propylene-based polymer of the present invention, which exhibits improved melt property, trace quantity of a branch component is present and quantity thereof is about 0.1 piece, as measurement result by $^{13}$C-NMR.

On the other hand, too high quantity of the branch could impair appearance of a molded article caused by gel generation. Still more, in the case of high rate drawing in molding, it raises a problem of generation of break of a molten substance, what is called, deterioration of melt drawability. Therefore, the branch number is equal to or less than 0.4 pieces as the upper limit, and preferably equal to or less than 0.2 piece. In addition, it is equal to or more than 0.01 pieces as the lower limit.

Even in the case where the present $^{13}$C-NMR in high magnetic field NMR is used, quantitative determination of a small quantity such as about 0.1 pieces is difficult unless the measurement is carried out for a very long time. In the case where the branch is contained in small quantity, instead of this, the branch was evaluated with a rheological method having higher sensitivity. Based on this result, the resultant strain hardening degree (λmax) is prescribed as equal to or higher than 6.0.

In addition, to exhibit high strain hardening as in the propylene-based polymer of the present invention, it is considered that branch length of equal to or higher than 7000, which is entanglement molecular weight of polypropylene, is necessary (Reference Literature: Macromolecules. 1998, 31, 1335, and Macromolecules. 2002, 35, 10062).

This corresponds to equal to or more than about 400, as equivalent to a skeleton carbon number. The skeleton carbon here means all carbon atoms other than methyl carbons. It is considered that the longer branch length provides the better melt property.

Therefore, branch chain length of the propylene-based polymer of the present invention is equal to or more than 500 (equivalent value of molecular weight of polypropylene: 11,000) as the skeleton carbon number, preferably equal to or more than 1000 (equivalent value of molecular weight of polypropylene: 21,000) as the skeleton carbon number, and still more preferably equal to or more than 2000 (equivalent value of molecular weight of polypropylene: 42,000) as the skeleton carbon number.

Equivalent value of molecular weight of polypropylene here is one different from molecular weight value measured with GPC, in strict meaning, however, it is close to number average molecular weight (Mn) measured with GPC.

Therefore, the branch length of the propylene-based polymer of the present invention may be substituted to be equal to or higher than 11,000, preferably equal to or higher than 21,000, and still more preferably equal to or higher than 42,000, with number average molecular weight (Mn) measured with GPC.

In addition, when polymerization mechanism is considered, because a branch structure is formed by incorporation of a macromer, which is generated from activated species derived from the catalyst component [A-1], to the main chain, the average molecular weight of the macromer is characterized as average molecular weight of the branch chain incorporated.

For example, in the propylene-based polymer of the present invention, molecular weight of macromer generated from the activated species derived from the [A-1], when number average molecular weight is 50,000, it is interpreted that average molecular weight of the branch chain incorporated is 50,000 and equivalent skeleton carbons are 2400 pieces.

Number average molecular weight of a macromer generated from the activated species derived from the above [A-1], may be estimated from a peak top of a portion derived from the above [A-1] in GPC, or from molecular weight in the case of homopolymerization of [A-1].

On the other hand, branch distribution of a polymer may be measured with GPC-vis or GPC-malls, however, in consideration from polymerization mechanism, because it is considered that branch is formed by incorporation of the macromer derived from the [A-1], into the activated species derived from the [A-2], which is a component having higher molecular weight and higher copolymerizability, it is considered that a long chain branch is introduced to a molecular weight component derived from the [A-2].

Because the molecular weight component derived from the [A-2] has higher molecular weight as compared with the molecular weight component derived from the [A-1], it is considered that, as the branch distribution, the higher molecular weight side (the side derived from the [A-2]) also has a distribution state where branch is introduced.

In addition, in the molecular weight component derived from the [A-1], branch structure formed by incorporation of the macromer by [A-1] itself is also present.

Figure 3:
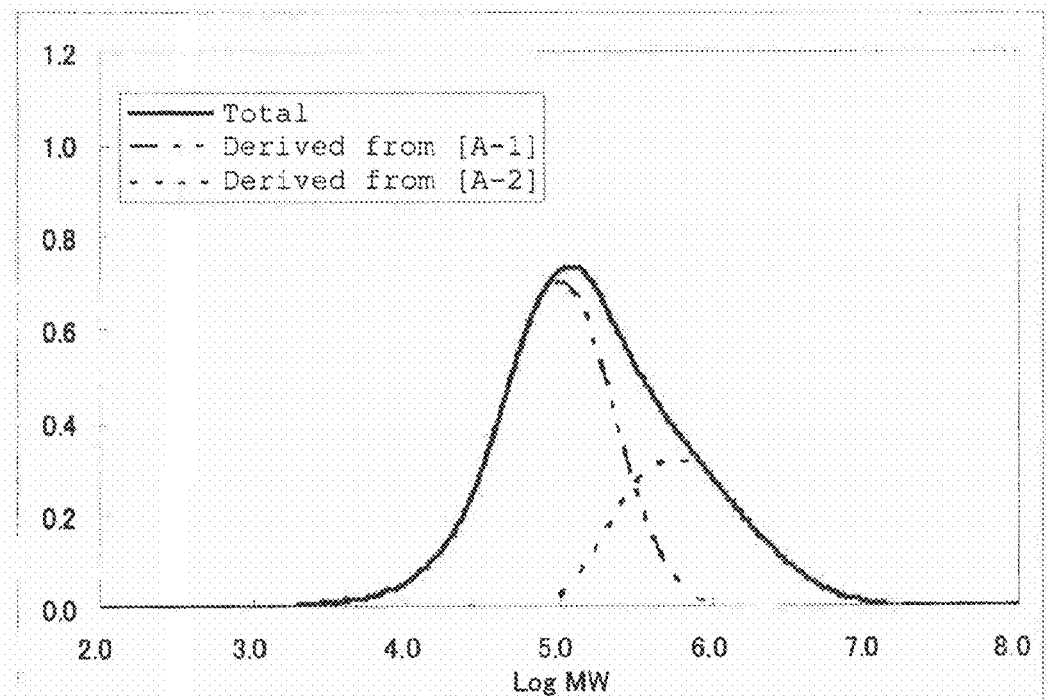
FIG. 3 is a drawing which shows one example of molecular weight distributions derived from [A-1] and derived from [A-2] in GPC.

FIG. 3 shows an example of molecular weight distributions derived from the above [A-1] and derived from the above [A-2].

Explanation will be given on relation between the branch number and the branch distribution. In order to improve melt property, the more branch numbers are generally considered to be necessary, and in the above Patent Literature 9 (JP-A-2007-154121), there has been disclosed a propylene homopolymer having the branch number of equal to or more than 0.1/per 1000 skeleton carbons.

However, strain hardening degree (λmax) in measurement of extensional viscosity of this disclosed propylene homopolymer is below 6.0, and as compared with the propylene-based polymer of the present invention having strain hardening degree (λmax) in measurement of extensional viscosity of equal to or higher than 6.0, improvement effect is not sufficient. This is because sufficient introduction of a desirable branch component is not attained due to production with a single complex, which means that improvement effect of melt property is small, even if the branch is simply high in average.

The propylene-based polymer of the present invention is one having significantly improved melt property due to introduction of the branch to the high molecular weight side as well, by a combination of a plurality of complexes, although the branch number (average value) is not necessarily high as compared with a conventional branch-type polymer.

In addition, explanation will be given on stereoregularity of a side chain. Stereoregularity of a main chain and a side chain is determined by ability of stereoregularity of [A-1] and [A-2] to be used, respectively. Low stereoregularity of the side chain results in decrease in whole crystallinity, even when the main chain has high crystallinity. Therefore, in order to obtain a highly rigid polymer, it is preferable that both of the main chain and the side chain have a high stereoregularity. That value, both in the main chain and the side chain is equal to or higher than 95% as mm fraction, particularly preferably equal to or higher than 96%, and still more preferably equal to or higher than 97%.

It is considered that stereoregularity of the side chain is the same as stereoregularity of a homopolymer of [A-1] alone. It should be noted that, explanation will be given in detail later on stereoregularity of the main chain and the side chain.

II. Property of the Propylene-Based Polymer

The propylene-based polymer of the present invention has a melt fluidity (melt drawability) or a melt tension under controlled, and excellent balance of property and melt workability. Explanation will be given on property of the propylene-based polymer of the present invention.

1. Melt Flow Rate (MFR)

The propylene-based polymer of the present invention is required to have, as shown by the above requirement (i), the melt flow rate (MFR) measured at a temperature of 230° C. and under a load of 2.16 Kg, of 0.1 g/10 minutes to 100 g/10 minutes.

MFR is an index showing fluidity, and increased molecular weight of a polymer decreases this value, on the other hand, decreased molecular weight increases this value. In general, the smaller value provides the poorer fluidity, resulting in no applicability to various moldings. Therefore, MFR is required to be equal to or larger than 0.1 g/10 minutes, preferably equal to or larger than 0.2 g/10 minutes and still more preferably equal to or larger than 0.3 g/10 minutes.

In addition, in general, increase in this value provides too smaller molecular weight, although provides better fluidity, and thus in a molded body, incurs poor mechanical property such as lowering of impact strength. Therefore, MFR is required to be equal to or smaller than 100 g/10 minutes, and preferably equal to or smaller than 60 g/10 minutes Further, the range of the preferable value depends on a molding method to be used, for example, in the case of use as a modifier of melt tension, the lower limit value is preferably equal to or larger than 0.1 g/10 minutes, and still more preferably equal to or larger than 0.5 g/10 minutes. On the other hand, the upper limit value is preferably equal to or smaller than 3.0 g/10 minutes, and still more preferably equal to or smaller than 1.0 g/10 minutes.

In addition, in the case of application to extrusion foam molding, the lower limit value is preferably equal to or larger than 0.5 g/10 minutes, and still more preferably equal to or larger than 1.0 g/10 minutes. On the other hand, the upper limit value is preferably equal to or smaller than 10 g/10 minutes, and still more preferably equal to or smaller than 3.0 g/10 minutes.

In addition, in the case of application to injection foam molding, the lower limit value is preferably equal to or larger than 1.0 g/10 minutes, and still more preferably equal to or larger than 3.0 g/10 minutes. On the other hand, the upper limit value is preferably equal to or smaller than 60 g/10 minutes, and still more preferably equal to or smaller than 30 g/10 minutes.

It should be noted that, melt flow rate (MFR) is a value measured under test condition: 230° C. and a load of 2.16 kgf, in accordance with JIS K6921-2, "Plastic-Materials for polypropylene (PP) molding and extrusion—the second part: A preparation method for a test piece and a determination method for property".

Melt flow rate (MFR) of the propylene-based polymer may be adjusted easily by changing of temperature or pressure condition for propylene polymerization, or by a method for the addition of a chain transfer agent such as hydrogen in polymerization, as the most general method.

2. Average Molecular Weight and Molecular Weight Distribution (Mw, Mn, Q Value) Measured with GPC The propylene-based polymer of the present invention is required to have, as shown by the above requirement (ii), the ratio of weight average molecular weight (Mw) and number average molecular weight (Mn), Mw/Mn (Q value), measured with gel permeation chromatography (GPC), of 3.5 to 10.5.

The Q value is an index showing breadth of molecular weight distribution, and the larger value means the wider molecular weight distribution. Too small Q value provides poor balance between melt drawability and workability, due to narrow distribution. Therefore, the Q value is required to be equal to or higher than 3.5, preferably higher than 4.0, and still more preferably higher than 4.5. On the other hand, too large Q value increases quantity of unnecessary (low) molecular weight components, and does not provide one with satisfactory property. Therefore, the Q value is required to be equal to or lower than 10.5, preferably below 8.0, and still more preferably below 7.5.

Average molecular weight and molecular weight distribution (Mw, Mn, Q value) of the propylene-based polymer measured with GPC, may be adjusted easily by changing of temperature or pressure condition for propylene polymerization, or by a method for the addition of a chain transfer agent such as hydrogen in polymerization, as the most general method. Further, they may be controlled by changing a kind of the metallocene complex, or in the case where two or more kinds of the complexes are used, they may be controlled by changing the quantity ratio thereof.

3. Skew of Breadth of Molecular Weight Distribution Obtained by a Molecular Weight Distribution Curve with GPC, to a High Molecular Weight Side It is desirable that the propylene-based polymer of the present invention has, as shown by the above requirement (ix), the $\alpha/\beta$ of larger than 0.9 and below 2.0, when $\alpha$ and $\beta$ are defined as $\alpha=H_{50}-Tp$ and $\beta=Tp-L_{50}$, respectively, wherein Tp represents common logarithm of molecular weight corresponding to a peak position, and $L_{50}$ and $H_{50}$ represent common logarithm of molecular weight at a position showing 50% height of the peak position ($L_{50}$ is value for a lower molecular weight side than Tp, and $H_{50}$ value for a higher molecular weight side than Tp), in a molecular weight distribution curve obtained by GPC. Here $\alpha/\beta$ is an index showing a skew of breadth of the molecular weight distribution to a high molecular weight side.

As for the breadth of the molecular weight distribution, it is shown by a molecular weight distribution curve obtained by GPC. That is, a graph is prepared where common logarithm of molecular weight (MW) and relative differential mass of a molecule corresponding to said MW are plotted to the abscissa axis and the longitudinal axis, respectively.

It should be noted that, molecular weight (MW) here is molecular weight of each molecule which composes a propylene homopolymer, and is one different from weight average molecular weight (Mw) of the propylene homopolymer. FIG. 1 is a drawing which shows one example of a molecular weight distribution curve. $\alpha$ and $\beta$ may be determined by the graph prepared. In the present invention, as described above, it is desirable that $\alpha/\beta$ is larger than 0.9 and below 2.0.

Usually, in the case where uniform polymerization is carried out with a catalyst having a single activated point, molecular weight distribution takes a form of the most probable distribution. $\alpha/\beta$ of this most probable distribution is calculated as 0.9.

Therefore, it means that molecular weight distribution of a propylene homopolymer of the present invention shows far more broadening to a higher molecular weight side, as compared with molecular weight distribution of a polymer obtained by uniform polymerization at a single activated site.

$\alpha/\beta$ of equal to or smaller than 0.9 decreases melt tension or swelling ratio due to insufficient quantity of relatively high molecular weight components, and deteriorates formability. For example, in carrying out extrusion foam molding, at a stage of formation of initial air bubbles, the lower viscosity forms the more air bubble nuclei, and thus presence of components with lower viscosity is preferable. On the other hand, a thin state due to formation of air bubble cells results in breakage of the foam unless that portion has enough strength, therefore high molecular weight components are required. To satisfy these circumstances, it is important that molecular weight distribution broadens more in the high molecular weight side rather than in the low molecular weight side.

Therefore, the propylene-based polymer of the present invention desirably has $\alpha/\beta$ larger than 0.9, preferably equal to or larger than 1.0, and still more preferably equal to or larger than 1.1.

On the other hand, $\alpha/\beta$ of equal to or larger than 2.0 deteriorates fluidity due to too high quantity of the high molecular weight components. In addition, in the case of carrying out foam molding, $\alpha/\beta$ of equal to or larger than 2.0 tends to inability of formation of sufficient air bubble cells at the initial stage of molding, due to increase in viscosity caused by too high quantity of the high molecular weight components. In addition, in the case of high rate drawing in molding, it incurs breakage of a molten body, what is called, deterioration of melt drawability.

Therefore the propylene-based polymer of the present invention desirably has $\alpha/\beta$ of below 2.0, preferably below 1.7, and still more preferably below 1.6.

It should be noted that, in a molecular weight distribution curve, two peaks may appear in some cases. In that case, the maximal peak may be replaced with the peak of the present invention. In addition, in the case where two $H_{50}$s appear, the peak of the present invention may be replaced with molecular weight at the highest molecular weight side. Similarly in the case where two $L_{50}$s appear, the peak of the present invention may be replaced with molecular weight at the lowest molecular weight side.

Skew of breadth of molecular weight distribution obtained by a molecular weight distribution curve of the propylene-based polymer measured with GPC, to a high molecular weight side, may be adjusted easily by selection of one which is enable to produce a high molecular weight polymer as one of the two kinds of the metallocene complexes to be used, and by control of quantity of hydrogen to be added in polymerization. In addition, the skew may be adjusted also by changing quantity ratio of two kinds of metallocene complexes to be used.

4. Ratio of Components with a Molecular Weight (M) of Equal to or Higher than 2,000,000, in a Molecular Weight Distribution Curve by GPC The propylene-based polymer of the present invention is required to have, as shown by the above requirement (iii), the ratio (W (equal to or higher than 2,000,000)) of components with a molecular weight (M) of equal to or higher than 2,000,000, in a molecular weight distribution curve obtained by GPC, of equal to or larger than 0.4% by weight and below 10% by weight, relative to total polymer weight.

The above ratio of equal to or higher than 2,000,000 (W (equal to or higher than 2,000,000) is an index showing ratio of very high molecular weight components contained in a polymer.

W (equal to or higher than 2,000,000), which is ratio of the above very high molecular weight components, is defined as a value, where integrated value for molecular weight (M) down to equal to or lower than 2,000,000 (Log(M)=6.3) is subtracted from 1, in an integrated molecular weight distribution curve (total quantity is normalized as 1) obtained by GPC. FIG. 1 shows an example of an integrated molecular weight distribution.

As described above, insufficient quantity of the high molecular weight components decreases melt tension and swell ratio and thus deteriorates molding workability. For example, in carrying out extrusion foam molding, it generates bubble breakage and does not increase independent air bubble ratio. Therefore high molecular weight components are required and in particular, containing of small quantity of the very high molecular weight components improves formability efficiently. It is considered that these very high molecular weight components contain branched components as described above.

Therefore, the propylene-based polymer of the present invention desirably requires to have W (equal to or higher than 2,000,000) of equal to or higher than 0.4% by weight, preferably equal to or higher than 1.0% by weight, and still more preferably equal to or higher than 2.0% by weight.

However, too high ratio of these components not only deteriorates fluidity, but also leads to gel generation caused by being very high molecular weight components, and raises a problem of impairing of appearance of a molded article. In addition, too high ratio of these components incurs breakage of a molten body, what is called, deterioration of melt drawability, in the case of high rate stretching in molding.

Accordingly, it is necessary that the propylene-based polymer of the present invention desirably has the W (equal to or higher than 2,000,000) of below 10% by weight, preferably below 6.0% by weight, and still more preferably below 5.0% by weight.

Ratio of components with a molecular weight (M) of equal to or higher than 2,000,000, of the propylene-based polymer, in a molecular weight distribution curve with GPC may be adjusted easily by selection of one which is enable to produce a high molecular weight polymer as the metallocene complex to be used, and by control of quantity ratio to the metallocene complex for producing the low molecular weight side, hydrogen to be added in propylene polymerization or polymerization temperature.

Hitherto, explanation was given on adjustment methods for molecular weight of the propylene-based polymer, such as MFR, Q value, $\alpha/\beta$ and ratio of components with a molecular weight (M) of equal to or higher than 2,000,000. For example, a common control method includes control of hydrogen quantity. Increase in hydrogen quantity tends to increase MFR of the propylene-based polymer, and tends to decrease MFR, Q value, $\alpha/\beta$, ratio of components with a molecular weight (M) of equal to or higher than 2,000,000.

On the other hand, MFR may be increased also by a method for increasing a polymerization temperature, or decreasing a monomer partial pressure, and in that case, although ratio of components having a molecular weight (M) of equal to or higher than 2,000,000 decreases, Q value and $\alpha/\beta$ receive little influence. In addition, ratio of components with a molecular weight (M) of equal to or higher than 2,000,000 relative to MFR, may be controlled by changing the quantity or kind of the metallocene complex which generates the high molecular weight side. In this way, control of these prescriptions is possible by changing the catalyst to be used or polymerization condition.

Any of the above defined weight average molecular weight (Mw), Q value, $\alpha/\beta$ and W value (equal to or higher than 2,000,000) is one obtained by gel permeation chromatography (GPC), and detailed measurement methods, and measurement instrument thereof are as follows:

Apparatus: GPC (ALC/GPC, 150 C), manufactured by Waters Co., Ltd.
Detector: MIRAN, 1A, IR detector (measurement wavelength: 3.42 μm), manufactured by FOXBORO Co., Ltd.
Column: AD806M/S (three sets), manufactured by SHOWA DENKO K.K.
Moving phase solvent: o-dichlorobenzene (ODCB)
Measurement temperature: 140° C.
Flow rate: 1.0 mL/min.
Injection volume: 0.2 mL
Preparation of a sample is carried out by preparing a 1 mg/mL solution by dissolving the sample by using ODCB (containing 0.5 mg/mL of BHT), while taking about 1 hour at 140° C.

Figure 2:
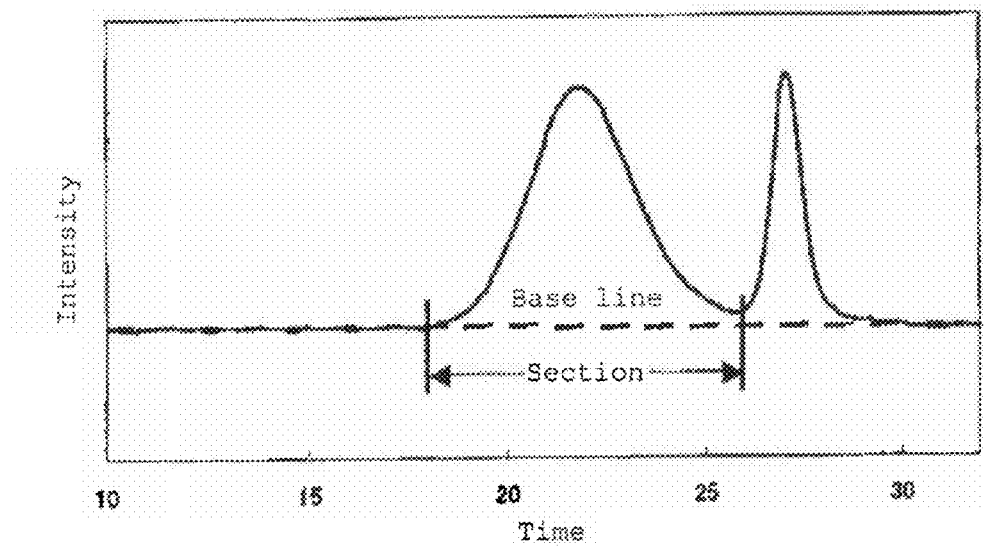
FIG. 2 is a drawing which explains a base line and a section of a chromatogram in GPC.

It should be noted that, a base line and a section of the obtained chromatogram are as shown in FIG. 2.

In addition, conversion to molecular weight from retention volume obtained in GPC measurement is carried out by using a calibration line, prepared in advance, with standard polystyrene samples. All of the standard polystyrene samples to be used are the following grades of Tosoh Corp.:

Grades: F380, F288, F128, F80, F40, F20, F10, F4, F1, A5000, A2500, and A1000

The calibration curve is prepared by injecting 0.2 mL of a solution, where each sample is dissolved in ODCB (containing 0.5 mg/mL of BHT) so as to be 0.5 mg/mL. For the calibration curve, cubic polynomial obtained by approximation with the least square method, is used.

In a viscosity equation: $[\eta]=K\times M^{\alpha}$ used for conversion to molecular weight, the following numerical values are used:

PS: $K=1.38\times10^{-4}$, $\alpha=0.7$

PP: $K=1.03\times10^{-4}$, $\alpha=0.78$

5. Temperature Rising Elution Fractionation (TREF) by o-Dichlorobenzene (ODCB)

The propylene-based polymer of the present invention, for example, a propylene homopolymer, is required to have, as shown by the above requirement (iv), the components, which elute at a temperature of equal to or lower than 40° C., of equal to or less than 3.0% by weight, in an elution curve obtained by measurement of temperature rising elution fractionation (TREF).

Components which elute at a temperature of equal to or lower than 40° C. are those having low crystallinity, and high quantity of these components decreases crystallinity of a product as a whole and decreases mechanical strength such as rigidity of a product.

Therefore, it is necessary that this quantity is equal to or lower than 3.0% by weight, preferably equal to or lower than 2.0% by weight, and still more preferably equal to or lower than 1.0% by weight, and particularly preferably equal to or lower than 0.5% by weight.

In general, temperature rising elution fractionation (TREF) by o-dichlorobenzene (ODCB) of the propylene-based polymer is possible to suppress low by using a metallocene complex, however, it is necessary to maintain purity of the catalyst at equal to or higher than a certain level, as well as not to raise temperature extremely high as reaction condition in producing the catalyst or polymerization, or not to excessively increase quantity ratio of an organoaluminum, relative to the metallocene complex.

Detail of the measurement method for elution components by temperature rising elution fractionation (TREF) is as follows:

A sample is dissolved in o-dichlorobenzene at 140° C. to prepare a solution. After introduction of this solution into a TREF column at 140° C., it is cooled to 100° C. at a temperature decreasing rate of 8° C./min, and subsequently cooled to 40° C. at a temperature decreasing rate of 4° C./min, and held for 10 minutes. After that, o-dichlorobenzene of solvent is flown into the column at a flow rate of 1 mL/min, to elute, for 10 minutes, components which are dissolved in o-dichlorobenzene at 40° C. in the TREF column and then the column temperature is raised linearly up to 140° C., at a temperature rising rate of 100° C./hr, to obtain an elution curve.

Column size: 4.3 mmϕ×150 mm
Filling material into the column: surface deactivation treated glass beads with 100 μm
Solvent: o-dichlorobenzene
Sample concentration: 5 mg/mL
Sample injection volume: 0.1 mL
Solvent flow rate: 1 mL/min
Detector: MIRAN, 1A, a wavelength fixed-type IR detector, manufactured by FOXBORO Co., Ltd.
Measurement wavelength: 3.42 μm 6. Isotactic Triad Fraction (mm) Measured with $^{13}$C-NMR The propylene-based polymer of the present invention is one having, as shown by the above requirement (v), the mm fraction of triads of a propylene unit obtained by $^{13}$C-NMR, of equal to or higher than 95%.

In a polymer chain, mm fraction is ratio of triads of propylene units, where direction of methyl branch in each propylene unit is the same, in triads of arbitrary propylene units composed of head-tail bonding in a polymer chain. This mm fraction is a value showing that a stereo structure of a methyl group in a polypropylene molecular chain is controlled in an isotactic state, and the higher value means to be controlled in the higher degree.

The mm fraction lower than this value lowers mechanical property such as lowering of elastic modulus of a product. Therefore, the mm fraction is preferably equal to or higher than 96%, and still more preferably equal to or higher than 97%.

In addition, stereoregularity of the main chain and the side chain is determined by ability of stereoregularity of the catalyst components [A-1] and [A-2] to be used in the production method for the propylene-based polymer to be described later. Low stereoregularity of the side chain results in decrease in whole crystallinity, even when the main chain has high crystallinity. Therefore, in order to obtain a highly rigid polymer, it is preferable that both of the main chain and the side chain have high stereoregularity. That value, both in the main chain and the side chain is equal to or higher than 95%, as mm fraction, particularly preferably equal to or higher than 96%, and still more preferably equal to or higher than 97%.

Isotactic triad fraction (mm) of the propylene-based polymer measured with $^{13}$C-NMR, may be adjusted easily by selection of a metallocene catalyst to be used or polymerization temperature.

Detail of a measurement method for mm fraction of the triads of a propylene unit by $^{13}$C-NMR is as follows:

It was measured by a proton complete decoupling method at 125° C., after complete dissolution of 375 mg of a sample into 2.5 mL of deuterated 1,1,2,2-tetrachloroethane, in an NMR sample tube (10 mmϕ). As for chemical shift, a center peak of three peaks of deuterated 1,1,2,2-tetrachloroethane was set at 74.2 ppm. Chemical shifts of other carbon peaks are based on this as standard.

Flip angle: 90°
Pulse interval: 10 sec.
Resonance frequency: equal to or higher than 100 MHz
Integration times: equal to or more than 10,000 times
Observation region: from −20 ppm to 179 ppm
Numbers of Data point: 32768

Measurement of mm fraction is carried out by using $^{13}$C-NMR spectra measured under the above condition.

Assignment of spectra was carried out with reference to Macromolecules, (1975), vol. 8, p. 687, or Polymer, vol. 30, p. 1350 (1989).

Explanation will be given below on a more specific method for determination of the mm fraction.

Peaks derived from the methyl group of the center propylene in the head-tail bonded triads, with a propylene unit as the center, appear in three regions, in response to configuration thereof.

mm: from about 24.3 to about 21.1 ppm
mr: from about 21.2 to about 20.5 ppm
rr: from about 20.5 to about 19.8 ppm Chemical shift range of each region may shift a little bit depending on molecular weight or a copolymer composition, however, identification of the above three regions is easy.

Here, mm, mr and rr are each represented by the following structures:

[Chemical formula 7]

Structural formula (3-a)

$$\text{mm:} \quad -\underset{\underset{\text{CH}_3}{|}}{\text{CH}}-\text{CH}_2-\underset{\underset{\text{CH}_3}{|}}{\text{CH}}-\text{CH}_2-\underset{\underset{\text{CH}_3}{|}}{\text{CH}}-\text{CH}_2-$$

Structural formula (3-b)

$$\text{mr:} \quad -\underset{\underset{\text{CH}_3}{|}}{\text{CH}}-\text{CH}_2-\underset{\underset{\text{CH}_3}{|}}{\text{CH}}-\text{CH}_2-\underset{\underset{\text{CH}_3}{|}}{\text{CH}}-\text{CH}_2-$$

Structural formula (3-c)

$$\text{rr:} \quad -\underset{\underset{\text{CH}_3}{|}}{\text{CH}}-\text{CH}_2-\underset{\underset{\text{CH}_3}{|}}{\text{CH}}-\text{CH}_2-\underset{\underset{\text{CH}_3}{|}}{\text{CH}}-\text{CH}_2-$$

The mm fraction is calculated from the following numerical expression (I):

mm fraction=peak area of mm region/(peak area of mm region+peak area of mr region+peak area of rr region)×100[%]  (I)

In addition, the propylene-based polymer of the present invention may have the following partial structure including an ethylene unit:

[Chemical formula 8]

Structural formula (4-a)

$$\text{PPE:} \quad -\underset{\underset{\text{CH}_3}{|}}{\text{CH}}-\text{CH}_2-\underset{\underset{\text{CH}_3}{|}}{\text{CH}}-\text{CH}_2-\text{CH}_2-\text{CH}_2-$$

Structural formula (4-b)

$$\text{EPE:} \quad -\text{CH}_2-\text{CH}_2-\underset{\underset{\text{CH}_3}{|}}{\text{CH}}-\text{CH}_2-\text{CH}_2-\text{CH}_2-$$

Because a methyl group (a PPE-methyl group) of a center propylene unit of the partial structure PPE resonates at the mr region near 20.9 ppm, and a methyl group (an EPE-methyl group) of a center propylene unit of the partial structure EPE resonates at the rr region near 20.2 ppm, in the case of having such partial structures, it is necessary to subtract peak areas based on the PPE-methyl group and the EPE-methyl group from peak areas of both mr and rr regions. The peak area based on the PPE-methyl group may be evaluated by a peak area of a corresponding methyne group (which resonates at near 31.0 ppm), and the peak area based on the EPE-methyl group may be evaluated by a peak area of a corresponding methyne group (which resonates at near 33.3 ppm).

In addition, a partial structure containing a site irregular unit may have, in some cases, the following structure (5-a), structure (5-b), structure (5-c) and structure (5-d):

[Chemical formula 9]

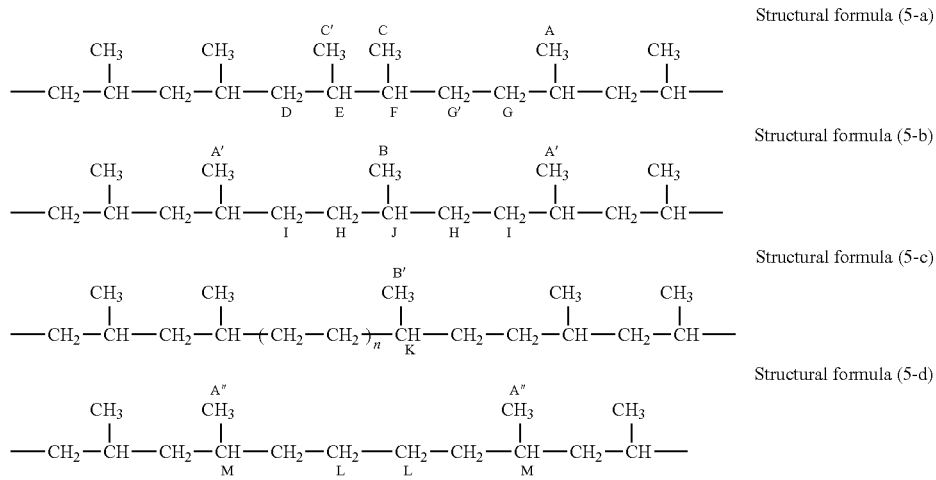

Structural formula (5-a)

Structural formula (5-b)

Structural formula (5-c)

Structural formula (5-d)

Among these, carbons A, A' and A" peaks appear at the mr region, carbons B and B' peaks appear at the rr region, and further, carbons C and C' peaks appear at 16.8 to 17.8 ppm.

Therefore, in calculation of mm fraction in the expression (I), it is necessary to subtract peak areas based on carbons A, A', A", B and B', which are peaks not based on head-tail bonded triads and appear at the mr and rr regions, from peak area of the mr region and peak area of the rr region, respectively.

Peak area based on carbon A may be evaluated as ¼ of sum of peak areas of carbon D (which resonates at near 42.4 ppm), carbons E and G (which resonate at near 36.0 ppm) and carbon F (which resonates at near 38.7 ppm) of the site irregular partial structure [structure (5-a)].

Peak area based on carbon A' may be evaluated as sum of ⅖ of sum of peak areas of carbons H and I (which resonate at near 34.7 ppm and near 35.0 ppm) of the site irregular partial structure [structure (5-b) and structure (5-c)] and peak area of carbon J (which resonates at near 34.1 ppm), and peak area of carbon K (which resonates at near 33.7 ppm).

Peak area based on carbon A" may be evaluated as sum of peak areas of carbons L (which resonate at near 27.7 ppm) of the site irregular partial structure [structure (5-d)].

Peak area based on carbon B may be evaluated by carbon J. In addition, Peak area based on carbon B' may be evaluated by carbon K.

It should be noted that, sites of carbon C peak and carbon C' peak are not necessary to be considered, because of no participation to the mm, mr and rr regions to be noticed.

In this way, peak areas of mm, mr and rr may be evaluated, therefore, mm fraction of head-tail bonded triads, with a center of a propylene unit, may be determined in accordance with the above numerical expression (I).

7. A Strain Hardening Degree (λmax) in Measurement of Extensional Viscosity

The propylene-based polymer of the present invention is required to have, as shown by the above requirement (vi), the strain hardening degree (λmax), in measurement of extensional viscosity, of equal to or higher than 6.0.

The strain hardening degree (λmax) is an index showing melt strength, and higher value provides enhancement effect of melt tension. As a result, for example, it provides little uneven thickness in blow molding. In addition, it may increase ratio of independent air bubbles in carrying out foam molding.

Therefore, this strain hardening degree is required to be equal to or larger than 6.0, preferably equal to or larger than 10.0 and more preferably equal to or larger than 15.0.

In addition, this strain hardening degree is an index showing nonlinearity of extensional viscosity, and usually it is said that the more molecular entanglement provides the higher value. The molecular entanglement receives influence of branch quantity and length of a branch chain.

Therefore, the more branch quantity and the longer branch length increase the more strain hardening degree.

In addition, because even $^{13}$C-NMR, which is considered at present a method for evaluation of the branch with the highest sensitivity, it is difficult to directly evaluate a branch structure, the strain hardening degree was used as an index of the branch, instead of its method.

In general, to exhibit high strain hardening degree, it is required for branch length to be equal to or higher than 7,000, which is the entanglement molecular weight of polypropylene. It corresponds to equal to or more than about 400, as equivalent number of skeleton carbons. The skeleton carbons here mean all carbon atoms other than methyl carbons. It is considered that the longer branch length enhances melt property the more. In particular, it is considered that introduction of the longer branch chain provides detection of the strain hardening even at the slower strain rate region, in measurement of extensional viscosity.

Therefore, branch chain length of the propylene-based polymer of the present invention is, as described above, equal to or more than 500 (equivalent value of molecular weight of polypropylene: 11,000) as the skeleton carbon number, preferably equal to or more than 1000 (equivalent value of molecular weight of polypropylene: 21,000) as the skeleton carbon number, and still more preferably equal to or more than 2000 (equivalent value of molecular weight of polypropylene: 42,000) as the skeleton carbon number.

Equivalent value of molecular weight of polypropylene here is one different from molecular weight value measured with GPC, in strict meaning, however, it is close to number average molecular weight (Mn) measured with GPC.

Therefore, the branch length of the propylene-based polymer of the present invention may be substituted with number average molecular weight (Mn) measured with GPC, to be equal to or higher than 11,000, preferably equal to or higher than 21,000, and still more preferably equal to or higher than 42,000.

The strain hardening degree ($\lambda$max) in measurement of extensional viscosity of propylene-based polymer may be increased to equal to or higher than 6.0, by selection of two kinds metallocene catalysts which compose a catalyst to be used in propylene polymerization, or by controlling of quantity ratio thereof or condition of preliminary polymerization. That is, the selection is made so that one of the two kinds of the metallocene catalysts is one which easily generates a macromer, and the other is one which easily incorporates the macromer into a polymer, and also enables to generate a polymer with high molecular weight. Further, by carrying out a preliminary polymerization, long-chains are distributed uniformly among polymer particle.

Here, as for a measurement method for the stain hardening degree, any method may provide the same value in principle, as long as it enables to measure one-axial extensional viscosity, and for example, a detailed measurement method and a measurement apparatus include a method described in known literature, Polymer, 42 (2001), 8663, and preferable measurement method and measurement apparatus include the following:

A Measurement Method 1:
  Apparatus: Ares, manufactured by Rheometorics Co., Ltd.
  Tool: Extensional viscosity Fixture, manufactured by T. A. Instrument Co., Ltd.
  Measurement temperature: 180° C.
  Strain rate: 0.1/sec
  Preparation of a test piece: to prepare a sheet with a size of 18 mm*10 mm and a thickness of 0.7 mm, by press molding.

A Measurement Method 2:
  Apparatus: Melten Rheometer, manufactured by TOYO SEIKI Co., Ltd.
  Measurement temperature: 180° C.
  Strain rate: 0.1/sec
  Preparation of a test piece: to prepare an extrusion strand in a rate of 10 to 50 mm/min, by using Capyrograph, manufactured by TOYO SEIKI Co., Ltd., and an orifice with an inner diameter of 3 mm, at 180° C.

A Calculation Method:
  Extensional viscosity $\eta_E$ (Pa·sec), in the case of a strain rate of 0.1/sec, is plotted in the longitudinal axis, and time t (sec) in abscissa axis, in a double logarithm chart. On this double logarithmic axis, by drawing the straight line just before generating strain hardening, $\eta$lin is determined as the extrapolated value at the time when the measured elongational viscosity $\eta E$ reaches maximum ($\eta$max) within the strain amount 4.0.

Figure 4:
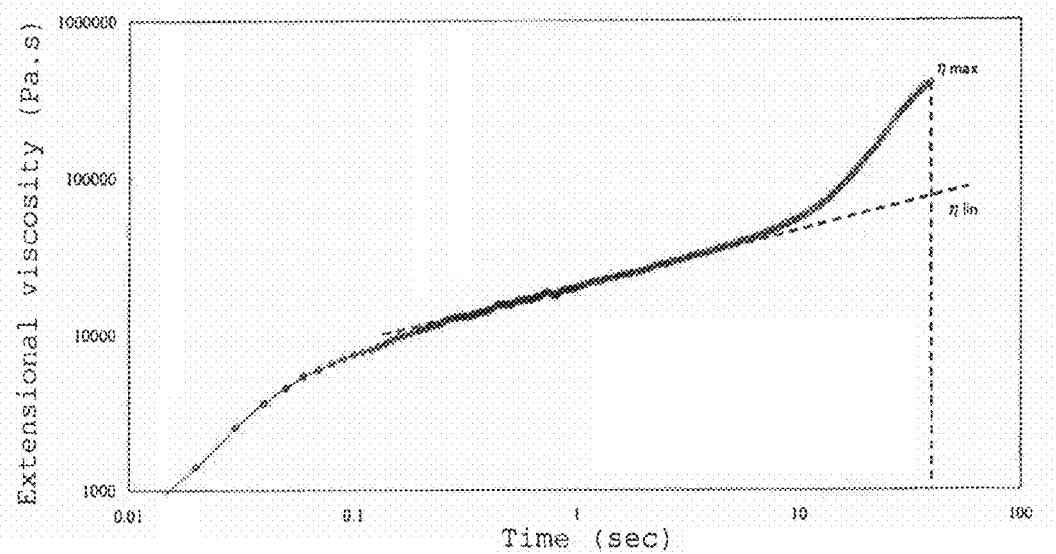
FIG. 4 is a plot diagram which shows an example of extensional viscosity measured with a one-axis extensional viscometer.

FIG. 4 is one example of a plot diagram of extensional viscosity. By defining a $\eta$max/$\eta$lin as $\lambda$max, it is used as an index of strain hardening degree.

It should be noted that, measurement is possible in a strain rate range of 0.001/sec to 10.0/sec, and strain hardening degree changes with difference of the strain rate. It is considered that dependency of this strain hardening degree on strain rate changes by form or length of branches introduced.

8. Memory Effect (ME)

The propylene-based polymer of the present invention, as described in the above requirement (viii), desirably has memory effect (ME) satisfying the following formula (I-1).

$$(ME) \geq 0.26 \times \log(MFR) + 1.9 \quad (I\text{-}1)$$

[wherein, a polymer is obtained by extrusion from an orifice, by using a melt indexer having an orifice length of 8.00 mm and a diameter of 1.00 mm$\phi$, under setting a temperature in cylinder at 190° C., under load and at an extrusion rate of 0.1 g/minute, and then quenching in ethanol, and ME (memory effect) is defined as value of diameter of thus extruded strand divided with diameter of the orifice].

The propylene-based polymer of the present invention is preferably characterized in that correlation between memory effect (ME) as an index exhibiting a presence ratio of high molecular weight components in a polymer, and MFR as an index exhibiting an average molecular weight of the polymer, satisfies a specific relation (the above formula (I-1)).

ME is an index exhibiting the non-Newtonian property of a polymer, and the large ME shows presence of a component with long relaxation time in the polymer. That is, in the case of having large ME under the same MFR, it means distribution of a component with longer relaxation time in the polymer.

In addition, it has been known empirically that ME has the first order relation with Log(MFR), and in general, the larger molecular weight (that is, the smaller MFR value) increases ME value the more.

Figure 5:
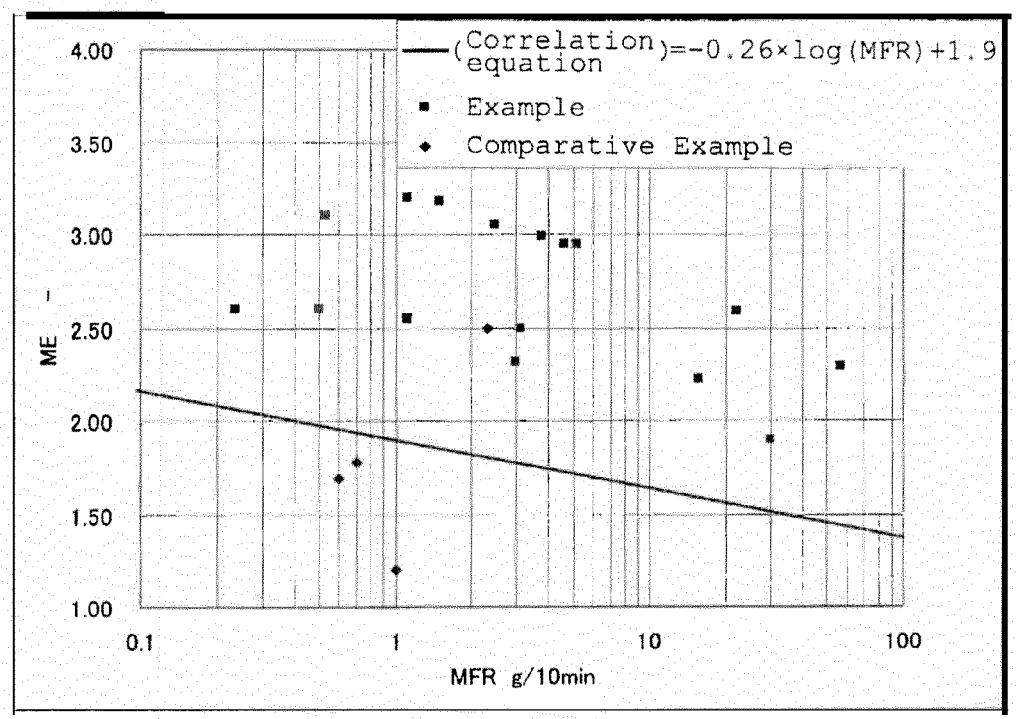
FIG. 5 is a drawing which explains correlation between ME (memory effect) and MFR.
Figure 6:
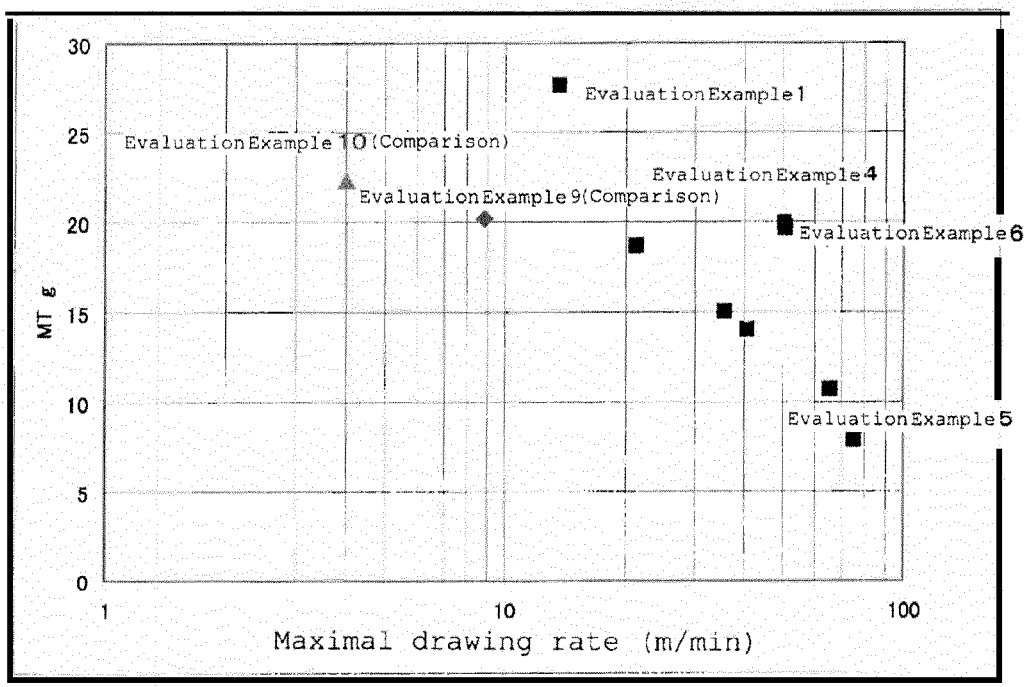
FIG. 6 is a drawing which explains correlation between melt tension and maximal drawing rate.

The propylene-based polymer of the present invention is characterized, as shown in FIG. 5, by having higher ME, which corresponds to MFR, as compared with a conventionally known polymer, due to presence of branch components in a polymer chain. It has been known that increase in quantity of components with long relaxation time provides excellent forming characteristics such as large swell and suppression of flow mark generation in injection molding, and the propylene-based polymer of the present invention is excellent in forming characteristics. More preferably the propylene-based polymer of the present invention is characterized by satisfying the following formula (I-2):

$$(ME) \geq -0.26 \times \log(MFR) + 2.20 \quad (I\text{-}2)$$

and still more preferably by satisfying the following formula (I-3):

$$(ME) \geq -0.26 \times \log(MFR) + 2.40 \quad (I\text{-}3)$$

A measurement method for memory effect (ME) is as follows: A polymer is extruded from an orifice, by using a melt indexer, manufactured by TAKARA THERMISTOR INSTRUMENTS Co., Ltd., having a diameter of 1.0 mm$\phi$ and a length of 8.00 mm, at 190° C., under load and an extrusion rate of 0.1 g/minute, and then it is quenching in ethanol, and ME is defined as value of diameter of thus extruded strand divided with diameter of the orifice.

9. Melt Tension and Melt Drawability

The propylene-based polymer of the present invention has, as described in the above requirement (x) or (xi), a controlled branch structure (branch quantity, branch length, branch distribution), therefore has extremely improved melt property. That is, it has excellent melt drawability while having high melt tension. Indices of melt tension and melt drawability may be represented by balance between melt tension (MT) and maximal drawing rate (MaxDraw), measured by the following measurement methods.

Explanation will be given on measurement methods for melt tension (MT) and maximal drawing rate (MaxDraw).

Tension detected by a pulley, when a resin is extruded in a strand state and drawn on a roller, under the following condition by using Capyrograph 1B manufactured by TOYO SEIKI Co., Ltd., is defined as melt tension (MT).

Capillary: a diameter of 2.1 mm
Cylinder diameter: 9.6 mm
Extrusion rate from the cylinder: 10 mm/min.
Drawing rate: 4.0 m/min.
Temperature: 230° C.

In addition, drawing rate just before the strand is cut, when the drawing rate is gradually increased from 4.0 m/min (acceleration: 5.4 cm/sec$^2$), is defined as maximal drawing rate (MaxDraw).

Here, the larger MT value means the higher melt tension, and the larger MaxDraw means the better fluidity and extension property.

The propylene-based polymer of the present invention has improved melt tension due to having wide molecular weight distribution and introduction of branches, therefore, MT is equal to or higher than 5 g, preferably equal to or higher than 10 g, and still more preferably equal to or higher than 15 g.

In addition, as described above, increase in high molecular weight components or branch number enables to increase the MT value, however, by contraries, excessive increase in the high molecular weight components in a polymer, or skew of the branches may incur breakage of the strand due to too high viscosity during drawing, and does not increase MaxDraw. That is, it results in deterioration of melt drawability.

The propylene-based polymer of the present invention enables to have high MaxDraw while maintaining high MT, due to control of branch components, and thus have improved balance between melt tension and melt drawability.

Therefore, the propylene-based polymer of the present invention has a MaxDraw of equal to or higher than 10 m/min, preferably equal to or higher than 20 m/min, and still more preferably equal to or higher than 30 m/min.

As explained above, the propylene-based polymer of the present invention is a long-chain-branch-type having controlled melt drawability or melt tension, and excellent balance between property and workability. As compared with a conventional propylene-based polymer, for example, as described above, although a propylene homopolymer having a branch number of equal to or higher than 0.1/1000 skeleton carbons, has been disclosed in Patent Literature 9 (JP-A-2007-154121), it has strain hardening degree (λmax) of below 6.0 in measurement of extensional viscosity, and thus has insufficient improvement effect of melt property, when compared with the strain hardening degree (λmax) of equal to or higher than 6.0 in measurement of extensional viscosity of the propylene-based polymer of the present invention. In addition, in commercial polypropylene (high melt tension type polypropylene, "PF814", manufactured by Basel Co., Ltd.), which has high long-chain-branch degree due to cross-linking by irradiation with electron beams, branched carbon with the above described structural formula (1) is not detected, and isotactic triad fraction (mm) measured with $^{13}$C-NMR is low (92.5%), and further, it is considered that molecular scission or isomerization occurs inevitably at the same time of cross-linking in irradiation with electron beams, resulting in increase in solvent soluble components. In addition, as other general method for controlling the molding workability characteristics, control by widening of molecular weight distribution is carried out, however, the case of widening of molecular weight distribution results in increase in quantity of low molecular weight components, which then generates demerit such as deterioration of surface characteristics of a molded body, decrease in mechanical property, and decrease in heat sealing property.

However, in the propylene-based polymer of the present invention, because control of widening of molecular weight distribution is carried out by introduction of branches, and because of increase in high molecular weight components without increase in low molecular weight components, the above demerit is not generated.

In this way, because the propylene-based polymer of the present invention is a long-chain-branch-type, it provides controlled melt drawability or melt tension, and excellent balance between property and workability, not observed in a conventional propylene-based polymer.

III. A Production Method for the Propylene-Based Polymer

A production method for the propylene-based polymer of the present invention is not especially limited as long as it is a method for obtaining a long-chain-branch-type propylene-based polymer, having controlled melt drawability or melt tension, and excellent balance between property and workability, which is characteristics of the present invention, and includes, for example, a method for using of a plurality of complexes, as follows, as a method for introduction of controlled branch components.

That is, there is included a method for producing the above long-chain-branch-type propylene-based polymer, characterized in that polymerization of propylene is carried out in the presence of a catalyst having at least the following components (A) to (C):

(A): at least two kinds of transition metal compounds selected from the following components [A-1] and [A-2], which are transition metal compounds of group IV of the periodical Table, provided that ratio of mole quantity of [A-1] is 0.30 to 0.99, relative to total mole quantity of components [A-1] and [A-2];

(B): an ion-exchangeable layered silicate salt; and (C): an organoaluminum.

Explanation will be given below in detail on the catalyst components [A], [B] and [C].

(1) The Catalyst Component (A)

As the component (A), at least two kinds of transition metal compounds selected from the following component [A-1] and component [A-2] are used.

That is, in this case, it means to use two or more kinds of transition metal compounds selected from at least one kind from the [A-1] and at least one kind from the [A-2], and it is preferable to use each one kind from the component [A-1] and component [A-2]. In addition, together with this each one kind, further other metallocene compound than the component [A-1] or component [A-2] may be used in combination.

(i) The Component [A-1]: a Compound Represented by the General Formula (a1)

[Chemical formula 10]

General formula (a1)

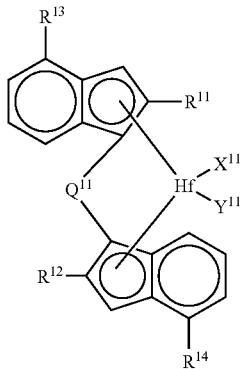

[Wherein, $Q^{11}$ represents a bonding group for cross-linking two conjugated five-member ring ligands, which is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20, Hf represents hafnium, $X^{11}$ and $Y^{11}$ each independently represent hydrogen, a halogen group, a hydrocarbon group with carbon atoms of 1 to 20, an alkoxy group with carbon atoms of 1 to 20, an alkylamide group with carbon atoms of 1 to 20, a trifluoromethanesulfonic acid group, a phosphorous-containing hydrocarbon group with carbon atoms of 1 to 20, or a silicon-containing hydrocarbon group with carbon atoms of 1 to 20. $R^{11}$ and $R^{12}$ each independently represent monocyclic or polycyclic hetero aromatic group with carbon atoms of 4 to 20, which may contain a silicon or a halogen, containing a hetero atom selected from the group consisting of an oxygen atom, a sulfur atom, a nitrogen atom, a boron atom and a phosphorous atom, in a five-member or six-member ring, and $R^{13}$ and $R^{14}$ each independently represent an aryl group with carbon atoms of 6 to 30, which may contain a halogen, silicon, oxygen, sulfur, nitrogen, boron, phosphorous, or a plurality of hetero elements selected from these.]

In the general formula (a1), $Q^{11}$ represents a bonding group for cross-linking two conjugated five-member ring ligands, which is bi-valent hydrocarbon group with carbon atoms of 1 to 20, silylene group having a hydrocarbon group with carbon atoms of 1 to 20, or germirene group having a hydrocarbon group with carbon atoms of 1 to 20, and preferably, substituted silylene group or substituted germirene group. The substitution group bonding to silicon and germanium is preferably hydrocarbon group with carbon atoms of 1 to 12, and two substitution groups may be bonded together. A specific example thereof includes methylene, dimethylmethylene, ethylene-1,2-diyl, dimethylsilylene, diethylsilylene, diphenylsilylene, methylphenylsilylene, 9-silafluorene-9,9-diyl, dimethylsilylene, diethylsilylene, diphenylsilylene, methylphenylsilylene, 9-silafluorene-9,9-diyl, dimethylgermirene, diethylgermirene, diphenylgermirene, methylphenylgermirene or the like.

In the general formula (a1), $X^{11}$ and $Y^{11}$ are auxiliary ligands for generation of activated metallocene, having ability of olefin polymerization, by a reaction with a promoter of the component [B]. Therefore, kind of ligands of $X^{11}$ and $Y^{11}$ are not especially limited, as long as this object is attained, and each independently represent hydrogen, halogen group, hydrocarbon group with carbon atoms of 1 to 20, alkoxy group with carbon atoms of 1 to 20, alkylamide group with carbon atoms of 1 to 20, trifluoromethanesulfonic acid group, phosphorous-containing hydrocarbon group with carbon atoms of 1 to 20, or silicon-containing hydrocarbon group with carbon atoms of 1 to 20.

In the general formula (a1), $R^{11}$ and $R^{12}$ each independently represent monocyclic or polycyclic hetero aromatic group with carbon atoms of 4 to 20, which may contain silicon or a halogen, containing, in a five-member or six-member ring, a hetero atom selected from the group consisting of oxygen atom, sulfur atom, nitrogen atom, boron atom and phosphorous atom, and the hetero aromatic group preferably has a five-member ring structure, and the hetero atom is preferably oxygen atom, sulfur atom and nitrogen atom, particularly preferably oxygen atom and sulfur atom, and still more preferably oxygen atom. As a specific example of the five-member ring structure having an oxygen atom, there is included 2-furyl, 2-(5-methylfuryl), 2-(5-ethylfuryl), 2-(5-n-propylfuryl), 2-(5-n-butylfuryl), 2-(5-i-propylfuryl), 2-(5-i-butylfuryl), 2-(5-t-butylfuryl), 2-(5-cyclopentylfuryl), 2-(5-cyclohexylfuryl), 2-(5-trimethylsilylfuryl), 2-(5-phenylfuryl), 2-(4,5-dimethylfuryl), 2-benzofuryl or the like.

In the general formula (a1), $R^{13}$ and $R^{14}$ each independently represent an aryl group with carbon atoms of 6 to 30, which may contain halogen, silicon, oxygen, sulfur, nitrogen, boron, phosphorous, or a plurality of hetero elements selected from these. As a preferable example, there is included phenyl, 2-methylphenyl, 3-methylphenyl, 4-methylphenyl, 4-ethyl phenyl, 4-i-propylphenyl, 4-t-butylphenyl, 4-trimethylsilylphenyl, 4-(biphenylyl), 4-(2-fluorobiphenylyl), 1-naphthyl, 2-naphthyl or the like.

Among compounds represented by the above general formula (a1), as a preferable compound, an exemplification may be given specifically below
dichloro[1,1'-dimethylsilylenebis{2-(2-furyl)-4-phenyl-indenyl}]hafnium,
dichloro[1,1'-dimethylsilylenebis{2-(2-thienyl)-4-phenyl-indenyl}]hafnium,
dichloro[1,1'-dimethylsilylenebis{2-(5-methyl-2-furyl)-4-phenyl-indenyl}]hafnium,
dichloro[1,1'-diphenylsilylenebis{2-(5-methyl-2-furyl)-4-phenyl-indenyl}]hafnium,
dichloro[1,1'-dimethylgermirenebis{2-(5-methyl-2-furyl)-4-phenyl-indenyl}]hafnium,
dichloro[1,1'-dimethylgermirenebis{2-(5-methyl-2-thienyl)-4-phenyl-indenyl}]hafnium,
dichloro[1,1'-dimethylsilylenebis{2-(5-t-butyl-2-furyl)-4-phenyl-indenyl}]hafnium,
dichloro[1,1'-dimethylsilylenebis{2-(5-trimethylsilyl-2-furyl)-4-phenyl-indenyl}]hafnium,
dichloro[1,1'-dimethylsilylenebis{2-(5-phenyl-2-furyl)-4-phenyl-indenyl}]hafnium,
dichloro[1,1'-dimethylsilylenebis{2-(4,5-dimethyl-2-furyl)-4-phenyl-indenyl}]hafnium,
dichloro[1,1'-dimethylsilylenebis{2-(2-benzofuryl)-4-phenyl-indenyl}]hafnium,
dichloro[1,1'-diphenylsilylenebis{2-(5-methyl-2-furyl)-4-phenyl-indenyl}]hafnium,
dichloro[1,1'-dimethylsilylenebis{2-(2-furfuryl)-4-phenyl-indenyl}]hafnium,
dichloro[1,1'-dimethylsilylenebis{2-(5-methyl-2-furyl)-4-(4-chlorophenyl)-indenyl}]hafnium,
dichloro[1,1'-dimethylsilylenebis{2-(5-methyl-2-furyl)-4-(4-fluorophenyl)-indenyl}]hafnium, dichloro[1,1'-dimethylsilylenebis{2-(5-methyl-2-furyl)-4-(4-trifluoromethylphenyl)-indenyl}]hafnium, dichloro[1,1'-dimethylsilylenebis{2-(5-methyl-2-furyl)-4-(4-t-butylphenyl)-indenyl}]hafnium, dichloro[1,1'-dimethylsilylenebis{2-(5-methyl-2-furyl)-4-(4-trimethylsilylphenyl)-indenyl}]hafnium, dichloro[1,1'-dimethylsilylenebis{2-(2-furyl)-4-(1-naphthyl)-indenyl}]hafnium, dichloro[1,1'-dimethylsilylenebis{2-(2-furyl)-4-(2-naphthyl)-indenyl}]hafnium, dichloro[1,1'-dimethylsilylenebis{2-(2-furyl)-4-(2-phenanthryl)-indenyl}]hafnium, dichloro[1,1'-dimethylsilylenebis{2-(2-furyl)-4-(9-phenanthryl)-indenyl}]hafnium, dichloro[1,1'-dimethylsilylenebis{2-(5-methyl-2-furyl)-4-(1-naphthyl)-indenyl}]hafnium, dichloro[1,1'-dimethylsilylenebis{2-(5-methyl-2-furyl)-4-(2-naphthyl)-indenyl}]hafnium, dichloro[1,1'-dimethylsilylenebis{2-(5-methyl-2-furyl)-4-(2-phenanthryl)-indenyl}]hafnium, dichloro[1,1'-dimethylsilylenebis{2-(5-methyl-2-furyl)-4-(9-phenanthryl)-indenyl}]hafnium, dichloro[1,1'-dimethylsilylenebis{2-(5-t-butyl-2-furyl)-4-(1-naphthyl)-indenyl}]hafnium, dichloro[1,1'-dimethylsilylenebis{2-(5-t-butyl-2-furyl)-4-(2-naphthyl)-indenyl}]hafnium, dichloro[1,1'-dimethylsilylenebis{2-(5-t-butyl-2-furyl)-4-(2-phenanthryl)-indenyl}]hafnium, dichloro[1,1'-dimethylsilylenebis{2-(5-t-butyl-2-furyl)-4-(9-phenanthryl)-indenyl}]hafnium, dichloro[1,1'-dimethylsilylene(2-methyl-4-phenyl-indenyl){2-(5-methyl-2-furyl)-4-phenyl-indenyl}]hafnium, dichloro[1,1'-dimethylsilylene(2-methyl-4-phenyl-indenyl){2-(5-methyl-2-thienyl)-4-phenyl-indenyl}]hafnium or the like.

Among these, further preferable one includes dichloro[1,1'-dimethylsilylenebis{2-(5-methyl-2-furyl)-4-phenyl-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-(2-naphthyl)-indenyl}]hafnium, dichloro[1,1'-dimethylsilylenebis{2-(5-methyl-2-furyl)-4-(4-t-butylphenyl)-indenyl}]hafnium, dichloro[1,1'-dimethylsilylenebis{2-(5-methyl-2-furyl)-4-(4-trimethylsilylphenyl)-indenyl}]hafnium.

In addition, particularly preferable one includes dichloro[1,1'-dimethylsilylenebis{2-(5-methyl-2-furyl)-4-phenyl-indenyl}]hafnium, dichloro[1,1'-dimethylsilylenebis{2-(5-methyl-2-furyl)-4-(4-t-butylphenyl)-indenyl}]hafnium, dichloro[1,1'-dimethylsilylenebis{2-(5-methyl-2-furyl)-4-(4-chlorophenyl)-indenyl}]hafnium, dichloro[1,1'-dimethylsilylenebis{2-(5-methyl-2-furyl)-4-(4-trimethylsilylphenyl)-indenyl}]hafnium.

(ii) The Component [A-2]: a Compound Represented by the General Formula (a2)

[Chemical formula 11]

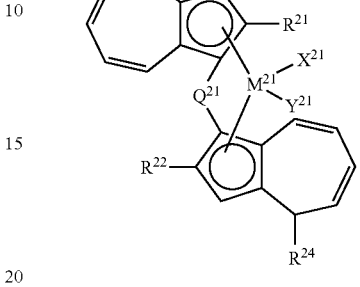

General formula (a2)

[Wherein, $Q^{21}$ represents a bonding group for cross-linking two conjugated five-member ring ligands, which is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20, $M^{21}$ represents zirconium or hafnium, $X^{21}$ and $Y^{21}$ each independently represent a similar substitution group to $X^{11}$ and $Y^{11}$. $R^{21}$ and $R^{22}$ each independently represent a hydrocarbon group with carbon atoms of 1 to 6. $R^{23}$ and $R^{24}$ each independently represent an aryl group with carbon atoms of 6 to 30, which may contain a halogen, silicon or a plurality of hetero elements selected from these.]

In the general formula (a2), $Q^{21}$ represents a bonding group for cross-linking two conjugated five-member ring ligands, which is bi-valent hydrocarbon group with carbon atoms of 1 to 20, silylene group having a hydrocarbon group with carbon atoms of 1 to 20, or germirene group having a hydrocarbon group with carbon atoms of 1 to 20, and preferably, substituted silylene group or substituted germirene group. The substitution group bonding to silicon and germanium is preferably a hydrocarbon group with carbon atoms of 1 to 12, and two substitution groups may be bonded together. A specific example thereof includes methylene, dimethylmethylene, ethylene-1,2-diyl, dimethylsilylene, diethylsilylene, diphenylsilylene, methylphenylsilylene, 9-silafluorene-9,9-diyl, dimethylsilylene, diethylsilylene, diphenylsilylene, methylphenylsilylene, 9-silafluorene-9,9-diyl, dimethylgermirene, diethylgermirene, diphenylgermirene, methylphenylgermirene or the like.

In the general formula (a2), $M^{21}$ represents zirconium or hafnium, and preferably hafnium.

In the general formula (a2), $X^{21}$ and $Y^{21}$ are auxiliary ligands, similar to $X^{11}$ and $Y^{11}$, for generation of activated metallocene having ability of olefin polymerization, by a reaction with a promotor of the component [B]. Therefore, kind of ligands of $X^{21}$ and $Y^{21}$ are not especially limited, as long as this object is attained, and each independently represent hydrogen, halogen group, hydrocarbon group with carbon atoms of 1 to 20, alkoxy group with carbon atoms of 1 to 20, alkylamide group with carbon atoms of 1 to 20, trifluoromethanesulfonic acid group, phosphorous-containing hydrocarbon group with carbon atoms of 1 to 20, or silicon-containing hydrocarbon group with carbon atoms of 1 to 20

In the general formula (a2), $R^{21}$ and $R^{22}$ each independently represent a hydrocarbon group with carbon atoms of 1 to 6, preferably alkyl group, and still more preferably alkyl group with carbon atoms of 1 to 4. As a specific example, there is included methyl, ethyl, n-propyl, i-propyl, n-butyl, i-butyl, sec-butyl, n-pentyl, i-pentyl, n-hexyl or the like, and preferably methyl, ethyl and n-propyl.

In the general formula (a2), $R^{23}$ and $R^{24}$ each independently represent an aryl group with carbon atoms of 6 to 30, preferably carbon atoms of 6 to 24, which may contain a halogen, silicon or a plurality of hetero elements selected from these. As a preferable example, there is included phenyl, 3-chlorophenyl, 3-fluorophenyl, 4-fluorophenyl, 4-methylphenyl, 4-i-propylphenyl, 4-t-butylphenyl, 4-trimethylsilylphenyl, 4-(2-fluorobiphenylyl), 4-(2-chlorobiphenylyl), 1-naphthyl, 2-naphthyl, 3,5-dimethyl-4-t-butylphenyl, 3,5-dimethyl-4-trimethylsilylphenyl or the like.

As a nonattributive example of the metallocene compound represented by the above general formula (a2), the following one is included.

However, only typical exemplary compounds are described to avoid many complicated examples. In addition, although a compound having hafnium as the center metal, was described, similar zirconium compound may be used, and it is apparent that various ligands or cross-link bonding groups or auxiliary ligands may be used arbitrarily.

There is included
dichloro{1,1'-dimethylsilylenebis(2-methyl-4-phenyl-4-hydroazulenyl)}hafnium,
dichloro[1,1'-dimethylsilylenebis{2-methyl-4-(4-chlorophenyl)-4-hydroazulenyl}]hafnium,
dichloro[1,1'-dimethylsilylenebis{2-methyl-4-(4-t-butylphenyl)-4-hydroazulenyl}]hafnium,
dichloro[1,1'-dimethylsilylenebis{2-methyl-4-(4-trimethylsilylphenyl)-4-hydroazulenyl}]hafnium,
dichloro[1,1'-dimethylsilylenebis{2-methyl-4-(3-chloro-4-t-butylphenyl)-4-hydroazulenyl}]hafnium,
dichloro[1,1'-dimethylsilylenebis{2-methyl-4-(3-methyl-4-t-butylphenyl)-4-hydroazulenyl}]hafnium,
dichloro[1,1'-dimethylsilylenebis{2-methyl-4-(3-chloro-4-trimethylsilylphenyl)-4-hydroazulenyl}]hafnium,
dichloro[1,1'-dimethylsilylenebis{2-methyl-4-(3-methyl-4-trimethylsilylphenyl)-4-hydroazulenyl}]hafnium,
dichloro[1,1'-dimethylsilylenebis{2-methyl-4-(1-naphthyl)-4-hydroazulenyl}]hafnium,
dichloro[1,1'-dimethylsilylenebis{2-methyl-4-(2-naphthyl)-4-hydroazulenyl}]hafnium,
dichloro[1,1'-dimethylsilylenebis{2-methyl-4-(4-chloro-2-naphthyl)-4-hydroazulenyl}]hafnium,
dichloro[1,1'-dimethylsilylenebis{2-methyl-4-(2-fluoro-4-biphenylyl)-4-hydroazulenyl}]hafnium,
dichloro[1,1'-dimethylsilylenebis{2-methyl-4-(2-chloro-4-biphenylyl)-4-hydroazulenyl}]hafnium,
dichloro[1,1'-dimethylsilylenebis{2-methyl-4-(9-phenanthryl)-4-hydroazulenyl}]hafnium,
dichloro[1,1'-dimethylsilylenebis{2-ethyl-4-(4-chlorophenyl)-4-hydroazulenyl}]hafnium,
dichloro[1,1'-dimethylsilylenebis{2-n-propyl-4-(3-chloro-4-trimethylsilylphenyl)-4-hydroazulenyl}]hafnium,
dichloro[1,1'-dimethylsilylenebis{2-ethyl-4-(3-chloro-4-t-butylphenyl)-4-hydroazulenyl}]hafnium,
dichloro[1,1'-dimethylsilylenebis{2-ethyl-4-(3-methyl-4-trimethylsilylphenyl)-4-hydroazulenyl}]hafnium,
dichloro[1,1'-dimethylgermirenebis{2-methyl-4-(2-fluoro-4-biphenylyl)-4-hydroazulenyl}]hafnium,
dichloro[1,1'-dimethylgermirenebis{2-methyl-4-(4-t-butylphenyl)-4-hydroazulenyl}]hafnium,
dichloro[1,1'-(9-silafluorene-9,9-yl)bis{2-ethyl-4-(4-chlorophenyl)-4-hydroazulenyl}]hafnium,
dichloro[1,1'-dimethylsilylenebis{2-ethyl-4-(4-chloro-2-naphthyl)-4-hydroazulenyl}]hafnium,
dichloro[1,1'-dimethylsilylenebis{2-ethyl-4-(2-fluoro-4-biphenylyl)-4-hydroazulenyl}]hafnium,
dichloro[1,1'-(9-silafluorene-9,9-yl)bis{2-ethyl-4-(3,5-dichloro-4-trimethylsilylphenyl)-4-hydroazulenyl}]hafnium or the like.

Among these, preferable one is
dichloro[1,1'-dimethylsilylenebis{2-methyl-4-(4-chlorophenyl)-4-hydroazulenyl}]hafnium,
dichloro[1,1'-dimethylsilylenebis{2-methyl-4-(3-chloro-4-trimethylsilylphenyl)-4-hydroazulenyl}]hafnium,
dichloro[1,1'-dimethylsilylenebis{2-ethyl-4-(2-fluoro-4-biphenylyl)-4-hydroazulenyl}]hafnium,
dichloro[1,1'-dimethylsilylenebis{2-ethyl-4-(4-chloro-2-naphthyl)-4-hydroazulenyl}]hafnium,
dichloro[1,1'-dimethylsilylenebis{2-ethyl-4-(3-methyl-4-trimethylsilylphenyl)-4-hydroazulenyl}]hafnium,
dichloro[1,1'-(9-silafluorene-9,9-yl)bis{2-ethyl-4-(3,5-dichloro-4-trimethylsilylphenyl)-4-hydroazulenyl}]hafnium.

In addition, particularly preferable one is dichloro[1,1'-dimethylsilylenebis{2-methyl-4-(4-chlorophenyl)-4-hydroazulenyl}]hafnium,
dichloro[1,1'-dimethylsilylenebis{2-ethyl-4-(2-fluoro-4-biphenylyl)-4-hydroazulenyl}]hafnium,
dichloro[1,1'-dimethylsilylenebis{2-ethyl-4-(3-methyl-4-trimethylsilylphenyl)-4-hydroazulenyl}]hafnium,
dichloro[1,1'-(9-silafluorene-9,9-yl)bis{2-ethyl-4-(3,5-dichloro-4-trimethylsilylphenyl)-4-hydroazulenyl}]hafnium.

(2) The Catalyst Component (B)

Next, the catalyst component (B) to be used in the present invention is an ion-exchangeable layered silicate salt.

(i) Kinds of the Ion-Exchangeable Layered Silicate Salt

In the present invention, the ion-exchangeable layered silicate salt (hereafter abbreviated simply as the silicate salt) to be used as a raw material refers to a silicate salt has a crystal structure where surfaces composed by ion bonding or the like are laminated in parallel each other by bonding force, and an ion contained is exchangeable. Because most of the silicate salt is naturally produced mainly as a major component of clay mineral, impurity substances (quartz, cristobalite and the like) other than the ion-exchangeable layered silicate salt are contained in many cases, however, they may be included. Depending on kinds, quantity, particle diameter, crystallinity, a dispersion state of these impurity substances, they may provide better property as compared with a pure silicate salt, and such a composite substance is included as the catalyst component (B).

It should be noted that, a raw material of the present invention indicates the silicate salt before the stage, where chemical treatment of the present invention to be described later is carried out. In addition, the silicate salt to be used in the present invention may be not only a natural product but also an artificially synthesized product, or one containing them.

As a specific example of the silicate salt, there is included, for example, the following layered silicate salt described in "Clay mineralogy", Haruo Shiramizu, Asakura Shoten Co., Ltd. (1995):

That is, smectite group such as montmorillonite, zauconite, beidellite, nontronite, saponite, hectorite, stevensite, vermiculite group such as vermiculite, mica group such as mica, ilite, sericite, glauconite, attapulgite, sepiolite, palygorskite, bentonite, pyrophyllite, talc, chlorite group, or the like.

The silicate salt to be sued as a raw material in the present invention is preferably a silicate salt, where the major component of the silicate salt has a 2:1-type structure, a smectite group is still more preferable and montmorillonite is particularly preferable. Kind of an inter-layer cation is not especially limited, however, in view of relatively easy and cheap availability as an industrial raw material, a silicate salt, where the major component of the inter-layer cation is an alkali metal or an alkaline earth metal, is preferable.

(ii) Chemical Treatment of the Ion-Exchangeable Layered Silicate Salt

The ion-exchangeable layered silicate salt of the catalyst component (B) relevant to the present invention may be used as it is, without being subjected to special treatment, however, it is preferable to be subjected to chemical treatment. Here, as the chemical treatment of the ion-exchangeable layered silicate salt, any of surface treatment for removing of impurities adhered at the surface, or treatment which influences a clay structure, may be used, and specifically includes acid treatment, alkali treatment, salts treatment, organic substance treatment or the like.

<Acid Treatment>:

The acid treatment enables not only to remove impurities at the surface but also to elute a part of or whole of cations such as Al, Fe, Mg of a crystal structure.

An acid to be used in the acid treatment is selected preferably from hydrochloric acid, sulfuric acid, nitric acid, phosphoric acid, acetic acid, and oxalic acid.

Salts to be used in the treatment (which will be explained on the next page) and the acid may be two kinds or more. Treatment condition with the salts and the acid is not especially limited, however, usually the condition is selected from a concentration of the salts and the acid of 0.1 to 50% by weight, a treatment temperature of room temperature to boiling point, a treatment time of 5 minutes to 24 hours, and it is preferable to be carried out under condition that at least a part of a substance composing at least one kind of a compound selected from the group consisting of the ion-exchangeable layered silicate salts is eluted. In addition, the salts and the acid are used generally as an aqueous solution.

It should be noted that, a combination in each of the following acids and salts may be used also as a treatment agent. In addition, it may be combinations of these acids and salts.

<Salts Treatment>:

In the present invention, it is preferable that equal to or more than 40%, preferably equal to or more than 60% of exchangeable cations of group 1 metals contained in the ion-exchangeable layered silicate salt before subjecting to salts treatment is ion-exchanged with cations dissociated from the following salts.

The salts to be used in salts treatment aiming at such ion-exchange are compounds composed of a cation including at least one kind of an atom selected from the group consisting of 1 to 14 group atoms, and an anion of at least one kind selected from the group consisting of halogen atom, inorganic acid and organic acid, and still more preferably compounds composed of a cation including at least one kind of an atom selected from the group consisting of 2 to 14 group atoms, and an anion of at least one kind selected from the group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH, $OOCCH_2CH_3$, $C_2H_4O_4$ and $C_5H_5O_7$.

As specific examples of such salts, there are included LiF, LiCl, LiBr, LiI, $Li_2SO_4$, $Li(CH_3COO)$, $LiCO_3Li(C_6H_5O_7)$, $LiCHO_2$, $LiC_2O_4$, $LiClO_4$, $Li_3PO_4$, $CaCl_2$, $CaSO_4$, $CaC_2O_4$, $Ca(NO_3)_2$, $Ca_3(C_6H_5O_7)_2$, $MgCl_2$, $MgBr_2$, $MgSO_4$, $Mg(PO_4)_2$, $Mg(ClO_4)_2$, $MgC_2O_4$, $Mg(NO_3)_2$, $Mg(OOCCH_3)_2$, $MgC_4H_4O_4$ and the like.

In addition, there are included $Ti(OOCCH_3)_4$, $Ti(CO_3)_2$, $Ti(NO_3)_4$, $Ti(SO_4)_2$, $TiF_4$, $TiCl_4$, $Zr(OOCCH_3)_4$, $Zr(CO_3)_2$, $Zr(NO_3)_4$, $Zr(SO_4)_2$, $ZrF_4$, $ZrCl_4$, $ZrOCl_2$, $ZrO(NO_3)_2$, $ZrO(ClO_4)_2$, $ZrO(SO_4)$, $HF(OOCCH_3)_4$, $HF(CO_3)_2$, $HF(NO_3)_4$, $HF(SO_4)_2$, $HFOCl_2$, $HFF_4$, $HFCl_4$, $V(CH_3COCHCOCH_3)_3$, $VOSO_4$, $VOCl_3$, $VCl_3$, $VCl_4$, $VBr_3$ and the like.

In addition, there are included $Cr(CH_3COCHCOCH_3)_3$, $Cr(OOCCH_3)_2OH$, $Cr(NO_3)_3$, $Cr (ClO_4)_3$, $CrPO_4$, $Cr_2(SO_4)_3$, $CrO_2Cl_2$, $CrF_3$, $CrCl_3$, $CrBr_3$, $CrI_3$, $Mn(OOCCH_3)_2$, $Mn(CH_3COCHCOCH_3)_2$, $MnCO_3$, $Mn(NO_3)_2$, MnO, $Mn(ClO_4)_2$, $MnF_2$, $MnCl_2$, $Fe(OOCCH_3)_2$, $Fe(CH_3COCHCOCH_3)_3$, $FeCO_3$, $Fe(NO_3)_3$, $Fe(ClO_4)_3$, $FePO_4$, $FeSO_4$, $Fe_2(SO_4)_3$, $FeF_3$, $FeCl_3$, $FeC_6H_5O_7$ and the like.

In addition, there are included $Co(OOCCH_3)_2$, $Co(CH_3COCHCOCH_3)_3$, $CoCO_3$, $Co(NO_3)_2$, $CoC_2O_4$, $Co(ClO_4)_2$, $Co_3(PO_4)_2$, $CoSO_4$, $CoF_2$, $CoCl_2$, $NiCO_3$, $Ni(NO_3)_2$, $NiC_2O_4$, $Ni(ClO_4)_2$, $NiSO_4$, $NiCl_2$, $NiBr_2$ and the like.

Still more, there are included $Zn(OOCCH_3)_2$, $Zn(CH_3COCHCOCH_3)_2$, $ZnCO_3$, $Zn(NO_3)_2$, $Zn(ClO_4)_2$, $Zn_3(PO_4)_2$, $ZnSO_4$, $ZnF_2$, $ZnCl_2$, $AlF_3$, $AlCl_3$, $AlBr_3$, $AlI_3$, $Al_2(SO_4)_3$, $Al_2(C_2O_4)_3$, $Al(CH_3COCHCOCH_3)_3$, $Al(NO_3)_3$, $AlPO_4$, $GeCl_4$, $GeBr_4$, $GeI_4$ and the like.

<Alkali Treatment>

Other than the aid treatment and the alkali treatment, the following alkali treatment or organic substance treatment may be carried out, if necessary. As a treatment agent to be used in alkali treatment, there are exemplified LiOH, NaOH, KOH, $Mg(OH)_2$, $Ca(OH)_2$, $Sr(OH)_2$, $Ba(OH)_2$ and the like.

<Organic Substance Treatment>

In addition, as an example of an organic treatment agent to be used in the organic substance treatment, there are included trimethylammonium, triethylammonium, N,N-dimethylanilinium, triphenylphosphonium or the like.

In addition, as an anion composing the organic substance treatment agent, other than anions exemplified as the anions composing salts treatment agent, for example, hexafluoro phosphate, tetrafluoro borate, tetraphenyl borate or the like is exemplified, however, it should not be limited thereto.

In addition, these treatment agents may be used alone or in combination of two or more kinds. These treatment agents to be added may be used by combination at the start of the treatment, or these treatment agents to be added may be used by combination in the midst of the treatment. In addition, chemical treatment may be carried out in a plurality of times by using the same or different treatment agent.

In these ion-exchangeable layered silicate salts, usually, adsorbed water and inter-layer water is included. In the present invention, it is preferable to use the salts, as the catalyst component (B), after removing these adsorbed water and inter-layer water.

A heating treatment method for the adsorbed water and inter-layer water of the ion-exchangeable layered silicate salts is not especially limited, however, it is necessary to select the condition so that the adsorbed water and inter-layer water do not remain, or structure destruction is not generated. Heating time is equal to or longer than 0.5 hour, and preferably equal to or longer than 1 hour. In this case, it is preferable that moisture content of the catalyst component (B) after removal is equal to or lower than 3% by weight, and preferably equal to or lower than 1% by weight, provided that moisture content in the case of dewatering for 2 hours under condition of a temperature of 200° C. and a pressure of 1 mmHG is 0% by weight.

As described above, a particularly preferable one as the catalyst component (B) in the present invention is the ion-exchangeable layered silicate salt having a moisture content of equal to or lower than 3% by weight, obtained by subjecting to salts treatment and/or acid treatment.

The ion-exchangeable layered silicate salt is possible and preferable to be subjected to treatment with the catalyst component (C), which will be described later, before forming a catalyst or use as a catalyst. Usage of the catalyst component (C) relative to 1 g of the ion-exchangeable layered silicate salt is not especially limited, however, usually, it is equal to or less than 20 mmol, and preferably 0.5 to 10 mmol. Treatment temperature or time is not especially limited, and the treatment temperature is usually 0 to 70° C., and the treatment time is 10 minutes to 3 hours. It is possible and preferable to perform washing after the treatment. As a solvent, a hydrocarbon solvent similar to a solvent to be used in preliminary polymerization or slurry polymerization, to be described later, is used.

In addition, as the catalyst component (B), it is preferable to use spherical particles having an average particle diameter of equal to or larger than 5 μm. As long as particle shape is spherical, natural products or commercial products may be used as they are, or those having particle shape and particle diameter controlled by granulation, classification, fractionation or the like may be used.

As a granulation method to be used here includes, for example, a stirring granulation method and a spraying granulation method are included, however, it is possible to utilize commercial products as well.

In addition, in granulation, an organic substance, an inorganic solvent, an inorganic salt, various binders may be used as well.

The spherical particles obtained as above desirably have a compression failure strength of equal to or higher than 0.2 MPa, and particularly preferably equal to or higher than 0.5 MPa, to suppress crushing or generation of fine powder in the polymerization step. In the case of having such particle strength, improvement effect of particle property is effectively exhibited, in particular, in carrying out preliminary polymerization.

(3) Catalyst Component (C)

The catalyst component (C) to be used in the present invention is an organoaluminum compound. The organoaluminum compound to be used as the catalyst component (C) is suitably a compound represented by the general formula: $(AlR^{11}{}_q Z_{3-q})_p$.

In the present invention, it goes without saying that the compound represented by this formula may be used by mixing of a plurality of kinds or in combination. In this formula, $R^{11}$ represents a hydrocarbon group with carbon atoms of 1 to 20, Z represents halogen, hydrogen, alkoxy group, and amine group. q and p represents an integer of 1 to 3 and 1 to 2, respectively. As $R^{11}$, an alkyl group is preferable, and in addition, it is preferable that Z is chlorine when it is a halogen, an alkoxy group with carbon atoms of 1 to 8 when it is an alkoxy group, and an amino group with carbon atoms of 1 to 8 when it is an amino group.

As a specific example of the organoaluminum compound, there is included trimethylaluminum, triethylaluminum, trinormalpropylaluminum, trinormalbutylaluminum, triisobutylaluminum, trinormalhexylaluminum, trinormaloctylaluminum, trinormaldecylaluminum, diethylaluminumchloride, diethylaluminum sesquichloride, diethylaluminum hydride, diethylaluminum ethoxide, diethylaluminumdimethylamide, diisobutylaluminum hydride, diisobutylaluminumchloride or the like. Among these, preferable one is trialkylaluminum and alkylaluminum hydride wherein p=1 and q=3. Still more preferably, $R^{11}$ is trialkylaluminum with carbon atoms of 1 to 8.

(4) On Formation and Preliminary Polymerization of a Catalyst

The catalyst according to the present invention may be formed by subjecting the above catalyst component (A) and the catalyst component (B) to contacting in a (preliminary) polymerization reactor, at the same time or continuously, or at one time or over a multiple times. In addition, in the case where the catalyst component (A) and the catalyst component (B) are subjected to contacting, the catalyst component (C) may be subjected to contacting at the same time or continuously, or at one time or over a multiple times.

In particular, in [A-1] or [A-2] of the catalyst component (A), it is preferable to use the catalyst component (C), in the case where $X^{11}$ and $Y^{11}$, or $X^{21}$ and $Y^{21}$ are other than hydrocarbon groups with carbon atoms of 1 to 20, for example, halogen groups.

As contacting order, purposive arbitrary combination is possible, however, particularly preferably one for each component is as follows.

In the case of use of the catalyst component (C), it is possible that the catalyst component (C) is subjected to contacting with the catalyst component (A) or the catalyst component (B), or with both the catalyst component (A) and the catalyst component (B), before the catalyst component (A) and the catalyst component (B) are subjected to contacting, or the catalyst component (C) is subjected to contacting at the same time of the catalyst component (A) and the catalyst component (B) are subjected to contacting, or the catalyst component (C) is subjected to contacting after the catalyst component (A) and the catalyst component (B) are subjected to contacting, however, a preferable method is that the catalyst component (C) is subjected to contacting with any of the catalyst component (A) and the catalyst component (B), before the catalyst component (A) and the catalyst component (B) are subjected to contacting. In addition, it is usual that the contacting of each component is carried out in an aliphatic hydrocarbon or an aromatic hydrocarbon solvent. Contacting temperature is not especially limited, however, it is preferable that the contacting is carried out between −20° C. and 150° C.

In addition, after subjecting each component to contacting, it is possible to wash it with an aliphatic hydrocarbon or an aromatic hydrocarbon solvent.

Usage of the catalyst components (A), (B) and (C) to be used in the present invention is arbitrary. For example, usage of the catalyst component (A) relative to the catalyst component (B), is preferably in a range of 0.1 μmol to 1000 μmol, and particularly preferably 0.5 μmol to 500 μmol, relative to 1 g of the catalyst component (B). In addition, quantity of the catalyst component (C) relative to the catalyst component (A), as molar ratio of a transition metal, is preferably in a range of 0.011 to $5*10^6$, and particularly preferably 0.1 to $1*10^4$.

Ratio of the component [A-1] and the component [A-2] to be used in the present invention is arbitrary within a range satisfying characteristics of the propylene-based polymer, however, it is preferably 0.30 to 0.99, in molar ratio of a transition metal of [A-1], relative to total quantity of each component [A-1] and [A-2].

By change of this ratio, adjustment of balance of melt property and catalytic activity is possible. That is, a macromer with low molecular weight and terminal vinyl is generated from the component [A-1], while a high molecular weight substance, where a part of the macromer is polymerized, is generated from the component [A-2]. Therefore, by change of ratio of the component [A-1], average molecular weight, molecular weight distribution, skew of molecular weight distribution to a high molecular weight side, components with very high molecular weight, and branch (quantity, length and distribution) of a polymer to be generated may be controlled, and in this way, melt property such as strain hardening degree, melt tension, melt drawability may be controlled. In order to produce a propylene-based polymer efficiently in higher catalytic activity, the ratio is required to be equal to or higher than 0.30, preferably equal to or higher than 0.40, and still more preferably equal to or higher than 0.50. In addition, the upper limit is equal to or lower than 0.99, and in order to produce a polymer of the present invention efficiently in higher catalytic activity, preferably in a range of equal to or lower than 0.95, and still more preferably equal to or lower than 0.90.

In addition, by using the component [A-1] within the above range, balance of average molecular weight and catalytic activity for hydrogen quantity may be adjusted.

The catalyst of the present invention is possible and preferable to be subjected to preliminary polymerization composed of subjecting an olefin to contacting with the catalyst and to small quantity of polymerization. By carrying out the preliminary polymerization, melt property may be enhanced in carrying out main polymerization. It is considered that the reason for this is because of ability of providing uniform distribution of branch components among polymer particles in carrying out main polymerization. On the contrary, in the case where the preliminary polymerization is not carried out, gel is generated inevitably due to extreme non-uniformity depending on condition, and there is risk of impairment of quality.

Here, quantity of a polymer to be subjected to preliminary polymerization is preferably equal to or higher than 0.01 and still more preferably equal to or higher than 0.1 in weight ratio, relative to the catalyst component (B), and the upper limit is equal to or lower than 100 and still more preferably equal to or lower than 50, in view of economical efficiency or handling. Here the weight ratio of a polymer, relative to the catalyst component (B), may also be represented as preliminary polymerization rate.

The olefin to be used in the preliminary polymerization is not especially limited, however, there may be exemplified propylene, ethylene, 1-butene, 1-hexene, 1-octene, 4-methyl-1-pentene, 3-methyl-1-butene, vinylcycloalkane, styrene or the like, and preferably propylene. As a feeding method for the olefin, an arbitrary method is possible, such as a feeding method for the olefin into a reaction reactor so as to maintain in constant rate or a constant pressure state, or a combination thereof, a method for step-wisely changing of the feed. Preliminary polymerization temperature and time are not especially limited, however, they are preferably in a range of −20° C. to 100° C., and 5 minutes to 24 hours, respectively. In addition, as for quantity of the preliminary polymerization, quantity of polymer in the preliminary polymerization is preferably 0.01 to 100 and still more preferably 0.1 to 50, relative to the catalyst component (B). In addition, it is also possible to add or supplement the catalyst component (C) in the preliminary polymerization. In addition, it is possible to carry out washing after completion of the preliminary polymerization as well.

In addition, in contacting or after contacting of the above each component, a method for making a solid of a polymer such as polyethylene, polypropylene, or an inorganic oxide such as silica, titania coexist is possible as well.

(5) About Use of a Catalyst/Propylene Polymerization

As polymerization style, any style may be adopted, as long as an olefin polymerization catalyst containing the above catalyst components (A), (B) and (C), and a monomer are contacted efficiently.

Specifically, there may be adopted a slurry method by using an inert solvent; what is called a bulk method by using a propylene as a solvent without substantial use of an inert solvent, a solution polymerization method, or a vapor phase method for maintaining of each monomer in a gaseous state without substantial use of a liquid solvent, or the like. In addition, a method for carrying out continuous polymerization or a batch-type polymerization may be applied. In addition, it is possible to perform, other than single-stage polymerization, multi-stage polymerization of two or more stages.

In the case of slurry polymerization, as a polymerization solvent, there is used a single substance or a mixture of a saturated aliphatic hydrocarbon or an aromatic hydrocarbon such as hexane, heptane, pentane, cyclohexane, benzene, toluene.

In addition, polymerization temperature is 0° C. to 150° C. In particular, in use of bulk polymerization, the temperature is preferably equal to or higher than 40° C., and still more preferably equal to or higher than 50° C. In addition, the upper limit is preferably equal to or lower than 80° C., and still more preferably equal to or lower than 75° C.

Further, in use of vapor phase polymerization, the temperature is preferably equal to or higher than 40° C., and still more preferably equal to or higher than 50° C. In addition, the upper limit is preferably equal to or lower than 100° C., and still more preferably equal to or lower than 90° C.

Polymerization pressure is 1.0 MPa to 5.0 MPa. In particular, in use of bulk polymerization, the pressure is preferably equal to or higher than 1.5 MPa, and still more preferably equal to or higher than 2.0 MPa. In addition, the upper limit is preferably equal to or lower than 4.0 MPa, and still more preferably equal to or lower than 3.5 MPa.

Further, in use of vapor phase polymerization, the pressure is preferably equal to or higher than 1.3 MPa, and still more preferably equal to or higher than 1.5 MPa. In addition, the upper limit is preferably equal to or lower than 2.5 MPa, and still more preferably equal to or lower than 2.3 MPa.

Further, as a molecular weight regulator, as well as for activity enhancement effect, it is possible to use hydrogen in a supplementary way in a range of $1.0 \times 10^{-6}$ to $1.0 \times 10^{-2}$ in molar ratio, relative to propylene.

In addition, by change of quantity of hydrogen to be used, not only average molecular weight, but also molecular weight distribution, skew of molecular weight distribution to a high molecular weight side, components with very high molecular weight, and branch (quantity, length and distribution) of a polymer to be generated may be controlled, and in this way, melt property such as strain hardening degree, melt tension, melt drawability may be controlled.

Here, it is preferable that hydrogen is used, in a molar ratio relative to propylene, of equal to or higher than $1.0 \times 10^{-6}$, more preferably equal to or higher than $1.0 \times 10^{-5}$, and still more preferably equal to or higher than $1.0 \times 10^{-4}$. In addition, as for the upper limit, use in a quantity of equal to or lower than $1.0 \times 10^{-2}$ is preferable, more preferably equal to or lower than $0.9 \times 10^{-2}$, and still more preferably equal to or lower than $0.8 \times 10^{-2}$.

In addition, copolymerization may be carried out, where as other than the propylene monomer, an α-olefin with carbon atoms of about 2 to 20 (excluding one to be used as a monomer) is used as a comonomer. (Total) comonomer content in the propylene-based polymer, is in a range of 0% by mol to 20% by mol, and a plurality kinds of the above comonomers may be used. Specifically, the comonomers include ethylene, 1-butene, 1-hexene, 1-octene, and 4-methyl-1-pentene.

Among these, in order to obtain the propylene-based polymer of the present invention with good balance of melt property and catalytic activity, it is preferable to use ethylene in a quantity of equal to or lower than 5% by mol. In particular, to obtain a polymer with high rigidity, it is preferable to use ethylene, so that ethylene contained in the polymer is in a quantity of equal to or lower than 1% by mol, and still more preferable one is propylene homopolymer.

(6) Discussion on Polymerization Mechanism

It is considered that a macromer is generated by a special chain transfer reaction, generally called β-methyl elimination, and the present inventors have found that, in the present invention, the component [A-1] having a specific structure, generates the β-methyl elimination reaction in high selectivity at relatively low temperature region (40° C. to 80° C.), even during a growth termination reaction, and also ratio of the β-methyl elimination reaction to the polymer growth reaction is larger as compared with a complex having a conventional structure.

Conventionally, so as to generate the β-methyl elimination reaction preferentially, production was possible only under special condition (low pressure, high temperature polymerization, no hydrogen addition) in slurry polymerization with low propylene concentration, however, it has been found that by using the component [A-1] having a specific structure of the present invention, the production is possible by an industrially effective bulk polymerization or vapor phase polymerization, and that under practical pressure condition (1.0 to 3.0 MPa) and temperature condition (40° C. to 80° C.).

Still more surprisingly, it has been found that, in the production method for the propylene-based polymer of the present invention there is characteristics that change of balance between a macromer generation reaction and a growth reaction is small, even by the addition of hydrogen, and macromer selectivity little changes even in the presence of hydrogen, although the reason is not clear, whereas with a conventional method, a chain transfer reaction by hydrogen becomes predominant than the β-methyl elimination reaction, by the addition of hydrogen. Still more, hydrogen has activity enhancement effect.

From this fact, it has been found that a macromer generation step and a macromer copolymerization step may be carried out under the same condition, that is, simultaneous polymerization and a single-stage polymerization may be performed by a combination of the component [A-2], whereas conventionally it has been required to perform multistage polymerization for macromer copolymerization, after the macromer generation step under special condition (low pressure, high temperature, no hydrogen addition).

On the other hand, the component [A-2] has high ability of macromer copolymerization, although not having ability of generation of a terminal with a vinyl structure, by having a specific structure, and further has ability of generation of a polymer with higher molecular weight, as compared with the component [A-1]. In addition, the addition of hydrogen enhances activity and decreases molecular weight by chain transfer caused by hydrogen.

Conventionally, because macromer generation and macromer copolymerization are carried out with a single complex, that is, a polymer is produced with the same complex having the component [A-1] and the component [A-2], there was a problem that any one of macromer generation ability or and macromer copolymerization ability is insufficient, introduction quantity of branch components to the high molecular weight side is insufficient, or generation quantity of the macromer itself is decreased by using a hydrogen for molecular weight adjustment.

However, in the present invention, it has been found that by using the component [A-1] with a specific structure having macromer generation ability, and the component [A-2] with a specific structure having macromer copolymerization ability in high molecular weight, as catalysts with a combination thereof by a specific method, a long-chain-branch-containing propylene-based polymer having objective property may be produced in an industrially effective method such as bulk polymerization or vapor phase polymerization, in particular by a single-stage polymerization under practical pressure and temperature condition, and that in use of hydrogen as a molecular weight regulator.

In addition, in the method of the present invention, it has become possible to introduce a component with sufficiently high stereoregularity to the side chain by a simple and convenient method, although conventionally branch generation efficiency was increased only under condition for generation of a polymer with low stereoregularity.

This fact is considered important progress as industrial production technology.

IV. A Propylene-Based Resin Composition and Applications Thereof

The propylene-based polymer of the present invention may prepare a propylene-based resin composition, by formulation, if necessary, of various additives such as known antioxidant, ultraviolet absorber, antistatic agent, nucleating agent, lubricant, flame retardant, anti-blocking agent, coloring agent, inorganic or organic filler, and still more various synthetic resins.

The resultant propylene-based resin composition may be subjected next to melt kneading under heating by using a melt kneader, and then to be supplied as molding materials as pellets still more cut into particle shape.

These pellet-like molding materials are subjected to molding by various known polypropylene molding methods, for example, injection molding, extrusion molding, foam molding, hollow molding and the like, to produce various molded articles such as various industrial injection molded parts, various containers, non-oriented films, mono-axially stretched films, bi-axially oriented films, sheets, pipes, fibers.

Among these, a foam molded body obtained by using the propylene-based polymer of the present invention is particularly useful industrially due to having low continuous air bubble rate, and fine and uniform air bubbles.

A foaming agent to be used in the present invention for producing the foam molded body is a thermal decomposition-type foaming agent or a volatile foaming agent, and any one may be used as long as it is a known one.

As a specific example of a thermal decomposition-type chemical foaming agent, there is exemplified sodium bicarbonate, ammonium carbonate, ammonium nitrite, an azide compound such as azodicarbonamide, azobisformamide, azobisisobutyronitrile, diazoaminobenzene, a nitroso compound such as N,N'-dinitorosopentatetramine, N,N'-dimethyl-dinitroterephthalamide. It should be noted that, said foaming agent may be used alone or in combination of two or more kinds.

As a specific example of the volatile foaming agent, carbon dioxide, nitrogen, water or alkane gas such as butane is exemplified. It should be noted that, said foaming agent may be used alone or in combination with the above thermal decomposition-type foaming agent.

In order to obtain a foamed body having uniform and fine foamed cells and high foaming magnification, use of the volatile foaming agent is preferable.

Formulation quantity of the foaming agent in the present invention is preferably in a range of 0.01 to 15.0 parts by weight, more preferably in a range of 0.05 to 12.0 parts by weight, and still more preferably in a range of 0.1 to 10.0 parts by weight, relative to 100 parts by weight of the propylene-based polymer of the present invention. The formulation quantity of the foaming agent of excessively higher than 15.0 parts by weight provides over foaming and makes difficult to obtain a uniformly and finely foamed cells, on the other hand, the formulation quantity of the foaming agent of excessively lower than 0.01 part by weight does not provide sufficient foaming and thus not preferable.

A resin composition for foam molding, containing the above propylene-based polymer and the foaming agent, may be formulated with various additives such as known polymer, antioxidant, neutralizer, light stabilizer, ultraviolet absorber, inorganic filler, anti-blocking agent, lubricant, antistatic agent, metal deactivator, usually used in a polyolefin, as other component, within a range not to impair objects of the present invention.

As the polymer, there is included a polymer such as propylene homopolymer or propylene copolymer with other α-olefin, low density polyethylene, high density polyethylene, various types of thermoplastic elastomer, and the like.

As an antioxidant, phenol-type antioxidant, phosphite-type antioxidant and thio-type antioxidant or the like may be exemplified, as a neutralizer, higher fatty acid salts such as calcium stearate and zinc stearate may be exemplified, and as a photostabilizer and an ultraviolet absorber, hindered amines, nickel complex compound, benzotriazols, benzophenones or the like may be exemplified.

In addition, as an inorganic filler and an anti-blocking agent, potassium carbonate, silica, hydrotalcite, zeolite, aluminum silicate, magnesium silicate or the like may be exemplified, and as a lubricant, higher fatty acid amides such as stearic acid amide may be exemplified.

Further, as an antistatic agent, fatty acid partial esters such as glycerin fatty acid mono ester may be exemplified, and as a metal deactivator, triazines, phosphones, epoxies, triazols, hydrazides, oxamides or the like may be exemplified.

As a preparation method for the resin composition of the present invention, there is included a method for mixing powder-like or pellet-like propylene-based polymer of the present invention, a foaming agent and, if necessary, other formulation agents, with a dry-blender, Henschel mixer or the like.

In addition, depending on the situations, only a foaming agent may be fed separately in producing a foamed body.

For the producing the foamed body of the present invention, a known method may be utilized and, for example, an objective substance may be obtained easily with a usual extruding apparatus equipped with a sizing and a dice with objective shape, by a method for feeding said resin composition for extrusion foam molding of the present invention into the extruder, for extrusion and foaming at cylinder temperature usually set usually at 130 to 170° C., to form objective shape with a sizing apparatus, and pulling up said foamed body with a pull-up apparatus.

EXAMPLES

Explanation will be given next still more specifically on the present invention with reference to Examples, however, the present invention should not be limited to the following Examples, as long as it does not depart from the gist thereof. It should be noted that, property measurement, analysis or the like in the following Examples are those in accordance with the following methods.

(1) Melt Flow Rate (MFR):

Melt Flow Rate (test condition: 230° C. and a load of 2.16 kgf) was measured in accordance with JIS K6921-2 "Plastic-Materials for polypropylene (PP) molding and extrusion— the second part: A preparation method for a test piece and a determination method for property". Unit is g/10 minutes.

(2) Molecular Weight and Molecular Weight Distribution (Mw, Mn, Q Value):

They were measured by a method described in the present description with gel permeation chromatography (GPC).

(3) ME (Memory Effect):

ME was calculated by extrusion of a polymer from an orifice, by using a melt indexer manufactured by TAKARA THERMISTOR INSTRUMENTS Co., Ltd., having a diameter of 1.0 mm and a length of 8.00 mm, at 190° C., under load and an extrusion rate of 0.1 g/minute, and then by its quenching in ethanol, and as value of diameter of thus extruded strand divided with diameter of the orifice. This value has correlation to Log (MFR), and the larger value exhibits the larger swell and the better product appearance in injection molding.

(4) mm Fraction and Analysis of Branch Structure (Cbr):

They were measured by a method described in the above present description, with GSX-400, FT-NMR, manufactured by JEOL Ltd. Unit is %.

(5) Measurement of Ethylene Content:

It was measured with IR by preparation of a calibration curve with $^{13}$C-NMR.

(6) Extensional Viscosity:

It was measured by a method described in the above present description (7) Composition Analysis:

It was measured with fluorescent X-ray by preparation of a calibration curve with chemical analysis by a JIS method.

(8) Melting Point (Tm) and Crystallization Temperature (Tc):

By using DSC6200, manufactured by Seiko Instruments Inc., 5 mg of a sheet-like sample piece was charged into an aluminum pan, whose temperature was raised from room temperature once to 200° C. in a temperature rising rate of 100° C./minute, and after holding the pan for 5 minutes, the temperature was decreased to 20° C. in 10° C./minute, to determine crystallization temperature (Tc) as crystal maximal peak temperature (° C.) in subjecting to crystallization, and then melting point (Tm) was determined as maximal melt peak temperature (° C.) when the temperature was raised to 200° C. in 10° C./minute.

Synthesis Example 1 of the Catalyst Component (A)

(1) Synthesis of dichloro[1,1'-dimethylsilylenebis{2-(5-methyl-2-furyl)-4-(4-t-butylphenyl)-indenyl}] hafnium: (Synthesis of the component [A-1] (a complex 1))

(1-a) Synthesis of 4-(4-t-butylphenyl)-indene

Into a 1000-mL glass reactor vessel, 1-bromo-4-t-butylbenzene (40 g, 0.19 mol) and dimethoxyethane (400 mL) were added and cooled to −70° C. Into this solution, a pentane solution of t-butyllithium (260 ml, 0.38 mol, 1.46 mol/L) was dropped. After the dropping, the solution was subjected to stirring for 5 hours under gradual warming to room temperature. The solution was cooled again to −70° C. and a dimethoxyethane solution (100 mL) of triisopropyl borate (46 mL, 0.20 mol) was dropped thereto. After the dropping, the solution was subjected to stirring overnight under gradual warming to room temperature.

Into the reaction solution, distilled water (100 ml) was added and stirred for 30 minutes, and then an aqueous solution (150 mL) of 50 g of sodium carbonate, 4-bromoindene (30 g, 0.15 mol) and tetrakis(triphenylphosphino)palladium (5 g, 4.3 mmol) were added sequentially, and then low-boiling components were removed and heated at 80° C. for 5 hours.

The reaction solution was poured into ice water (1 L) to be subjected to extraction therefrom with ether three times. An ether layer was washed with a saturated saline solution, to attain neutrality. Sodium sulfate was added thereto, and the reaction solution was left as it is overnight for drying. Sodium sulfate anhydride was filtered, a solvent is removed under reduced pressure, and the residue was purified by using a silica gel column to obtain 4-(4-t-butylphenyl)-indene (37 g, yield 98%) as a pale yellow liquid.

(1-b) Synthesis of 2-bromo-4-(4-t-butylphenyl)-indene

Into a 1000-mL glass reactor vessel, 4-(4-t-butylphenyl)-indene (37 g, 0.15 mol), dimethylsulfoxide (400 mL) and distilled water (11 mL) were added and N-bromosuccinimide (35 g, 0.20 mol) was gradually added thereto and stirred as it is at room temperature for 1 hour.

The reaction solution was poured into ice water (1 L) to be subjected to extraction therefrom with toluene three times. A toluene layer was washed with a saturated saline solution, and p-toluenesulfonic acid (4.3 g, 22 mmol) was added and subjected to refluxing under heating for 2 hours while removing a moisture.

The reaction solution was transferred to a separation funnel and washed with a saline solution to attain neutrality. Sodium sulfate was added thereto and the reaction solution was left as it is overnight for drying. Sodium sulfate anhydride was filtered, a solvent is removed under reduced pressure, and the residue was purified by using a silica gel column to obtain 2-bromo-4-(4-t-butylphenyl)-indene (46 g, yield 95%) as a pale yellow solid.

(1-c) Synthesis of 4-(4-t-butylphenyl)-2-(5-methyl-2-furyl)-indene

Into a 1000-mL glass reactor vessel, methylfuran (13.8 g, 0.17 mol), and dimethoxyethane (400 mL) were added and cooled to −70° C. Into this solution, a hexane solution of n-butyllithium (111 ml, 0.17 mol, 1.52 mol/L) was dropped. After the dropping, the solution was subjected to stirring for 3 hours under gradual warming to room temperature. The solution was cooled again to −70° C. and a dimethoxyethane solution (100 ml) containing triisopropyl borate (41 mL, 0.18 mol) was dropped thereto. After the dropping, the solution was subjected to stirring overnight under gradual warming to room temperature.

Into the reaction solution, distilled water (50 ml) was added and stirred for 30 minutes, and then an aqueous solution (100 ml) of 54 g of sodium carbonate, 2-bromo-4-(4-t-butylphenyl)-indene (46 g, 0.14 mol) and tetrakis(triphenylphosphino)palladium (5 g, 4.3 mmol) were added sequentially, and then heated at 80° C. for 3 hours, while removing the low-boiling components.

The reaction solution was poured into ice water (1 L) to be subjected to extraction therefrom with ether three times. An ether layer was washed with a saturated saline solution to attain neutrality. Sodium sulfate was added thereto and left as it is overnight for drying. Sodium sulfate anhydride was filtered, a solvent is removed under reduced pressure, and the residue was purified by using a silica gel column to obtain 4-(4-t-butylphenyl)-2-(5-methyl-2-furyl)-indene (30.7 g, yield 66%) as a colorless crystal.

(1-d) Synthesis of dimethylbis{2-(5-methyl-2-furyl)-4-(4-t-butylphenyl)-indenyl}silane Into a 1000-mL glass reactor vessel, 4-(4-t-butylphenyl)-2-(5-methyl-2-furyl)-indene (22 g, 66 mmol), and THF (200 mL) were added and cooled to −70° C. Into this solution, a hexane solution of n-butyllithium (42 ml, 67 mmol, 1.60 mol/L) was dropped. After the dropping, the solution was subjected to stirring for 3 hours under gradual warming to room temperature. The solution was cooled again to −70° C. and 1-methylimidazole (0.3 ml, 3.8 mmol) was added and a THF solution (100 ml) containing dimethyldichlorosilane (4.3 g, 33 mmol) was dropped thereto. After the dropping, the solution was subjected to stirring overnight under gradual warming to room temperature.

Distilled water was added to the reaction solution and it was transferred to a separation funnel and washed with a saline solution to attain neutrality. Sodium sulfate was added thereto and left as it is overnight for drying. Sodium sulfate anhydride was filtered, a solvent is removed under reduced pressure, and the residue was purified by using a silica gel column to obtain dimethylbis{2-(5-methyl-2-furyl)-4-(4-t-butylphenyl)-indenyl}silane (22 g, yield 92%) as a pale yellow solid.

(1-e) Synthesis of rac-dichloro[1,1'-dimethylsilylenebis{2-(5-methyl-2-furyl)-(4-t-butylphenyl)-indenyl}]hafnium Into a 500-mL glass reactor vessel, 9.6 g (13.0 mmol) of dimethylbis(2-(5-methyl-2-furyl)-4-(4-t-butylphenyl)-indenyl)silane and 300 mL of diethyl ether were added and cooled to −70° C. in a dry ice-methanol bath. Into this solution, 1.59 mol/L of a hexane solution of n-butyllithium (16 mL, 26 mmol) was dropped. After the dropping, the solution was warmed to room temperature and subjected to stirring for 3 hours. A solvent of the reaction solution was removed under reduced pressure, 250 mL of toluene and 10 mL of diethyl ether were added thereto, and the solution was subjected to cooling to −70° C. in the dry ice-methanol bath. Into this solution, 4.2 g (13.0 mmol) of tetrachlorohafnium was added. Then, the solution was subjected to stirring overnight under gradual warming to room temperature.

The solvent is removed under reduced pressure, and the residue was subjected to recrystallization in dichloromethane/hexane to obtain 1.3 g (yield 22%) of racemic form (a purity of equal to or higher than 99%) of dichloro[1,1'-dimethylsilylenebis{2-(5-methyl-2-furyl)-4-(4t-butylphenyl)-indenyl}]hafnium as yellowish orange crystal.

Identification values with a proton nucleic magnetic resonance method ($^1$H-NMR) on the resultant racemic form are shown bellow.
[Identification Result with $^1$H-NMR (CDCl$_3$)]:
The racemic form: δ0.95 (s, 6H), δ1.18 (s, 18H), δ2.09 (s, 6H), δ5.80 (d, 2H), δ6.37 (d, 2H), δ6.75 (dd, 2H), δ7.09 (d, 2H), δ7.34 (s, 2H), δ7.33 (d, 2H), δ7.35 (d, 4H), δ7.87 (d, 4H).

Synthesis Example 2 of the Catalyst Component (A)

(1) Synthesis of rac-dichloro[1,1'-dimethylsilylenebis{2-(5-methyl-2-furyl)-phenyl-indenyl}]hafnium: (Synthesis of the component [A-1] (complex 2))

(1-a) Synthesis of dimethylbis{2-(5-methyl-2-furyl)-4-phenyl-indenyl}silane

It was carried out according to a method described in Example 1 of JP-A-2004-124044.

(1-b) Synthesis of rac-dichloro[1,1'-dimethylsilylenebis{2-(5-methyl-2-furyl)-1-phenyl-indenyl}]hafnium Into a 100-mL glass reactor vessel, 5.3 g (8.8 mmol) of dimethylbis{2-(5-methyl-2-furyl)-4-phenyl-indenyl}silane, and 150 mL of diethyl ether were added and cooled to −70° C. in a dry ice-methanol bath. Into this solution, 1.50 mol/L of a hexane solution of n-butyllithium (12 mL, 18 mmol) was dropped. After dropping, the solution was warmed to room temperature and subjected to stirring for 16 hours. A solvent of the reaction solution was concentrated to about 20 mL under reduced pressure, and 200 mL of toluene was added and the solution was cooled to −70° C. in the dry ice-methanol bath. Into this solution, 2.8 g (8.7 mmol) of tetrachlorohafnium was added. Then the solution was subjected to stirring for 3 days under gradual warming to room temperature.

The solvent was removed under reduced pressure, and the residue was subjected to recrystallization in dichloromethane/hexane to obtain 2.9 g (yield 39%) of a racemic form of dichloro[1,1'-dimethylsilylenebis{2-(5-methyl-2-furyl)-4-phenyl-indenyl}]hafnium (a purity of equal to or higher than 99%) as yellowish orange crystal.

Identification values with a proton nuclear magnetic resonance method ($^1$H-NMR) on the resultant racemic form are shown bellow.
[Identification Result with $^1$H-NMR (CDCl$_3$)]:
The racemic form: δ1.12 (s, 6H), δ2.42 (s, 6H), δ6.06 (d, 2H), δ6.24 (d, 2H), δ6.78 (dd, 2H), δ6.97 (d, 2H), δ6.96 (s, 2H), δ7.25 to δ7.64 (m, 12H)

Synthesis Example 3 of the Catalyst Component (A)

(1) Synthesis of rac-dichloro[1,1'-dimethylsilylenebis{2-methyl-4-(4-chlorophenyl)-4-hydroazulenyl}]hafnium: (Synthesis of the component [A-2] (complex 3))

Synthesis of rac-dichloro[1,1'-dimethylsilylenebis{2-methyl-4-(4-chlorophenyl)-4-hydroazulenyl}]hafnium was similarly carried out according to a method described in Example 1 of JP-A-11-240909.

Synthesis Example 4 of the Catalyst Component (A)

(1) Synthesis of rac-dichloro[1,1'-dimethylsilylenebis{2-ethyl-4-(2-fluoro-4-biphenyl)-4-hydroazulenyl}]hafnium: (Synthesis of the component [A-2] (complex 4))

Synthesis of rac-dichloro[1,1'-dimethylsilylenebis{2-ethyl-4-(2-fluoro-4-biphenyl)-4-hydroazulenyl}]hafnium was similarly carried out according to a method described in Example 1 of JP-A-2000-95791.

Catalyst Synthesis Example 1

(1-1) Chemical Treatment of the Ion-Exchangeable Layered Silicate Salt

In a separable flask, 96% sulfuric acid (1044 g) was added into 3456 g of distilled water, and then 600 g of montmorillonite (BENCLAY SL: average particle diameter 19 μm, manufactured by Mizusawa Industrial Chemicals, Ltd.) was added as a layered silicate salt. This slurry was heated to 90° C. taking 1 hour in 0.5° C./minute, and subjected to a reaction at 90° C. for 120 minutes. This reaction slurry was cooled to room temperature taking 1 hour, and filtered, after the addition of 2400 g of distilled water, to obtain 1230 g of a cake-like solid.

Then, into the separable flask, 648 g of lithium sulfate and 1800 g of distilled water were added to prepare an aqueous solution of lithium sulfate, and whole quantity of the above cake-like solid was charged therein, and further 522 g of distilled water was added. This slurry was heated to 90° C. taking 1 hour in 0.5° C./minute, and subjected to a reaction at 90° C. for 120 minutes. This reaction slurry was cooled to room temperature taking 1 hour, and filtered after the addition of 1980 g of distilled water, and further washed with distilled water to pH 3, and filtered to obtain 1150 g of a cake-like solid.

The resultant solid was subjected to preliminary drying at 130° C. for two days under nitrogen gas flow, and then coarse particles with a diameter of equal to or larger than 53 μm were removed, and further by subjecting the residue to drying with a rotary kiln under condition of 215° C., nitrogen gas flow, and a residence time of 10 minutes, 340 g of chemically treated smectite was obtained.

Composition of this chemically treated smectite was Al: 7.81% by weight, Si: 36.63% by weight, Mg: 1.27% by weight, Fe: 1.82% by weight, and Li: 0.20% by weight, and Al/Si=0.222 [mol/mol].

After that, drying was carried out under reduced pressure at 200° C. for 5 hours, before use as a catalyst component, and it was used in the following catalyst preparation.

(1-2) Catalyst Preparation and Preliminary Polymerization

Into a three-neck flask (volume 1 L), 10 g of the chemically treated smectite obtained above was charged, and heptanes (65 mL) was added thereto to make slurry, and after stirring for 1 hour by the addition of triisobutylaluminum (25 mmol: 34.6 mL of a heptane solution with a concentration 143 mg/mL), it was washed with heptane so that the remaining solution ratio became 1/100, and then heptanes was added to obtain a total volume of 100 mL.

In addition, in an another flask (volume 200 mL), rac-dichloro[1,1'-dimethylsilylenebis{2-(5-methyl-2-furyl)-4-(4-t-butylphenyl)-indenyl}]hafnium (105 μmol), prepared in Synthesis Example 1 of the above catalyst component (A) was dissolved into toluene (30 mL) (solution 1), and further, in an another flask (volume 200 mL), rac-dichloro[1,1'-dimethylsilylenebis{2-methyl-4-(4-chlorophenyl)-4-hydroazulenyl}]hafnium (45 μmol), prepared in Synthesis Example 3 of the above catalyst component (A) was dissolved into toluene (12 mL) (solution 2).

After the addition of triisobutylaluminum (0.6 mmol: 0.83 mL of a heptane solution with a concentration 143 mg/mL)

into the 1 L flask containing the above chemically treated smectite, the above solution 1 was added, and then further 5 minutes later, the above solution 2 was added, and stirred at room temperature for 1 hour.

After that, 356 mL of heptanes was added and this slurry was introduced to a 1 L autoclave. After raising the inside temperature of the autoclave to 40° C., propylene was fed in a rate of 10 g/hr to carry out preliminary polymerization for 2 hours while maintaining at 40° C. After that, propylene feed was stopped and inside temperature was raised to 50° C. for carrying out remaining polymerization till pressure inside the autoclave became 0.05 MPa. Supernatant of the resultant catalyst slurry was removed by decantation, and then triisobutylaluminum (6 mmol: 8.3 mL of a heptane solution with a concentration 143 mg/mL) was added to the remaining part, for stirring for five minutes.

By drying of this solid for 2 hours under reduced pressure, 27.5 g of dried preliminary polymerization catalyst was obtained. Preliminary polymerization rate (value of quantity of preliminary polymerization polymer divided with quantity of the solid catalyst) was 1.75 (preliminary polymerization catalyst 1).

Catalyst Synthesis Example 2

A similar experiment as in Catalyst Synthesis Example 1 was carried out, except that, in (1-2) Catalyst Preparation and Preliminary polymerization of the above Catalyst Synthesis Example 1, rac-dichloro[1,1'-dimethylsilylenebis{2-(5-methyl-2-furyl)-4-(4-t-butylphenyl)-indenyl}]hafnium (75 μmol) was dissolved into toluene (21 mL) and used as a solution 1, and rac-dichloro[1,1'-dimethylsilylenebis{2-methyl-4-(4-chlorophenyl)-4-hydroazulenyl}]hafnium (75 μmol) was dissolved into toluene (21 mL) and used as a solution 2.

In this way, 30.9 g of a dried preliminary polymerization catalyst was obtained. Preliminary polymerization rate was 2.09 (preliminary polymerization catalyst 2).

Catalyst Synthesis Example 3

A similar experiment as in Catalyst Synthesis Example 1 was carried out, except that, in (1-2) Catalyst Preparation and Preliminary polymerization of the above Catalyst Synthesis Example 1, rac-dichloro[1,1'-dimethylsilylenebis{2-(5-methyl-2-furyl)-4-(4-t-butylphenyl)-indenyl}]hafnium (105 μmol) was dissolved into toluene (30 mL) and used as a solution 1, and rac-dichloro[1,1'-dimethylsilylenebis{2-ethyl-4-(2-fluoro-4-biphenyl)-4-hydroazulenyl}]hafnium (45 μmol) was dissolved into toluene (12 mL) and used as a solution 2.

In this way, 29.5 g of a dried preliminary polymerization catalyst was obtained. Preliminary polymerization rate was 1.95 (preliminary polymerization catalyst 3).

Catalyst Synthesis Example 4

A similar experiment as in Catalyst Synthesis Example 1 was carried out, except that, in (1-2) Catalyst Preparation and Preliminary polymerization of the above Catalyst Synthesis Example 1, rac-dichloro[1,1'-dimethylsilylenebis{2-(5-methyl-2-furyl)-4-phenyl-indenyl}]hafnium (135 μmol), prepared in Synthesis Example 2 of the above catalyst component (A), was dissolved into toluene (38 mL) and used as a solution 1, and rac-dichloro[1,1'-dimethylsilylenebis{2-methyl-4-(4-chlorophenyl)-4-hydroazulenyl}]hafnium (15 μmol), prepared in Synthesis Example 3 of the above catalyst component (A), was dissolved into toluene (4 mL) and used as a solution 2.

In this way, 28.4 g of a dried preliminary polymerization catalyst was obtained. Preliminary polymerization rate was 1.84 (preliminary polymerization catalyst 4).

Catalyst Synthesis Example 5

A similar experiment as in Catalyst Synthesis Example 1 was carried out, except that, in "(1-2) Catalyst Preparation and Preliminary polymerization" of the above Catalyst Synthesis Example 1, rac-dichloro[1,1'-dimethylsilylenebis{2-(5-methyl-2-furyl)-4-phenyl-indenyl}]hafnium (105 μmol), prepared in Synthesis Example 2 of the above catalyst component (A), was dissolved into toluene (30 mL) and used as a solution 1, and rac-dichloro[1,1'-dimethylsilylenebis{2-methyl-4-(4-chlorophenyl)-4-hydroazulenyl}]hafnium (45 μmol), prepared in Synthesis Example 3 of the above catalyst component (A), was dissolved into toluene (12 mL) and used as a solution 2.

In this way, 31.3 g of a dried preliminary polymerization catalyst was obtained. Preliminary polymerization rate was 2.11 (preliminary polymerization catalyst 5).

Molecular weight of a preliminarily polymerization polymer of the preliminarily polymerization catalyst obtained above was measured with GPC. Weight average molecular weight and Q value are shown in Table 1.

TABLE 1

| | Catalyst Synthesis Example 1 | Catalyst Synthesis Example 2 | Catalyst Synthesis Example 3 | Catalyst Synthesis Example 4 | Catalyst Synthesis Example 5 |
|---|---|---|---|---|---|
| Preliminary polymerization catalyst lot | Preliminary polymerization catalyst 1 | Preliminary polymerization catalyst 2 | Preliminary polymerization catalyst 3 | Preliminary polymerization catalyst 4 | Preliminary polymerization catalyst 5 |
| Component [A-1] | Complex 1 | Complex 1 | Complex 1 | Complex 2 | Complex 2 |
| Component [A-2] | Complex 3 | Complex 3 | Complex 4 | Complex 3 | Complex 3 |
| Component [A-1]/(Component [A-1] + Component [A-2]) | 0.7 | 0.5 | 0.7 | 0.9 | 0.7 |
| Preliminary polymerization rate | 1.75 | 2.09 | 1.95 | 1.84 | 2.11 |
| Weight average molecular weight Mw | 158000 | 201000 | 179000 | 121000 | 176000 |
| Q value | 4.5 | 3.7 | 4.6 | 3.0 | 4.3 |

Example 1

Polymerization Example 1

After sufficient drying of a 3 L autoclave, in advance, by flowing of nitrogen under heating, the inside of the reactor as replaced with propylene and cooled to room temperature. After the addition of 2.86 mL of a heptane solution of tri-isobutylaluminum (143 mg/mL), 100 NmL of hydrogen was introduced. Then 750 g of liquid propylene was introduced, and then the temperature was raised to 75° C.

After that, 120 mg of the preliminary polymerization catalyst 1, excluding weight of the preliminary polymerization polymer, was pressure fed into the polymerization reactor with high pressure argon for initiation of polymerization. After maintaining of the reactor at 75° C. for three hours, 5 ml of ethanol was pressure fed for termination of polymerization. In this way, 421 g of a polymer was obtained.

After dissolving of 5 g of the resultant polymer into hot xylene, the polymer was precipitated with a large quantity of ethanol. After filtration, the precipitate was dried under reduced pressure to prepare an analysis sample.

Evaluation results of the resultant polymer sample are shown in Table 2.

Example 2

Polymerization Example 2

Polymerization was carried out similarly as in polymerization Example 1, except that 120 NmL of hydrogen was introduced. In this way, 456 g of a polymer was obtained.

Evaluation results of the resultant polymer sample are shown in Table 2.

Example 3

Polymerization Example 3

Polymerization was carried out similarly as in polymerization Example 1, except that 250 NmL of hydrogen was introduced, and 90 mg of the preliminary polymerization catalyst 1, excluding the weight of the preliminary polymerization polymer, was used. In this way, 409 g of a polymer was obtained.

Evaluation results of the resultant polymer sample are shown in Table 2.

Example 4

Polymerization Example 4

Polymerization was carried out similarly as in polymerization Example 1, except that 100 NmL of hydrogen was introduced, 150 mg of the preliminary polymerization catalyst 1, excluding the weight of the preliminary polymerization polymer, was used, and polymerization time was set at 1 hour. In this way, 227 g of a polymer was obtained.

Figure 7:
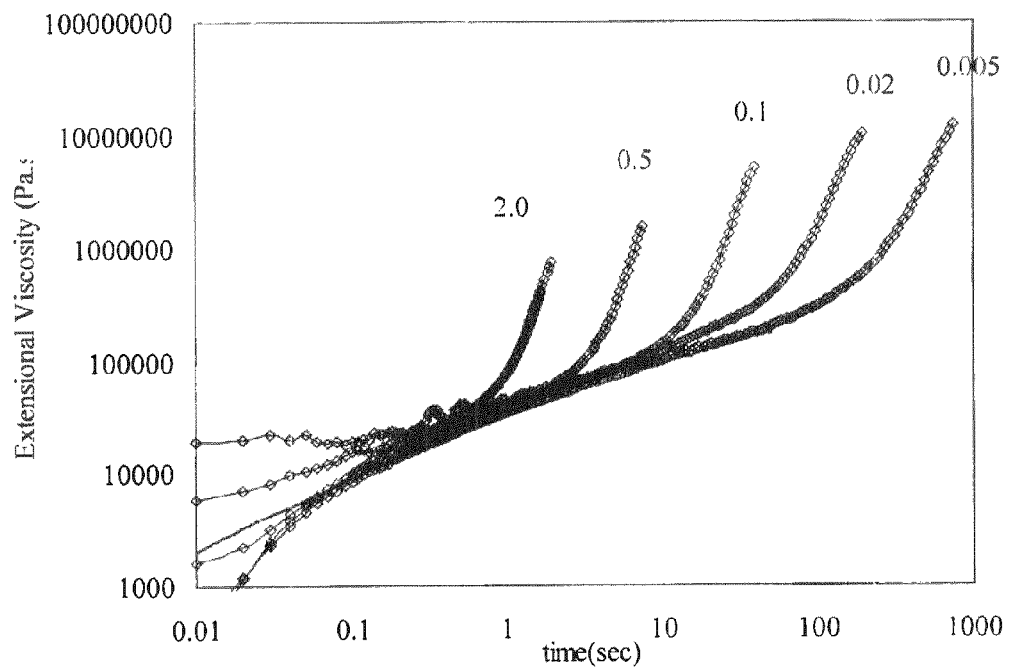
FIG. 7 is a drawing which shows one example of an extensional viscosity curve in Example 4 (subscripts represent strain rate:/sec).

Results of extensional viscosity curves of the resultant polymer sample are shown in FIG. 7.

Example 5

Polymerization Example 5

Polymerization was carried out similarly as in polymerization Example 1, except that 120 NmL of hydrogen was introduced, and 90 mg of the preliminary polymerization catalyst 2, excluding the weight of the preliminary polymerization polymer, was used. In this way, 499 g of a polymer was obtained.

Evaluation results of the resultant polymer sample are shown in Table 2.

Example 6

Polymerization Example 6

Polymerization was carried out similarly as in polymerization Example 1, except that 130 NmL of hydrogen was introduced, and 80 mg of the preliminary polymerization catalyst 2, excluding the weight of the preliminary polymerization polymer, was used. In this way, 466 g of a polymer was obtained.

Evaluation results of the resultant polymer sample are shown in Table 2.

Example 7

Polymerization Example 7

Polymerization was carried out similarly as in polymerization Example 1, except that 140 NmL of hydrogen was introduced, and 65 mg of the preliminary polymerization catalyst 2, excluding the weight of the preliminary polymerization polymer, was used. In this way, 316 g of a polymer was obtained.

Evaluation results of the resultant polymer sample are shown in Table 2.

Example 8

Polymerization Example 8

Polymerization was carried out similarly as in polymerization Example 1, except that 150 NmL of hydrogen was introduced, and 60 mg of the preliminary polymerization catalyst 2, excluding the weight of the preliminary polymerization polymer, was used. In this way, 338 g of a polymer was obtained.

Evaluation results of the resultant polymer sample are shown in Table 2.

Example 9

Polymerization Example 9

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 180 NmL of hydrogen was introduced. Then 750 g of liquid propylene was introduced, and then the temperature was raised to 75° C.

After that, 150 mg of the preliminary polymerization catalyst 3, excluding weight of the preliminary polymerization polymer, was pressure fed into the polymerization reactor with high pressure argon for initiation of polymerization. After maintaining of the reactor at 75° C. for 1 hour, 5 ml of ethanol was pressure fed for termination of polymerization. In this way, 356 g of a polymer was obtained.

Evaluation results of the resultant polymer sample are shown in Table 2.

Example 10

Polymerization Example 10

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 750 g of liquid propylene was introduced, and then the temperature was raised to 75° C.

After that, 600 mg of the preliminary polymerization catalyst 4, excluding weight of the preliminary polymerization polymer, was pressure fed into the polymerization reactor with high pressure argon for initiation of polymerization. After maintaining of the reactor at 75° C. for 3 hours, 5 ml of ethanol was pressure fed for termination of polymerization. In this way, 477 g of a polymer was obtained.

Evaluation results of the resultant polymer sample are shown in Table 2.

Example 11

Polymerization Example 11

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 750 g of liquid propylene was introduced, and then the temperature was raised to 70° C.

After that, 600 mg of the preliminary polymerization catalyst 4, excluding weight of the preliminary polymerization polymer, was pressure fed into the polymerization reactor with high pressure argon for initiation of polymerization. After maintaining of the reactor at 75° C. for 1 hour, 5 ml of ethanol was pressure fed for termination of polymerization. In this way, 308 g of a polymer was obtained.

Evaluation results of the resultant polymer sample are shown in Table 3.

Example 12

Polymerization Example 12

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 300 NmL of hydrogen was introduced. Then 750 g of liquid propylene was introduced, and then the temperature was raised to 75° C.

After that, 100 mg of the preliminary polymerization catalyst 1, excluding weight of the preliminary polymerization polymer, was pressure fed into the polymerization reactor with high pressure argon for initiation of polymerization. After maintaining of the reactor at 75° C. for 1 hour, 5 ml of ethanol was pressure fed for termination of polymerization. In this way, 405 g of a polymer was obtained.

Evaluation results of the resultant polymer sample are shown in Table 3.

Example 13

Polymerization Example 13

Polymerization was carried out similarly as in polymerization Example 11, except that 450 NmL of hydrogen was introduced, and 100 mg of the preliminary polymerization catalyst 4, excluding the weight of the preliminary polymerization polymer, was used. In this way, 315 g of a polymer was obtained.

Evaluation results of the resultant polymer sample are shown in Table 3.

Example 14

Polymerization Example 14

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 110 NmL of hydrogen was introduced, and subsequently 5 g of ethylene was introduced. Then 750 g of liquid propylene was introduced, and then the temperature was raised to 75° C.

After that, 70 mg of the preliminary polymerization catalyst 2, excluding weight of the preliminary polymerization polymer, was pressure fed into the polymerization reactor with high pressure argon for initiation of polymerization. After maintaining of the reactor at 75° C. for 1 hour, 5 ml of ethanol was pressure fed for termination of polymerization. In this way, 383 g of a polymer was obtained.

Evaluation results of the resultant polymer sample are shown in Table 3.

Example 15

Polymerization Example 15

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 300 NmL of hydrogen was introduced, and subsequently 16 g of ethylene was introduced. Then 750 g of liquid propylene was introduced, and then the temperature was raised to 75° C.

After that, 40 mg of the preliminary polymerization catalyst 5, excluding weight of the preliminary polymerization polymer, was pressure fed into the polymerization reactor with high pressure argon for initiation of polymerization. After maintaining of the reactor at 75° C. for 3 hours, 5 ml of ethanol was pressure fed for termination of polymerization. In this way, 352 g of a polymer was obtained. In addition, ethylene content of the resultant polymer was 1.31% by weight.

Evaluation results of the resultant polymer sample are shown in Table 2.

Example 16

Polymerization Example 16

After sufficient drying of a 3 L autoclave, in advance, by flowing of nitrogen under heating, the inside of the reactor was replaced with propylene and cooled to room temperature. After the addition of 2.86 mL of a heptane solution of tri-isobutylaluminum (143 mg/mL), 48 g of ethylene was introduced. Then 750 g of liquid propylene was introduced, and then the temperature was raised to 70° C.

After that, 100 mg of the preliminary polymerization catalyst 4, excluding weight of the preliminary polymerization polymer, was pressure fed into the polymerization reactor with high pressure argon for initiation of polymerization. After maintaining of the reactor at 75° C. for 1 hour, 5 ml of ethanol was pressure fed for termination of polymerization. In this way, 295 g of a polymer was obtained.

Evaluation results of the resultant polymer sample are shown in Table 3.

Comparative Example 1

Polymerization Example 17

The present Comparative Example 1 was carried out in accordance with Example 3 described in JP-A-2001-525460.
(Synthesis of a Macromer)

Into a 1 L autoclave sufficiently replaced with nitrogen, 500 mL of toluene, 2.5 mL of organoaluminumoxy compound (a hexane solution, MAO-3A: 1.47 mmol/mL, manufactured by Tosoh Finechem Corp.) and 37.5 g of propylene were introduced, which were heated to 105° C. and left as it is, till an equilibrium state is attained. After that, an activated one obtained by subjecting 2.5 ml of MMAO and 1 ml of a toluene solution of dichloro[1,1'-dimethylsilylenebis(2-methyl-4-phenyl-indenyl)]zirconium (1 mg/mL) to contacting, was pressure fed with high pressure argon, into the polymerization reactor for polymerization at 105° C. for 15 minutes. The resultant polymer solution was added into ethanol and after filtration, it was dried under reduced pressure to obtain 30.5 g of a polymer. As for molecular weight of said polymer, Mn was 13600, Mw/Mn=2.6 and also melting point was 142.9° C.
(Copolymerization of the Macromer)

Into a 1 L autoclave, 10 g of the above synthesized macromer was charged, and by heating of the autoclave at 110° C. under nitrogen gas flow, the macromer was further dried. After that 500 mL of toluene was charged and by stirring at 110° C. still more, the macromer was subjected to complete dissolution. The polymerization reactor was cooled, and after introduction of 2.5 mL of MMAO and 37.5 g of propylene, it was left as it is at 55° C. till an equilibrium state is attained. After that, an activated one obtained by subjecting 2.5 ml of MMAO and 1 ml of a toluene solution of dichloro[1,1'-dimethylsilylenebis(2-methyl-4-phenyl-indenyl)]zirconium (1 mg/mL) to contacting, was pressure fed with high pressure argon, into the polymerization reactor for polymerization for 15 minutes. After completion of the polymerization, a polymer was recovered by filtration, and dried under reduced pressure to obtain 38 g of the polymer.

Evaluation results of the resultant polymer sample are shown in Table 3.

In polymerization Example 17 of Comparative Example 1, because a complex having inferior macromer generation efficiency is used, as compared with Examples 1 to 16, copolymerization is carried out by using a low molecular weight macromer with low stereoregularity, which was produced under special (low pressure, high temperature) condition, in slurry polymerization.

As a result, solvent soluble components increased. In addition, improvement effect of melt property is small due to having molecular weight distribution which is broaden to a low molecular weight side.

Comparative Example 2

Polymerization Example 18

The present Comparative Example 2 was carried out in accordance with Example 29 described in JP-A-2002-523575.

Into a 1 L autoclave sufficiently replaced with nitrogen, 500 mL of heptane, 2.5 mL of MMAO, and an activated one obtained by subjecting 2.5 ml of MMAO and 1 ml of a toluene solution of dichloro[1,1'-dimethylsilylenebis(2-methyl-4-phenyl-indenyl)]zirconium (1 mg/mL) to contacting, were introduced and maintained at 50° C. Propylene was introduced slowly and the final pressure inside the polymerization reactor was maintained at 0.5 MPa for polymerization for 1 hour. After completion of the polymerization, a polymer was recovered by filtration, and dried under reduced pressure to obtain 35 g of the polymer.

Evaluation results of the resultant polymer sample are shown in Table 3.

In polymerization Example 18 of Comparative Example 2, because a catalyst used and polymerization condition are different, as compared with Examples 1 to 16, branch quantity of the resultant polymer is less, and strain hardening is small. In addition, there is defect of not suitable to foam molding, due to having no broadening of molecular weight distribution to a high molecular weight side.

Comparative Example 3

On a commercial product of polypropylene (PF814, manufactured by Basel Co., Ltd.) which is cross-linked by irradiation of electron beams, properties were measured similarly to obtain the results shown in Table 3.

It is considered that by a radical reaction caused by irradiation of electron beams, branching and cross-linking are generated, however, because of difference of branch generation mechanism from macromer copolymerization, in a propylene polymer cross-linked with electron beams, branched carbons with the same structure as in Examples 1 to 16 are not detected. Difference of branch structure generates difference of thermal stability of a branch molecule, for example, provides influence on decrease degree of melt property in carrying out repeated extrusion. In addition, it is considered that molecular scission or isomerization occur inevitably at the same time of cross-linking in irradiation of electron beams, which increases solvent soluble components. As a result, it has defect that cleanness is impaired.

Comparative Example 4

Polymerization Example 19 rac-dichloro[1,1'-dimethylsilylenebis(2-methyl-4-phenyl-indenyl)]zirconium was synthesized, in accordance with Example 1 described in JP-A-8-208733.

(1-1) Chemical Treatment of the Ion-Exchangeable Layered Silicate Salt

In a separable flask, 96% sulfuric acid (1500 g) was added into 2260 g of distilled water, and then 600 g of montmorillonite (BENCLAY SL: average particle diameter 19 µm, manufactured by Mizusawa Industrial Chemicals, Ltd.) was added as a layered silicate salt. This reaction slurry was heated to 90° C. taking 1 hour in 0.5° C./minute, and subjected to a reaction at 90° C. for 480 minutes. This reaction slurry was cooled to room temperature taking 1 hour, and washed with distilled water, till pH3. The resultant solid was subjected to preliminary drying at 130° C. for two days under nitrogen gas flow, and then coarse particles with a diameter of equal to or larger than 53 µm were removed, and further by subjecting the residue to drying with a rotary kiln under condition of 215° C., nitrogen gas flow, and a residence time of 10 minutes, 295 g of chemically treated smectite was obtained.

Composition of this chemically treated smectite was Al: 2.72% by weight, Si: 43.48% by weight, Mg: 0.36% by weight, and Fe: 0.61% by weight, and Al/Si=0.065 [mol/mol]. In addition, it was found with X-ray diffraction measurement that peaks were observed at 2θ=19° to below 21° (A) and 21° to 23° (B), and intensity ratio of these peaks (B)/(A) was 2.45.

(1-2) Preparation of a Catalyst and Preliminary Polymerization

Into a three-neck flask (volume 1 L), 20 g of the chemically treated smectite obtained above was charged, and heptanes (114 mL) was added thereto to make slurry, and after stirring for 1 hour by the addition of triethylaluminum (50 mmol: 381 mL of a heptane solution with a concentration 71 mg/mL), it was washed with heptane so that the remaining solution ratio became 1/100, and then heptanes was added to obtain a total volume of 200 mL.

In addition, in an another flask (volume 200 mL), (dimethylsilylenebis(2-methyl-4-phenyl-indenyl)]zirconium-dichloride (0.3 μmol) was added into heptane (85 mL) to make slurry, and then, triisobutylaluminum (0.6 mmol: 0.85 mL of a heptane solution with concentration of 143 mg/mL) was added, to be subjected to a reaction under stirring at room temperature for 60 minutes. This solution was added into a 1 L flask containing the above chemically treated smectite, and stirred at room temperature for 60 minutes. After that, 214 mL of heptanes was added and this slurry was introduced to a 1 L autoclave.

After raising inside temperature of the autoclave to 40° C., propylene was fed in a rate of 20 g/hr for carrying out preliminary polymerization for 2 hours while maintaining at 40° C. After that, propylene feed was stopped for carrying out remaining polymerization. Supernatant of the resultant catalyst slurry was removed by decantation, and then triisobutylaluminum (12 mmol: 17 mL of a heptane solution with a concentration 140 mg/mL) was added to the remaining part, for stirring for ten minutes. By drying this solid for 2 hours under reduced pressure, 47.6 g of dried preliminary polymerization catalyst was obtained. Preliminary polymerization rate (value of quantity of preliminary polymerization polymer divided with quantity of the solid catalyst) was 1.38.

(1-3) Propylene Polymerization

After sufficient drying of a 3 L autoclave, in advance, by flowing of nitrogen under heating, the inside of the reactor was replaced with propylene and cooled to room temperature.

After the addition of 2.86 mL of a heptane solution of triisobutylaluminum (140 mg/mL), 750 g of liquid propylene was introduced, and then the temperature was raised to 70° C. After that, 600 mg of the above preliminary polymerization catalyst, excluding weight of the preliminary polymerization polymer, was pressure fed into the polymerization reactor with high pressure argon for polymerization at 70° C. for 1 hour. Polymerization was terminated by the addition of 10 mL of ethanol, and remaining propylene was purged to obtain 96 g of a polymer. Evaluation results of the resultant polymer sample are shown in Table 3.

TABLE 2

|  |  | Example 1 | Example 2 | Example 3 | Example 4 | Example 5 |
|---|---|---|---|---|---|---|
|  |  | Polymerization Example 1 | Polymerization Example 2 | Polymerization Example 3 | Polymerization Example 4 | Polymerization Example 5 |
| MFR | g/min | 1.1 | 2.5 | 4.6 | 0.5 | 0.2 |
| Mw | *$10^4$ g/mol | 47.2 | 36.2 | 29.1 | 44.7 | 52.3 |
| Q | — | 6.9 | 5.3 | 4.5 | 6.1 | 4.5 |
| α/β | — | 1.33 | 1.14 | 1.21 | 1.68 | 1.04 |
| W (>2000000) | wt % | 4.56 | 3.10 | 1.79 | 4.3 | 4.2 |
| mm | % | 98.4 | 98.0 | 98.2 | 98.4 | 97.8 |
| Tm | ° C. | 154.0 | 154.3 | 154.5 | 155.8 | 153.7 |
| Tc | ° C. | 115.5 | 116.6 | 118.6 | 118.1 | 114.8 |
| Soluble Contents at 40° C. | wt % | 0.1 | 0.2 | 0.2 | 0.1 | 0.2 |
| Structure (1)* | /1000 C | trace | trace | trace | trace | trace |
| $\lambda_{max}$ | — | 25.6 | 19.2 | 22.0 | 22.0 | 13.3 |
| ME | — | 3.20 | 3.05 | 2.95 | 3.24 | 2.60 |
|  |  | Example 6 | Example 7 | Example 8 | Example 9 | Example 10 |
|  |  | Polymerization Example 6 | Polymerization Example 7 | Polymerization Example 8 | Polymerization Example 9 | Polymerization Example 10 |
| MFR | g/min | 0.5 | 1.1 | 3.1 | 0.5 | 3.8 |
| Mw | *$10^4$ g/mol | 45.6 | 39.9 | 34.7 | 40.5 | 33.5 |
| Q | — | 4.8 | 4.7 | 5.2 | 5.0 | 5.7 |
| α/β | — | 1.29 | 1.17 | 1.14 | 1.65 | 1.21 |
| W (>2000000) | wt % | 3.68 | 2.48 | 2.34 | 3.06 | 3.01 |
| mm | % | 97.6 | 97.8 | 97.5 | 97.7 | 97.9 |
| Tm | ° C. | 153.7 | 153.8 | 153.9 | 156.4 | 152.6 |
| Tc | ° C. | 114.1 | 115.6 | 114.5 | 117.6 | 118.4 |
| Soluble Contents at 40° C. | wt % | 0.2 | 0.2 | 0.2 | 0.2 | 0.2 |
| Structure (1)* | /1000 C | trace | trace | trace | trace | trace |
| $\lambda_{max}$ | — | 13.7 | 10.2 | 11.0 | 12.9 | 19.0 |
| ME | — | 2.6 | 2.55 | 2.5 | 3.10 | 2.99 |

*"trace" indicates detection of structure (1) but quantity thereof is below 0.1/1000 carbons.

TABLE 3

|  |  | Example 11 | Example 12 | Example 13 | Example 14 | Example 15 |
|---|---|---|---|---|---|---|
|  |  | Polymerization Example 11 | Polymerization Example 12 | Polymerization Example 13 | Polymerization Example 14 | Polymerization Example 15 |
| MFR | g/min | 1.5 | 22.0 | 56.5 | 3.0 | 15.6 |
| Mw | *$10^1$ g/mol | 34 | 28.8 | 17.3 | 30.9 | 24.3 |
| Q | — | 4.1 | 4.6 | 3.8 | 4.1 | 4.1 |
| α/β | — | 1.21 | 1.05 | 1.05 | 1.14 | 0.91 |
| W (>2000000) | wt % | 2.69 | 0.85 | 0.45 | 1.31 | 1.56 |
| mm | % | 97.8 | 97.9 | 97.5 | 97.6 | 97.5 |
| Tm | °C. | 153.4 | 154.0 | 153.0 | 150.1 | 144.8 |
| Tc | °C. | 117.4 | 117.6 | 116.3 | 112.2 | 108.5 |
| Soluble Contents at 40°C. | wt % | 0.2 | 0.3 | 0.5 | 0.2 | 0.6 |
| Structure (1)* | /1000 C | trace | trace | trace | trace | trace |
| $\lambda_{max}$ | — | 18.0 | 10.4 | 9.5 | 11.1 | 7.3 |
| ME | — | 3.18 | 2.59 | 2.29 | 2.32 | 2.22 |

|  |  | Example 16 | comparative Example 1 | comparative Example 2 | comparative Example 3 | comparative Example 4 |
|---|---|---|---|---|---|---|
|  |  | Polymerization Example 16 | Polymerization Example 17 | Polymerization Example 18 |  | Polymerization Example 19 |
| MFR | g/min | 29.8 | 0.6 | 1.0 | 2.3 | 0.7 |
| Mw | *$10^1$ g/mol | 26.3 | 39 | 33.0 | 32.6 | 61.0 |
| Q | — | 4.5 | 8.3 | 2.1 | 4.9 | 4.6 |
| α/β | — | 0.94 | 0.25 | 0.90 | 1.20 | 1.80 |
| W (>2000000) | wt % | 2.25 | 1.47 | 0.30 | 1.92 | 6.51 |
| mm | % | 97.5 | 90.3 | 96.0 | 92.5 | 93.7 |
| Tm | °C. | 128.8 | 156.3 | 157.7 | 158.0 | 146.2 |
| Tc | °C. | 95.2 | 117.7 | 117.9 | 129.4 | 11.5 |
| Soluble Contents at 40°C. | wt % | 1.5 | 11.2 | 0.2 | 5.1 | 0.9 |
| Structure (1)* | /1000 C | trace | 0.1 | trace | Non Detect | 0.3 |
| $\lambda_{max}$ | — | 6.0 | 5.0 | 1.0 | 34.0 | 5.9 |
| ME | — | 1.90 | 1.69 | 1.20 | 1.90 | 1.78 |

*"trace" indicates detection of structure (1) but quantity thereof is below 0.1/1000 carbons.

Example 17

Polymerization Example 20

Catalyst Preparation

Into a 100-mL two-neck flask, 200 mg of the ion-exchangeable layered silicate salt synthesized in (1-1) of Catalyst Synthesis Example 1, was weighed, and after the addition of 1.30 mL of n-heptane, 0.70 mL of a heptane solution of triisobutylaluminum (TiBA) (140 mg/mL) was added at room temperature to be subjected to stirring and a reaction. After 1 hour, 50 mL of n-heptane was added and stirring was carried out for 5 minutes and then it was stood still. Fifty-mL of supernatant was drawn out with a siphon. This addition of heptane was carried out twice in total.

In parallel, rac-dichloro[1,1'-dimethylsilylenebis{2-(5-methyl-2-furyl)-4-phenyl-indenyl}]hafnium, and rac-dichloro[1,1'-dimethylsilylenebis{2-methyl-4-(4-chlorophenyl)-4-hydroazulenyl}]hafnium, synthesized in Synthesis Example 2 and Synthesis Example 3 of the catalyst component (A), respectively, were weighed and dissolved in toluene to prepare each solution of 0.5 mg/mL of the component [A-1] (0.590 μmol/mL) and the component [A-2] (0.615 μmol/mL).

Into the ion-exchangeable layered silicate salt treated with TiBA, prepared in advance, 4.07 mL (2.4 μmol) of the solution of the component [A-1], rac-dichloro[1,1'-dimethylsilylenebis{2-(5-methyl-2-furyl)-4-phenyl-indenyl}]hafnium, was added to be subjected to a reaction, and after 5 minutes, 0.49 mL (0.3 μmol) of rac-dichloro[1,1'-dimethylsilylenebis{2-methyl-4-(4-chlorophenyl)-4-hydroazulenyl}] hafnium was added to be subjected to a reaction.

In this catalyst preparation, it is calculated that the component [A-1]/(the component [A-1]+the component [A-2])= 0.89.

(Polymerization)

After sufficient drying of a 3 L autoclave, in advance, by flowing of nitrogen under heating, the inside of the reactor was replaced with propylene and cooled to equal to or lower than 40° C. After that 2.86 mL (2.02 mmol) of a heptane solution of triisobutylaluminum (140 mg/mL) was added, 400 mL of hydrogen was added, then 750 g of liquid propylene was introduced, and the temperature was raised to 75° C.

After the temperature was stabilized, whole quantity of the catalyst prepared above was pressure fed with argon for initiation of propylene polymerization. After 1 hour, 5 ml of ethanol was added for termination of polymerization, and by purging the residual propylene monomer, 213 g of a propylene polymer was recovered. Catalytic activity per solid catalyst was 1070 g/g, hr and catalytic activity per metal complex was 78,900 g/g-complex, hr. Strain hardening property (λmax) by measurement of extensional viscosity of the resultant polymer was 12.3, and MFR was 19.3, weigh average molecular weight (Mw) was 219,000, molecular weight distribution (Mw/Mn) was 4.50, ME was 2.25 and melting point was 153.7° C. Results are summarized in Table 4.

Example 18

Polymerization Example 21

After sufficient drying of a 3 L autoclave, in advance, by flowing of nitrogen under heating, the inside of the reactor was replaced with propylene and cooled to room temperature. After the addition of 2.86 mL of a heptane solution of triisobutylaluminum (144 mg/mL), 450 NmL of hydrogen was introduced, and then 750 g of liquid propylene was introduced, and after that the temperature was raised to 75° C.

Then, 70 mg of the preliminary polymerization catalyst 5, excluding weight of the preliminary polymerization polymer, was pressure fed into the polymerization reactor with high pressure argon for initiation of polymerization. After maintaining of the reactor at 75° C. for 1 hour, unreacted propylene was quickly purged for termination of polymerization.

As a result, 166 g of a polymer was obtained. Catalytic activity per solid catalyst was 2360 g/g, hr. Strain hardening property (λmax) by measurement of extensional viscosity of the resultant polymer was 13, and MFR was 2.6, weigh average molecular weight (Mw) was 325,000, molecular weight distribution (Mw/Mn) was 4.81, ME was 2.79 and melting point was 154° C. Results are summarized in Table 4.

Example 19

Polymerization Example 22

Polymerization was carried out similarly as in polymerization Example 18, except that 50 mg of the preliminary polymerization catalyst 2, excluding the weight of the preliminary polymerization polymer, was used, and further, 300 mL of hydrogen was added before introduction of propylene. As a result, 196 g of a polymer was obtained. Catalytic activity per solid catalyst was 3920 g/g, hr. Strain hardening property (λmax) by measurement of extensional viscosity of the resultant polymer was 14.5, and MFR was 1.55, weigh average molecular weight (Mw) was 368,000, molecular weight distribution (Mw/Mn) was 5.30, ME was 2.66 and melting point was 154.0° C. Results are summarized in Table 4.

Example 20

Polymerization Example 23

Polymerization was carried out similarly as in polymerization Example 18, except that 150 mg of the preliminary polymerization catalyst 1, synthesized in Catalyst Synthesis Example 1, excluding the weight of the preliminary polymerization polymer, was used, further, 50 mL of hydrogen was added before introduction of propylene, and polymerization time was set at 2 hours. As a result, 457 g of a polymer was obtained. Catalytic activity per solid catalyst was 1253 g/g, hr. Strain hardening property (λmax) by measurement of extensional viscosity of the resultant polymer was 17.8, and MFR was 1.28, weigh average molecular weight (Mw) was 355,000, molecular weight distribution (Mw/Mn) was 5.00, ME was 3.10 and melting point was 154.5° C. Results are summarized in Table 4.

Example 21

Polymerization Example 24

After sufficient drying of a 3 L autoclave, in advance, by flowing of nitrogen under heating, the inside of the reactor was replaced with propylene and cooled to room temperature. After the addition of 2.86 mL of a heptane solution of triisobutylaluminum (144 mg/mL), 750 g of liquid propylene was introduced, and then the temperature was raised to 70° C.

Then, 300 mg of the preliminary polymerization catalyst 4, synthesized in Catalyst Synthesis Example 4, excluding weight of the preliminary polymerization polymer, was pressure fed into the polymerization reactor with high pressure argon for initiation of polymerization. After maintaining of the reactor at 70° C. for 1 hour, unreacted propylene was quickly purged for termination of polymerization. As a result, 226 g of a polymer was obtained. Catalytic activity per solid catalyst was 753 g/g, hr. Strain hardening property (λmax) by measurement of extensional viscosity of the resultant polymer was 26.5, and MFR was 1.82, weigh average molecular weight (Mw) was 351,000, molecular weight distribution (Mw/Mn) was 5.70, ME was 3.08 and melting point was 153.9° C. Results are summarized in Table 4.

Example 22

Polymerization Example 25

Catalyst Synthesis

Into a three-neck flask (volume 1 L), 20 g of the chemically treated smectite, prepared in (1-1) of Catalyst Synthesis Example 1, was added to make slurry, and after the addition of triisobutylaluminum (50 mmol: 69.2 mL of a heptane solution with a concentration of 143 mg/mL) was added and stirring for 1 hour, the solution was washed with heptane so that the remaining solution ratio became 1/100, and then heptanes was added to obtain a total volume of 200 mL.

In addition, in an another flask (volume 200 mL), rac-dichloro[1,1'-dimethylsilylenebis{2-(5-methyl-2-furyl)-4-(4-t-butylphenyl)-indenyl}]hafnium (210 μmol), prepared in Synthesis Example 1 of the above catalyst component (A), was dissolved in toluene (60 mL) (solution 1), and further, in an another flask (volume 200 mL), rac-dichloro[1,1'-dimethylsilylenebis{2-methyl-4-(4-chlorophenyl)-4-hydroazulenyl}]hafnium, synthesized in Synthesis Example 3 of the catalyst component (A), was dissolved in toluene (24 mL) (solution 2).

After the addition of triisobutylaluminum (1.2 mmol: 1.63 mL of a heptane solution with a concentration 143 mg/mL) into a 1 L flask containing the above chemically treated smectite, the above solution 1 was added, and then further 5 minutes later, the above solution 2 was added, and stirred at room temperature for 1 hour.

After that, 216 mL of heptanes was added and this slurry was introduced to a 1 L autoclave. After raising the inside temperature of the autoclave to 40° C., propylene was fed in a rate of 20 g/hr for carrying out preliminary polymerization for 2 hours while maintaining at 40° C. After that, propylene feed was stopped and inside temperature was raised to 50° C. for carrying out remaining polymerization till pressure inside the autoclave became 0.05 MPa. Supernatant of the resultant catalyst slurry was removed by decantation, and then triisobutylaluminum (12 mmol: 16.6 mL of a heptane solution with a concentration 143 mg/mL) was added to the remaining part, for stirring for five minutes.

By drying this solid for 2 hours under reduced pressure, 61.9 g of dried preliminary polymerization catalyst was obtained. Preliminary polymerization rate (value of quantity of preliminary polymerization polymer divided with quantity of the solid catalyst) was 2.10 (a preliminary polymerization catalyst 6).

In this catalyst preparation, it is calculated that the component [A-1]/(the component [A-1]+the component [A-2])= 0.7.

(Polymerization)

After sufficient drying of a 3 L autoclave, in advance, by flowing of nitrogen under heating, the inside of the reactor was replaced with propylene and cooled to room temperature. After the charging of 2.86 mL of a heptane solution of triisobutylaluminum (140 mg/mL), 5 g of ethylene, 30 g of butane and subsequently 80 NmL of hydrogen were introduced. Then 750 g of liquid propylene was introduced, and then the temperature was raised to 70° C.

Then, 30 mg of the above preliminary polymerization catalyst 6, excluding weight of the preliminary polymerization polymer, was pressure fed into the polymerization reactor with high pressure argon for initiation of polymerization. After maintaining of the reactor at 70° C. for 1 hour, unreacted propylene was quickly purged for termination of polymerization. As a result, 203 g of a polymer was obtained.

Strain hardening property (λmax) by measurement of extensional viscosity of the resultant polymer was 12.8, and MFR was 6.19, weigh average molecular weight (Mw) was 255,000, molecular weight distribution (Mw/Mn) was 3.7, ME was 2.55 and melting point was 142.0° C. Results are summarized in Table 4.

tite, the above slurry solution was added, to be subjected to a reaction at room temperature for 60 minutes under stirring. After that, 340 mL of heptanes was added and this slurry was introduced to a 1 L autoclave.

After raising the inside temperature of the autoclave to 40° C., propylene was fed in a rate of 10 g/hr for carrying out preliminary polymerization for 2 hours while maintaining at 40° C. After that, propylene feed was stopped for carrying out remaining polymerization at 50° C. for 0.5 hour.

Supernatant of the resultant catalyst slurry was removed by decantation. Triisobutylaluminum (6 mmol: 8.5 mL of a heptane solution with a concentration 140 mg/mL) was added to the part remained by the above decantation, for stirring for 10 minutes. By drying of this solid for 2 hours under reduced pressure, 30 g of dried preliminary polymerization catalyst was obtained. Preliminary polymerization rate (value of

TABLE 4

|  |  | Example 17 | Example 18 | Example 19 | Example 20 | Example 21 | Example 22 |
|---|---|---|---|---|---|---|---|
|  |  | Polymerization Example 20 | Polymerization Example 21 | Polymerization Example 22 | Polymerization Example 23 | Polymerization Example 24 | Polymerization Example 25 |
| MFR | g/min | 19.3 | 2.80 | 1.55 | 1.28 | 1.82 | 6.19 |
| Mw | *$10^4$ g/mol | 21.9 | 32.5 | 36.8 | 35.5 | 35.1 | 25.5 |
| Q | — | — | 4.5 | 4.8 | 5.3 | 5.0 | 5.7 | 3.7 |
| α/β | — | 1.21 | 1.33 | 1.27 | 1.35 | 1.28 | 1.11 |
| W (>2000000) | wt % | 0.91 | 2.14 | 2.27 | 2.44 | 3.18 | 0.83 |
| mm | % | 97.6 | 97.3 | 97.6 | 98.2 | 97.9 | 97.0 |
| Tm | ° C. | 153.7 | 154.0 | 154.0 | 154.5 | 153.9 | 142.0 |
| Tc | ° C. | 117.5 | 117.7 | 114.7 | 117.2 | 119.5 | 104.0 |
| Soluble Contents at 40° C. | wt % | 0.4 | 0.3 | 0.2 | 0.2 | 0.3 | 0.6 |
| Structure (1)* | /1000 C | trace | trace | trace | trace | trace | trace |
| $\lambda_{max}$ | — | 12.3 | 13 | 14.5 | 17.8 | 26.5 | 12.8 |
| ME | — | 2.25 | 2.79 | 2.66 | 3.10 | 3.08 | 2.55 |

*"trace" indicates detection of structure (1) but quantity thereof is below 0.1/1000 carbons.

Reference Example 1

Polymerization Example of the Component [A-1] Only

Preparation of a Catalyst and Preliminary Polymerization

Into a three-neck flask (volume 1 L), 10 g of the chemically treated smectite, obtained by chemical treatment of the ion-exchangeable layered silicate salt in (1-1) of Catalyst Synthesis Example 1, was charged to make slurry by the addition of heptanes (65 mL), and after the addition of triisobutylaluminum (25 mmol: 35 mL of a heptane solution with a concentration of 140 mg/mL) thereto and stirring for 1 hour, the solution was washed with heptane so that the remaining solution ratio became 1/100, and then heptanes was added to obtain a total volume of 200 mL.

In addition, in an another flask (volume 200 mL), rac-dichloro[1,1'-dimethylsilylenebis{2-(5-methyl-2-furyl)-4-(4-t-butylphenyl)-indenyl}]hafnium (0.3 mmol), synthesized in Synthesis Example 1 of the catalyst component (A), was added in toluene (60 mL) to make a slurry solution.

After the addition of triisobutylaluminum (0.6 mmol: 1.7 mL of a heptane solution with a concentration 140 mg/mL) into a 1 L flask containing the above chemically treated smecquantity of preliminary polymerization polymer divided with quantity of the solid catalyst) was 1.50 (preliminary polymerization catalyst 7).

[Polymerization of Propylene]

After sufficient drying of a 3 L autoclave, in advance, by flowing of nitrogen under heating, the inside of the reactor was replaced with propylene and cooled to room temperature. After the charging of 2.86 mL of a heptane solution of triisobutylaluminum (140 mg/mL), 750 g of liquid propylene was introduced, and then the temperature was raised to 75° C.

Then, 200 mg of the above preliminary polymerization catalyst 7, excluding weight of the preliminary polymerization polymer, was pressure fed into the polymerization reactor with high pressure argon for initiation of polymerization. After maintaining of the reactor at 75° C. for 1 hour, unreacted propylene was quickly purged for termination of polymerization. As a result, 213 g of a polymer was obtained.

As a result of measurement of molecular weight of this polymer with GPC, weight average molecular weight (Mw) was 122,000, and number average molecular weight (Mn) was 52,000. In addition, mm determined with $^{13}$C-NMR was 97.3% and melting point (Tm) determined with DSC was 154.8° C.

In addition, in measurement with the above $^{13}$C-NMR, carbon 1 of a propenyl group (a terminal vinyl group) with the structural formula (2) is observed at 115.5 ppm, while carbon 2 is observed at 137.6 ppm.

[Chemical formula 12]

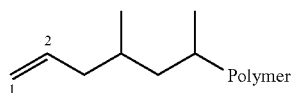

Structural formula (2)

Here, concentration of the propenyl group in total 1000 skeleton forming carbons was determined by the following expression, and found to be 0.4, provided that carbons which form the whole skeleton mean all carbon atoms other than the methyl carbons:

[Vi]=[peak intensity of carbon 1]/[peak intensity of total skeleton forming carbons]*1000

In addition, because of no observation of other peaks in an olefin region, it was found that unsaturated structures other than propenyl group with the structural formula (2) are absent, and as other terminal structure, an isobutyl terminal was observed, whose concentration was similarly 0.4 per 1000 carbons. Molecular weight of this polymer was calculated from the resultant propenyl terminal and isobutyl terminal, and found to be 52,000, which was coincident with number average molecular weight determined with GPC.

Here, terminal vinyl ratio was calculated from this terminal vinyl concentration [Vi] and number average molecular weight (Mn) determined with GPC, by using the following expression, and found to be 99%:

[Terminal vinyl ratio]=(Mn/42)×2×[Vi]/1000

From the above Reference Example 1, it is understood that a vinyl structure is introduced selectively at the terminal to a polymer obtained by polymerization under the same condition as in Production Example of the present invention, by using a catalyst composed of the component [A-1] only.

Here, it is estimated that, in a catalyst in combination of the component [A-1] and the component [A-2] as in Production Example of the present invention, a polymer derived from this component [A-1] acts as what is called a macromer, and is copolymerized by the component [A-2].

Therefore, it may be estimated that, in the propylene-based polymer of the present invention, branch chains having the same degree of molecular weight and regularity as a polymer of Reference Example 1 obtained from component [A-1] only, were introduced.

Structural Analysis Example

Branch Structure Analysis with High Magnetic Field NMR

As for branch structure of the propylene-based polymer of the present invention, measurement and analysis of branch structure were carried out under the following condition, by using the following NMR spectrometer in still more higher magnetic field as compared with the above NMR spectrometer (GSX-400, manufactured by JEOL Ltd.), on the polymer of Example 3 (Polymerization Example 3):

In an NMR sample tube (10 mmφ), 470 mg of a sample was dissolved completely in 2.6 mL of deuterated 1,1,2,2-tetrachloroethane, and then the solution was heated at 120° C. for measurement. As for chemical shift, a center peak of three peaks of deuterated 1,1,2,2-tetrachloroethane was set at 74.2 ppm. Chemical shifts of other carbon peaks are based on this as standard.

Apparatus name: Unity Inova, manufactured by Varian Co., Ltd.

Flip angle: 90°

Pulse interval: 15.0 sec.

Resonance frequency: 125.7 MHz

Integration times: 14,400 times

Figure 10:
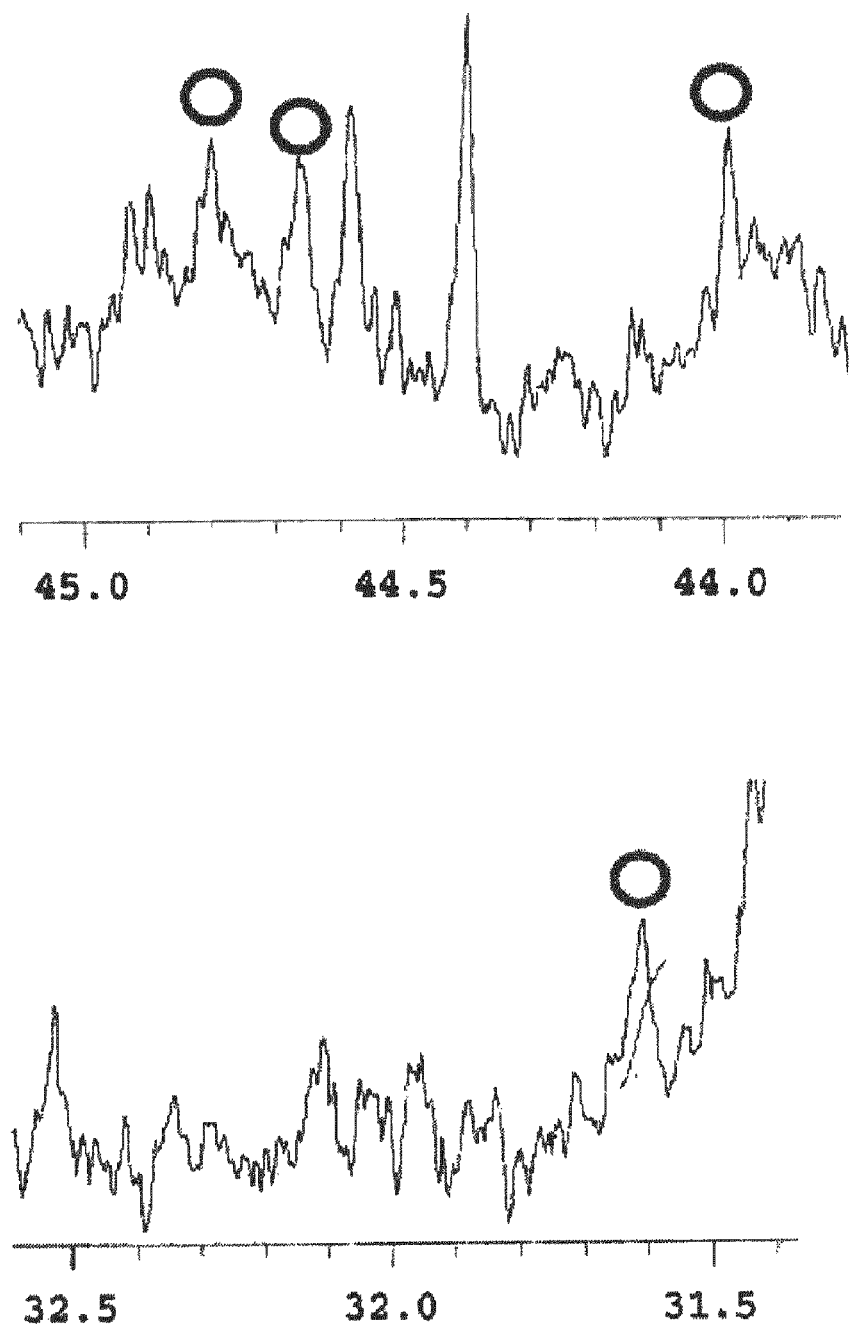
FIG. 10 is a drawing which shows a part of NMR measurement results in a structure analysis example (numerical values of abscissa axis represent chemical shifts).

As the measurement result, total three methylene carbons (Ca, Cb and Cc) are observed for each one at 43.9 to 44.1 ppm, 44.5 to 44.7 ppm and 44.7 to 44.9 ppm, and a methyne carbon (Cbr) is observed at 31.5 to 31.7 ppm. From this result, it has been found that these polymers have a part with a branch structure represented by the structural formula (1). FIG. 10 shows excerpt of an NMR chart.

In addition, quantity of Cbr was determined from integral value of the branched carbon (Cbr) observed at the above 31.5 to 31.7 ppm, and found to be 0.1 per 1000 carbons which form the whole skeleton.

Evaluation Examples 1 to 10

To the polymer obtained in the above Polymerization Examples 1, 2, 3, 6, 8, 9, 10, 11 and 19, 1250 ppm of Irganox 1010 (manufactured by Chiba Specialty Chemicals co., Ltd.), 1250 ppm of Irgaphos 168 (manufactured by Chiba Specialty Chemicals co., Ltd.) and 1250 ppm of calcium stearate (manufactured by NOF Corp.) were added as additives, to be subjected to pelletization by carrying out a melt kneading, by using same direction intermeshing-type twin-screw extruder, KZW15TW-45MG, manufactured by Technovel Corp.

By using the pellets prepared by the above melt kneading, and the commercial product (pellets) of polypropylene crosslinked by irradiation with electron beams used in Comparative Example 3, MT and MaxDraw were measured by a method described in the present description. Measurement results thereof are shown in Table 5.

TABLE 5

| | | Evaluation Example 1 | Evaluation Example 2 | Evaluation Example 3 | Evaluation Example 4 | Evaluation Example 5 |
|---|---|---|---|---|---|---|
| Polymer | | Polymerization Example 1 | Polymerization Example 2 | Polymerization Example 3 | Polymerization Example 6 | Polymerization Example 8 |
| MT | g | 27.6 | 15.0 | 10.7 | 19.9 | 7.9 |
| Maximal drawing rate | m/min | 13.7 | 35.6 | 66.0 | 50.4 | 75.7 |

TABLE 5-continued

|  |  | Evaluation Example 6 | Evaluation Example 7 | Evaluation Example 8 | Evaluation Example 9 | Evaluation Example 10 |
|---|---|---|---|---|---|---|
| Polymer |  | Polymerization Example 9 | Polymerization Example 10 | Polymerization Example 11 | Comparative Example 3 | Polymerization Example 19 |
| MT | g | 19.6 | 14.0 | 18.7 | 20.2 | 22.3 |
| Maximal drawing rate | m/min | 51.0 | 40.5 | 21.5 | 8.9 | 4.0 |

As is clear from Tables 2 to 5, it is considered that the propylene-based polymer of the present invention is excellent in balance of mechanical properties, as well as has improved melt tension (MT) or melt drawability, and is excellent in molding workability and appearance, due to being characterized by having high melt tension, high strain hardening property and high swell ratio.

On the other hand, the propylene-based polymers of Comparative Examples 1 and 2 have, in particular, a strain hardening degree (λmax) of below 2.0, specifically 1.2, in measurement of extensional viscosity, therefore, it is considered to have low strength in melting and inferior mechanical property. In addition, in the commercial product of polypropylene cross-linked by irradiation with electron beams in Comparative Example 3, branched carbons with the same structural formula (1) as in Examples 1 to 16 are not detected. In addition, it is considered that molecular scission or isomerization inevitably occur at the same time of cross-linking in electron beam irradiation, resulting in increase in solvent elution components.

Application Example 1

To 100 parts by weight of the pelletized polymer in Evaluation Example 1, 10 parts of a master-batch material containing 40% by weight of a thermal decomposition-type foaming agent (product name, CF40E, manufactured by Clariant Japan K.K.), was added, to obtain a strand-like foamed body by extrusion molding, by using a single-screw extruder (diameter 30 mmφ, L/D=28).

Figure 8:
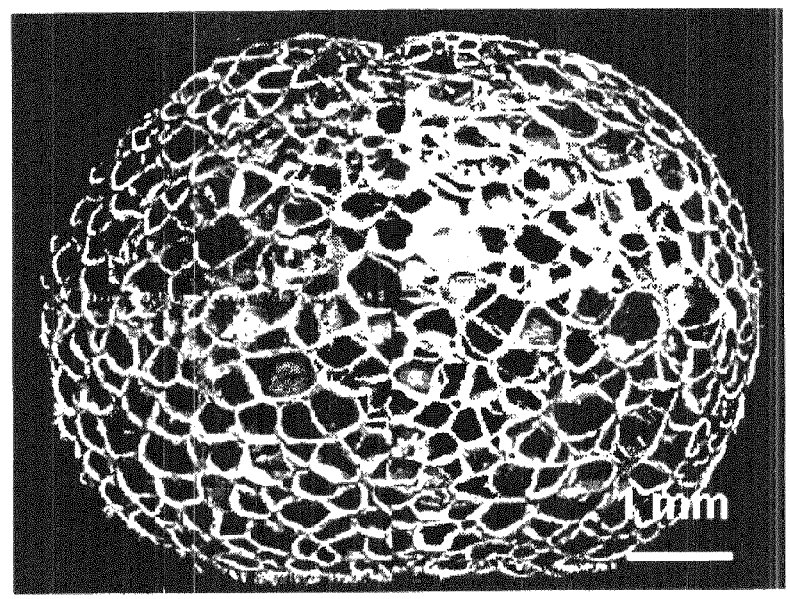
FIG. 8 is a cross-section of a propylene-based polymer of the present invention observed with SEM, when it is subjected to foaming in a magnification of 9.2 times.

Morphological observation of a cross-section of the strand-like foamed body was carried out by using a scanning electron microscope (SEM), and observation result was obtained as shown in FIG. 8.

In addition, as a result of carrying out measurement of mass, volume and density of the foamed body, and measurement of void ratio with an air-comparison-type specific gravimeter, as well as image analysis, it was found that foaming magnification was 9.2 times, continuous air bubble ratio was 17.8% and average air bubble diameter was 282 μm.

Application Example 2

Figure 9:
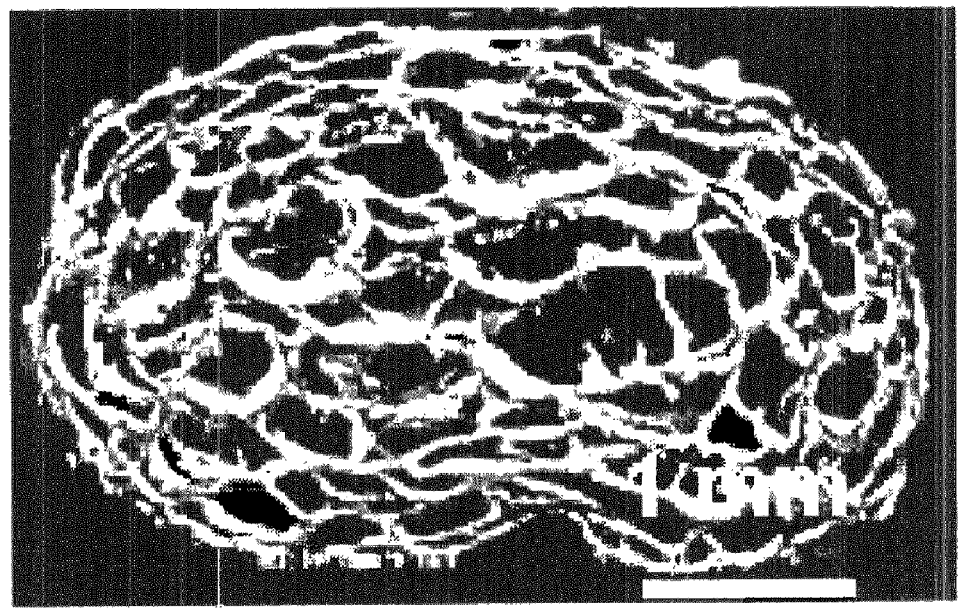
FIG. 9 is a cross-section, observed with SEM, of a commercial propylene-based polymer which is cross-linked with electron beams and subjected to foaming in a magnification of 9.2 times.

Similar molding and observation were carried out, similarly as in Application Example 1, by using a commercial product of polypropylene (PF814, manufactured by Basell Co., Ltd.) cross-linked by irradiation with electron beams, and observation result was obtained as shown in FIG. 9.

This product was found to have foaming magnification of 9.2 times, continuous air bubble ratio of 63.4% and average air bubble diameter of 386 μm.

As is understood by comparison between the above Application Example 1 and Application Example 2, in commercial polypropylene cross-linked by irradiation with electron beams of Application Example 2, it is difficult to obtain a structure body with independent air bubbles, in trying to form a foamed body having high foaming magnification of equal to or higher than nine times by extrusion molding, because resin deformation does not follow growth of air bubbles in molding process, resulting in break of resin walls among air bubbles, and bubble break, whereas in the case where a polymer having a controlled branch structure of the present invention is used as in the Application Example 1, break of the resin wall does not happen and bubble break seldom occurs, even in extensional deformation, because resin walls among air bubbles are thick in air bubble growth, due to having high strain hardening degree and high melt tension. That is, it is understood that a fine and uniform foamed body having low continuous air bubble ratio may be formed. Here ability to decrease continuous air bubble rate means ability to increase independent air bubble ratio.

In addition, the present inventors consider as follows on crystallinity, as reason for the propylene-based polymer of the present invention to enable to increase independent air bubble ratio.

It has been understood that the propylene-based polymer of the present invention has characteristics of short crystallization induction period, as well as slow crystallization rate on the contrary, in crystallization process.

The reason for this is not necessarily clear at this stage, however, it is considered to be caused by a microstructure such as regularity (mm, heterophilic binding) or a branch structure (length, density, distribution), which is characteristics of the propylene polymer of the present invention. It is as described above that characteristics in view of this structure may be controlled by production with a catalyst system prepared in combination of specific metallocene catalysts of the present invention.

As a result, it is considered that fine foamed body with high independent air bubble ratio may be produced, by forming of uniform and fine crystal nucleus at the early stage in the initial stage of air bubble generation, as well as, in air bubble growth process, by exhibition of excellent melt property, which is characteristics of the propylene-based polymer of the present invention, for sufficient period of time, so as to prevent bubble break.

The propylene-based polymer of the present invention may be used widely to various molding fields, for example, various molded articles such as various industrial injection molded parts, various containers, non-stretched films, mono-axially stretched films, bi-axially oriented films, sheets, deep-drawing thermoformed bodies, pipes, fibers, because of being excellent in molding workability due to having good flow characteristics, high melt tension, high swell ratio and high melt drawability.

In addition, the production method for the propylene-based polymer relevant to the present invention is also one having high industrial applicability, because of ability of producing the propylene-based polymer having the above excellent performance, in high productivity and efficiently, by a simple and convenient method in the presence of a catalyst containing specific two kinds of metallocene complex components.

Further, the propylene-based polymer enables to produce easily a foamed body having high independent air bubble property although having high foaming magnification, in carrying out foam molding, because of having characteristics of a specific crystallization style brought about by a metallocene-based catalyst.

What is claimed is:

1. A propylene-based polymer, having the following characteristics:
   (i): a melt flow rate (MFR) (at a temperature of 230° C. and a load of 2.16 kg) is 0.1 g/10 minutes to 100 g/10 minutes;
   (ii): a ratio (Q value) of weight average molecular weight (Mw) and number average molecular weight (Mn) measured with gel permeation chromatography (GPC) is 3.5 to 10.5;
   (iii): in a molecular weight distribution curve obtained by GPC, a ratio of components having a molecular weight (M) of equal to or higher than 2,000,000 is equal to or larger than 0.4% by weight and less than 10% by weight, relative to total weight;
   (iv): components which elute at a temperature of equal to or lower than 40° C., are equal to or less than 3.0% by weight, in temperature rising elution fractionation (TREF) by o-dichlorobenzene (ODCB);
   (v): an isotactic triad fraction (mm) measured with 13C-NMR is equal to or higher than 95%; and
   (vi): a strain hardening degree (λmax) in measurement of extensional viscosity is equal to or higher than 6.0.

2. The propylene-based polymer according to claim 1, wherein, in (vi), the strain hardening degree (λmax) in measurement of extensional viscosity is equal to or higher than 10.0.

3. The propylene-based polymer according to claim 1, having the following characteristics:
   (vii): the polymer has a branch structure part represented by following structural formula (1):

Structural formula (1)

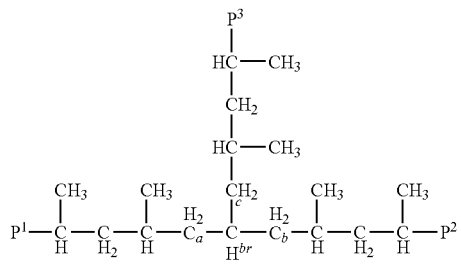

wherein $C_{br}$ represents a methine carbon at the root of a branch chain having carbon atoms of equal to or more than five, $C_a$, $C_b$ and $C_c$ represent methylene carbons adjacent to said methine carbon ($C_{br}$), and $P^1$, $P^2$ and $P^3$ represent residual groups of a propylene polymer.

4. The propylene-based polymer according to claim 1, having the following characteristics:
   (viii): ME (memory effect) satisfies following relational equation, $$(ME) \geq -0.26 \times \log(MFR) + 1.9$$

wherein a polymer is obtained by a process comprising extrusion from an orifice by using a melt indexer having an orifice length of 8.00 mm and a diameter of 1.00 mmφ, under setting a temperature in cylinder at 190° C., under load and at an extrusion rate of 0.1 g/minute, and then quenching in ethanol, wherein ME (memory effect) is defined by a value of a diameter of an extruded strand divided by a diameter of the orifice.

5. The propylene-based polymer according to claim 1, having the following characteristics:
   (ix): α/β is larger than 0.9 and below 2.0, when α and β are defined by α=$H_{50}$–Tp and β=Tp–$L_{50}$, respectively, wherein, Tp represents a common logarithm of molecular weight corresponding to a peak position, and $L_{50}$ and $H_{50}$ represent common logarithm of molecular weight at a position showing 50% height of the peak position wherein $L_{50}$ is a lower molecular weight side than Tp, and $H_{50}$ a higher molecular weight side than Tp, in a molecular weight distribution curve obtained by GPC.

6. A production method for the propylene-based polymer according to claim 1, comprising polymerizing propylene in the presence of a catalyst comprising at least following components (A) to (C):
   (A): at least two kinds of transition metal compounds selected from the group consisting of components [A-1] and [A-2], which are transition metal compounds of group IV of the periodical Table wherein a ratio of mole quantity of [A-1] is 0.30 to 0.99, relative to total mole quantity of components [A-1] and [A-2];
   (i) the component [A-1]: a compound represented by general formula (a1);

General formula (a1)

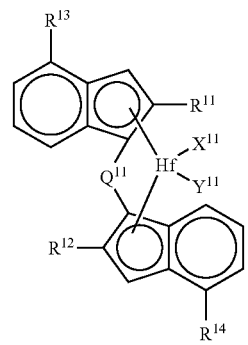

wherein, $Q^{11}$ represents a bonding group for cross-linking two conjugated five-member ring ligands, wherein the bonding group is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20; Hf represents hafnium; $X^{11}$ and $Y^{11}$ each independently represent hydrogen, a halogen group, a hydrocarbon group with carbon atoms of 1 to 20, an alkoxy group with carbon atoms of 1 to 20, an alkylamide group with carbon atoms of 1 to 20, a trifluoromethanesulfonic acid group, a phosphorous-containing hydrocarbon group with carbon atoms of 1 to 20, or a silicon-containing hydrocarbon group with carbon atoms of 1 to 20; $R^{11}$ and $R^{12}$ each independently represent a monocyclic or polycyclic hetero aromatic group with carbon atoms of 4 to 20, optionally comprising a silicon or a halogen, comprising a hetero atom selected from the group consisting of an oxygen atom, a sulfur atom, a nitrogen atom, a boron atom and a phosphorous atom, in a five-member or six-member ring; and $R^{13}$ and $R^{14}$ each independently represent an aryl group with carbon atoms of 6 to 30, optionally comprising a halogen, silicon, oxygen, sulfur, nitrogen, boron, phosphorous, or a plurality of hetero elements thereof;

(ii) the component [A-2]: a compound represented by general formula (a2)

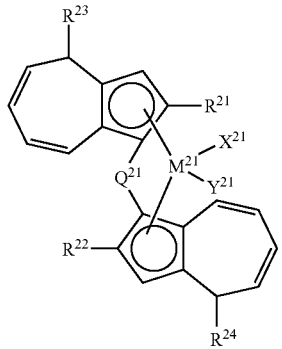

General formula (a2)

wherein, $Q^{21}$ represents a bonding group for cross-linking two conjugated five-member ring ligands, wherein the bonding group is a bi-valent hydrocarbon group with carbon atoms of 1 to 20, a silylene group having a hydrocarbon group with carbon atoms of 1 to 20, or a germirene group having a hydrocarbon group with carbon atoms of 1 to 20; $M^{21}$ represents zirconium or hafnium; $X^{21}$ and $Y^{21}$ each independently represent a similar substitution group to $X^{11}$ and $Y^{11}$; $R^{21}$ and $R^{22}$ each independently represent a hydrocarbon group with carbon atoms of 1 to 6; $R^{23}$ and $R^{24}$ each independently represent an aryl group with carbon atoms of 6 to 30, optionally comprising a halogen, silicon or a plurality of hetero thereof;

(B): an ion-exchangeable layered silicate salt; and
(C): an organoaluminum.

7. The production method for the propylene-based polymer according to claim 6, wherein the ion-exchangeable layered silicate salt is a smectite.

8. The production method for the propylene-based polymer according to claim 6, wherein $M^{21}$ of the component [A-2] is hafnium.

9. The production method for the propylene-based polymer according to claim 6, wherein polymerization of propylene is carried out by using a catalyst which is preliminary polymerized with an olefin in a range of 0.01 to 100 in weight ratio, relative to the component (B), by contacting the olefin with component (A) and component (B), or component (A), component (B) and component (C).

10. The production method for the propylene-based polymer according to claim 6, wherein polymerization of propylene is carried out in bulk polymerization where propylene is used as a solvent, or in vapor phase polymerization where propylene is maintained in a gaseous state.

11. The production method for the propylene-based polymer according to claim 6, wherein polymerization of propylene is carried out by using hydrogen in a range of $1.0 \times 10^{-6}$ to $1.0 \times 10^{-2}$, in molar ratio, relative to propylene.

12. The production method for the propylene-based polymer according to claim 6, wherein the polymerization process is a single stage polymerization.

13. A propylene-based resin composition, comprising the propylene-based polymer according to claim 1.

14. A foam molded body obtained by the propylene-based resin composition according to claim 13.

* * * * *